US012670379B2

(12) United States Patent
Ozcan et al.

(10) Patent No.: US 12,670,379 B2
(45) Date of Patent: Jun. 30, 2026

(54) MACHINE VISION USING DIFFRACTIVE SPECTRAL ENCODING

(71) Applicant: THE REGENTS OF THE UNIVERSITY OF CALIFORNIA, Oakland, CA (US)

(72) Inventors: Aydogan Ozcan, Los Angeles, CA (US); Jingxi Li, Los Angeles, CA (US); Deniz Mengu, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 922 days.

(21) Appl. No.: 17/920,774

(22) PCT Filed: May 4, 2021

(86) PCT No.: PCT/US2021/030736
§ 371 (c)(1),
(2) Date: Oct. 21, 2022

(87) PCT Pub. No.: WO2021/231139
PCT Pub. Date: Nov. 18, 2021

(65) Prior Publication Data

US 2023/0153600 A1 May 18, 2023

Related U.S. Application Data

(60) Provisional application No. 63/022,469, filed on May 9, 2020.

(51) Int. Cl.
*G06N 3/067* (2006.01)
*G02B 27/42* (2006.01)

(52) U.S. Cl.
CPC ......... *G06N 3/067* (2013.01); *G02B 27/4272* (2013.01)

(58) Field of Classification Search
CPC ................................ G06N 3/067; G06N 3/02; G06N 3/06; G06N 3/08; G06N 20/00; G02B 27/4272;
(Continued)

(56) References Cited

U.S. PATENT DOCUMENTS 4,963,725 A 10/1990 Hong et al.
5,080,464 A 1/1992 Toyoda
(Continued)

FOREIGN PATENT DOCUMENTS

WO WO 2017/223560 A1 12/2017
WO WO 2018209438 A1 11/2018
(Continued)

OTHER PUBLICATIONS

PCT International Preliminary Report on Patentability (Chapter I of the Patent Cooperation Treaty) for PCT/US2021/030736, Applicant: The Regents of the University of California, Form PCT/IB/326 and 373, dated Nov. 24, 2022 (22 pages).
(Continued)

*Primary Examiner* — Arnel C Lavarias
(74) *Attorney, Agent, or Firm* — VISTA IP LAW GROUP LLP

(57) ABSTRACT

A machine vision task, machine learning task, and/or classification of objects is performed using a diffractive optical neural network device. Light from objects passes through or reflects off the diffractive optical neural network device formed by multiple substrate layers. The diffractive optical neural network device defines a trained function between an input optical signal from the object light illuminated at a plurality or a continuum of wavelengths and an output optical signal corresponding to one or more unique wave-
(Continued)

lengths or sets of wavelengths assigned to represent distinct data classes or object types/classes created by optical diffraction and/or reflection through/off the substrate layers. Output light is captured with detector(s) that generate a signal or data that comprise the one or more unique wavelengths or sets of wavelengths assigned to represent distinct data classes or object types or object classes which are used to perform the task or classification.

50 Claims, 37 Drawing Sheets

(58) Field of Classification Search
CPC ......................... G02B 5/18; G02B 2005/1804; G02B 5/1814; G02B 5/1861; G02B 5/1866; G02B 27/42; G02B 27/4233; G02B 27/425; G02B 27/4277; G02B 27/44
USPC ....... 359/559, 558, 563, 566, 569, 572, 574; 706/12, 15, 20, 26, 40
See application file for complete search history.

(56) References Cited

U.S. PATENT DOCUMENTS

| | | | | |
|---|---|---|---|---|
| 5,095,459 | A | 3/1992 | Ohta et al. | |
| 5,255,362 | A | 10/1993 | Brandstetter et al. | |
| 5,440,671 | A | 8/1995 | Shiratani et al. | |
| 5,842,191 | A | 11/1998 | Stearns | |
| 6,445,470 | B1 | 9/2002 | Jenkins et al. | |
| 7,512,473 | B2 | 3/2009 | Nakao | |
| 9,459,148 | B2 | 10/2016 | Golub et al. | |
| 10,217,023 | B1 | 2/2019 | Rubin | |
| 11,017,309 | B2 | 5/2021 | Roques-Carmes et al. | |
| 11,392,830 | B2 * | 7/2022 | Ozcan | G06F 18/214 |
| 11,392,840 | B2 | 7/2022 | Ozcan et al. | |
| 11,694,082 | B2 | 7/2023 | Ozcan et al. | |
| 12,086,717 | B2 | 9/2024 | Ozcan et al. | |
| 12,443,838 | B2 * | 10/2025 | Ozcan | G06N 3/08 |
| 2001/0046046 | A1 | 11/2001 | Schoeppe | |
| 2002/0072676 | A1 | 6/2002 | Afanassieva | |
| 2007/0098594 | A1 | 5/2007 | Elkin et al. | |
| 2009/0003815 | A1 | 1/2009 | Polidor et al. | |
| 2010/0209830 | A1 | 8/2010 | Carcasi et al. | |
| 2014/0093147 | A1 | 4/2014 | Stewart et al. | |
| 2014/0304203 | A2 | 10/2014 | Appuhamillage et al. | |
| 2017/0351293 | A1 | 12/2017 | Carolan et al. | |
| 2019/0294967 | A1 | 9/2019 | Kumar et al. | |
| 2019/0340418 | A1 | 11/2019 | Zecchini et al. | |
| 2019/0370652 | A1 | 12/2019 | Shen et al. | |
| 2021/0142170 | A1 | 5/2021 | Ozcan et al. | |
| 2022/0253685 | A1 * | 8/2022 | Ozcan | G06N 3/084 |
| 2022/0366253 | A1 | 11/2022 | Ozcan | |
| 2023/0401447 | A1 | 12/2023 | Ozcan | |

FOREIGN PATENT DOCUMENTS

| | | | |
|---|---|---|---|
| WO | WO 2019/200289 | A1 | 10/2019 |
| WO | WO 2020/247828 | A1 | 12/2020 |
| WO | WO 2021/050550 | A1 | 3/2021 |
| WO | WO 2021/231139 | A1 | 11/2021 |
| WO | WO 2021/237170 | A1 | 11/2021 |
| WO | WO 2022/006018 | A1 | 1/2022 |
| WO | WO 2022/056422 | A1 | 3/2022 |
| WO | WO 20220/87345 | A1 | 4/2022 |

OTHER PUBLICATIONS

Bagherian, H. et al., On-Chip Optical Convolutional Neural Networks, arXiv:1808.03303v2 [cs.ET] Aug. 16, 2018.
Brunner, D. et al., Parallel photonic information processing at gigabyte per second data rates using transient states, Nature Communications, 4:1364, DOI: 10.1038/ncomms2368, www.nature.com/naturecommunications, 2013.
Bueno, J. et al., Reinforcement Learning in a large scale photonic Recurrent Neural Network, arXiv:1711.05133v2 [cs.NE] Nov. 15, 2017.
Chakraborty, I. et al., Toward Fast Neural Computing using All-Photonic Phase Change Spiking Neurons, arXiv:1804.00267v2 [cs.ET] Aug. 28, 2018.
Chang, J. et al., Hybrid optical-electronic convolutional neural networks with optimized diffractive optics for image classification, Scientific Report (2018) 8:12324, DOI:10.1038/s41598-018-30619-y.
Chen, Y. et al., Deep Learning-Based Classification of Hyperspectral Data, IEEE Journal of Selected Topics in Applied Earth Observations and Remote Sensing, vol. 7, No. 6, Jun. 2014.
Cignoni, P. et al., MeshLab: an Open-Source Mesh Processing Tool, Eurographics Italian Chapter Conference (2008).
Farhat, N. H. et al., Optical implementation of the Hopfield model, May 15, 1985, vol. 24, No. 10, Applied Optics, 1469-1475.
Girshick, R. et al., Rich feature hierarchies for accurate object detection and semantic segmentation Tech report (v5), arXiv:1311.2524v5 [cs.CV] Oct. 22, 2014.
Golik, P. et al., Cross-Entropy vs. Squared Error Training: a Theoretical and Experimental Comparison, Human Language Technology and Pattern Recognition, Computer Science Department, RWTH Aachen University, 52056 Aachen, Germany (2013).
Grischkowsky, D. et al., Far-infrared time-domain spectroscopy with terahertz beams of dielectrics and semiconductors, J. Opt. Soc. Am. B/vol. 7, No. 10/Oct. 1990.
Hermans, M. et al., Trainable & Dynamic Computing: Error Backpropagation Through Physical Media, arXiv:1407.6637v1 [cs.NE] Jul. 24, 2014.
Hughes, T.W. et al., Training of photonic neural networks through in situ backpropagation, arXiv:1805.09943v1 [physics.optics] May 25, 2018.
Kazhdan, M. et al., Screened Poisson Surface Reconstruction, ACM Transactions on Graphics, vol. VV, No. N, Article XXX, Publication date: 2013.
Khorasaninejad, M. et al., Metalenses at visible wavelengths: Diffraction-limited focusing and subwavelength resolution imaging, sciencemag.org, Science, Jun. 3, 2016, vol. 352, Issue 6290, 1190-1194.
Kildishev, A. V. et al., Planar Photonics with Metasurfaces, Science 339, 1232009 (2013). DOI: 10.1126/science.1232009.
Kingma, D. P. et al., ADAM: A Method for Stochastic Optimization, arXiv:1412.6980v9 [cs.LG] Jan. 30, 2017.
Lecun, Y. et al., GradientBased Learning Applied to Document Recognition, Proc. of the IEEE, Nov. 1998 (46 pages).
Lin, X. et al., All-optical machine learning using diffractive deep neural networks, Science 361, 1004-1008 (2018), Sep. 7, 2018.
Psaltis, D. et al., Optical information processing based on an associative-memory model of neural nets with thresholding and feedback, Optics Letters, vol. 10, No. 2, Feb. 1985.
Psaltis, D. et al., Adaptive optical networks using photorefractive crystals, Applied Optics, vol. 27, No. 9, May 1, 1988.
Shastri, B. et al., Principles of Neuromorphic Photonics, arXiv:1801.00016v1 [cs.ET] Dec. 29, 2017.
Shen, Y. et al., Deep Learning with Coherent Nanophotonic Circuits, arXiv:1610.02365v1 [physics.optics] Oct. 7, 2016.
Srivastava, N. et al., Dropout: A Simple Way to Prevent Neural Networks from Overfitting, Journal of Machine Learning Research 15 (2014) 1929-1958 Submitted Nov. 2013; Published Jun. 2014.
Tang, Y. et al., Deep Learning using Linear Support Vector Machines, arXiv:1306.0239v4 [cs.LG] Feb. 21, 2015.
Trabelsi, C. et al., Deep Complex Networks, arXiv:1705.09792v4 [cs.NE] Feb. 25, 2018.
Wagner, K. et al., Multilayer optical learning networks, Dec. 1, 1987, vol. 26, No. 23, Applied Optics, 5061-5076.
Wan, Li et al., Regularization of Neural Networks using DropConnect, Proceedings of the 30 th International Conference on Machine Learning, Atlanta, Georgia, USA, 2013.
Wang, Z. et al., Image Quality Assessment: From Error Visibility to Structural Similarity, IEEE Transactions on Image Processing, vol. 13, No. 4, Apr. 2004.

(56) References Cited

OTHER PUBLICATIONS

Weverka, R. T. et al., Fully interconnected, two-dimensional neural arrays using wavelength-multiplexed volume holograms, Optics Letters, vol. 16, No. 11, Jun. 1, 1991.
Xiao, Y. et al., Nonlinear Metasurface Based on Giant Optical Kerr Response of Gold Quantum Wells, ACS Photonics, 5(5), May 1, 2018, DOI:10.1021/acsphotonics.7b01140, 2018.
Yin, X. et al., Artificial Kerr-type medium using metamaterials, Apr. 9, 2012, vol. 20, No. 8, Optics Express, 8543-8550.
PCT International Search Report for PCT/US2019/027275, Applicant: The Regents of the University of California, Form PCT/ISA/210 and 220, dated Aug. 19, 2019 (5 pages).
PCT Written Opinion of the International Search Authority for PCT/US2019/027275, Applicant: The Regents of the University of California, Form PCT/ISA/237, dated Aug. 19, 2019 (9 pages).
Javidi, B. et al., Optical implementation of neural networks for face recognition by the use of nonlinear joint transform correlators, Applied Optics, vol. 34, No. 20, Jul. 10, 1995, 3950-3962.
Jutamulia, S. et al., Overview of hybrid optical neural networks, Optics & Laser Technology, vol. 28, No. 2, pp. 59-72, 1996.
Psaltis, D. et al., Holography in artificial neural networks. Nature. 343, 325-330 (1990).
Soures, N. et al., Neuro-MMI: A Hybrid Photonic-Electronic Machine Learning Platform. In 2018 IEEE Photonics Society Summer Topical Meeting Series (SUM); 2018; pp. 187-188.
Yu, F. T. S., II Optical Neural Networks: Architecture, Design and Models. In Progress in Optics; Wolf, E., Ed.; Elsevier, 1993; vol. 32, pp. 61-144.
Yu, F. et al., Flat optics with designer metasurfaces. Nature Materials. 13, 139-150 (2014).
Caulfield, H.J. et al., Optical Neural Networks. Proc. IEEE 1989, 77 (10), 1573-1583.
PCT International Preliminary Report on Patentability (Chapter I of the Patent Cooperation Treaty) for PCT/US2019/027275, Applicant: The Regents of the University of California, Form PCT/IB/326 and 373, dated Oct. 22, 2020 (11 pages).
Communication regarding the Extended European Search Report dated Sep. 27, 2023, for European Patent Application No. 21804948.4, (7 pages).
Communication pursuant to Rules 70(2) and 70a(2) EPC dated Oct. 17, 2023, for European Patent Application No. 21804948.4, (1 page).
Response to the Extended European Search Report dated Apr. 29, 2024, for European Patent Application No. 21804948.4, (101 pages).
PCT International Search Report for PCT/US2021/030736, Applicant: The Regents of the University of California, Form PCT/ISA/210 and 220, dated Aug. 18, 2021 (4 pages).
PCT Written Opinion of the International Search Authority for PCT/US2021/030736, Applicant: The Regents of the University of California, Form PCT/ISA/237, dated Aug. 18, 2021 (20 pages).
Xing Lin et al., All-optical machine learning using diffractive deep neural networks, Science, 361, 1004-1008 (2018).
Julie Chang et al., Hybrid optical-electronic convolutional neural networks with optimized diffractive optics for image classification, Scientific Reports, (2018), 8:12324, DOI:10.1038/s41598-018-30619-y.
Shane Colburn et al., An Optical Frontend for a Convolutional Neural Network, (2019) (13 pages).
Philipp del Hougne et al., Learned Integrated Sensing Pipeline: Reconfigurable Metasurface Transceivers as Trainable Physical Layer in an Artificial Neural Network, Adv. Sci. 2020, 7, 1901913 (8 pages).
Thomas Ferreira de Lima et al., Progress in neuromorphic photonics, Nanophotonics (2017) (23 pages).
J. Feldmann et al., All-optical spiking neurosynaptic networks with self-learning capabilities, Nature (May 2019) 569(7755): 208-214.
Kaiming He et al., Deep Residual Learning for Image Recognition, Computer Vision Foundation, (2016), (9 pages).
J. J. Hopfield, Neural networks and physical systems with emergent collective computational abilities, Proc. Natl. Acad. Sci. USA, vol. 79, pp. 2554-2558 (Apr. 1982).
Erfan Khoram et al., Nanophotonic Media for Artificial Neural Inference, arXiv:1810.07815v4 [physics.optics] Jun. 10, 2019.
Alex Krizhevsky et al., ImageNet Classification with Deep Convolutional Neural Networks, (2017), (9 pages).
Iro Lain et al., Deeper Depth Prediction with Fully Convolutional Residual Networks, arXiv:1606.00373v2 [cs.CV] Sep. 19, 2016 (12 pages).
Jingxi Li et al., Class-specific Differential Detection in Diffractive Optical Neural Networks Improves Inference Accuracy, (2019), (21 pages).
Xing Lin et al., All-optical machine learning using diffractive deep neural networks, Science, 10.1126/science.aat8084 (2018).
Lidan Lu et al., Miniaturized Diffraction Grating Design and Processing for Deep Neural Network, DOI: 10.1109/LPT.2019.2948626, IEEE Photonics Technology Letters (2019).
Yi Luo et al., Design of Task-Specific Optical Systems Using Broadband Diffractive Neural Networks, (2019), (36 pages).
Sheler Maktoobi et al., Diffractive coupling for photonic networks: how big can we go?, arXiv:1907.05661v1 [physics.optics] Jul. 12, 2019, (8 pages).
Deniz Mengu et al., Analysis of Diffractive Optical Neural Networks and Their Integration with Electronic Neural Networks, IEEE J Sel Top Quantum Electron., (2020), 26(1), doi:10.1109/JSTQE.2019.2921376 (38 pages).
Chao Qian et al., Performing optical logic operations by a diffractive neural network, Light: Science and Applications, 9, 59-. Doi:10.1038/s41377-020-0303-2, (2020), (8 pages).
Olaf Ronneberger et al., U-Net: Convolutional Networks for Biomedical Image Segmentation, N. Navab et al. (Eds.): MICCAI 2015, Part III, LNCS 9351, pp. 234-241, 2015, DOI:10.1007/978-3-319-24574-4_28.
David E. Rumelhart et al., Learning representations by back-propagating errors, Nature Publishing Group, (1986), (4 pages).
Nezih T. Yardimci et al., High Power Terahertz Generation Using Large Area Plasmonic Photoconductive Emitters, IEEE Transactions on Terahertz Science and Technology, (2015), (7 pages).
Nezih Tolga Yardimci et al., High Sensitivity Terahertz Detection through Large-Area Plasmonic Nano-Antenna Arrays, Scientific Reports, 7:42667, DOI:10.1038/srep42667, (2017), (8 pages).
Ying Zuo et al., All Optical Neural Network with Nonlinear Activation Functions, arXiv:1904.10819v1 [physics.optics] Apr. 24, 2019.
First examination report pursuant to Article94(3) EPC dated Oct. 24, 2025 for European Patent Application No. 21804948.4-1001 (5 pages).

* cited by examiner

MACHINE VISION USING DIFFRACTIVE SPECTRAL ENCODING

RELATED APPLICATION

This Application is a U.S. National Stage filing under 35 U.S.C. § 371 of International Application No. PCT/US2021/030736, filed on May 4, 2021, which claims priority to U.S. Provisional Patent Application No. 63/022,469 filed on May 9, 2020, which are hereby incorporated by reference. Priority is claimed pursuant to 35 U.S.C. §§ 119, 371 and any other applicable statute.

TECHNICAL FIELD

The technical field generally relates to optical machine vision systems that use a trainable diffractive network (i.e., transmissive or reflective) to transform and encode the spatial information of objects into the power spectrum of the diffracted light, which is used to perform optical classification of objects with a detector. Alternative embodiments encode spatial information of objects into the power spectrum of diffracted acoustic signals.

BACKGROUND

The optical part of modern machine vision systems is often comprised of a dispersion-corrected and aberration-corrected lens-based imaging architecture, which relays the spatial information of a scene or an object onto a high pixel-count focal-plane array. The electronic processing unit, e.g., often a trained Artificial Neural Network (ANN), acts on this information and extracts the relevant and useful features to perform a desired machine learning task. The large pixel-count of optical sensor arrays, which is typically on the order of a few megapixels or larger, puts a burden on computational resources such as the allocated memory and the number of multiply-accumulate (MAC) units required for statistical inference or classification over a large image size; furthermore, such high-resolution image sensors often have lower frame rates since the readout time increases with the number of pixels. One should also emphasize that high resolution image sensors are not readily available at various parts of the electromagnetic spectrum, including e.g., far/mid-infrared and terahertz bands, among others. Considering the rapid advances being made in e.g., autonomous vehicles, robotic systems and medical imaging, there is a growing need for new machine vision modalities that surpass some of these limitations.

SUMMARY

An optical machine vision system is disclosed that uses trainable diffractive layers to encode the spatial information of objects into the power spectrum of the diffracted light, which is used to achieve optical classification of objects and task-specific super-resolution with a single-pixel spectroscopic detector (or other detector). Other detectors may be used other than single-pixel detectors including, for example, detector arrays.

Here, the classical division of labor in machine vision systems is altered and the system demonstrates statistical inference by encoding the spatial information of objects into the optical spectrum through trainable diffractive layers that collectively process the information contained at multiple wavelengths to perform optical classification of objects using a single-pixel detector located at the output plane.

Unlike conventional optical components used in machine vision systems, this system employs diffractive layers that are composed of two-dimensional arrays of optical neurons or pixels, where the complex-valued transmission or reflection coefficients of individual neurons or pixels are independent learnable parameters that are optimized using a computer through deep learning and error back-propagation. The use of deep learning in optical information processing systems has emerged in various exciting directions including integrated photonics solutions as well as free-space optical platforms involving e.g., the use of diffraction. Here, the native dispersion properties of matter are harnessed and trained with a set of diffractive layers using deep learning to all-optically process a continuum of wavelengths in order to transform the spatial features of different objects into a set of unique wavelengths, each representing one data class. The system is able to use a single-pixel spectroscopic detector to perform optical classification of objects based on the spectral power encoded at these class-specific wavelengths. It should be emphasized that the task-specific spectral encoding of object information provided through a trained diffractive optical network is a single-shot encoding for e.g., image classification, without the need for variable or structured illumination or spatial light modulators.

This system was implemented, in one embodiment, by designing broadband optical networks with multiple (e.g., three (3)) diffractive layers that operate with pulsed illumination at terahertz wavelengths to achieve >9% blind testing accuracy for optical classification of handwritten digits (never seen by the network before) based on the spectral power of ten (10) distinct wavelengths, each assigned to one digit/class. Using a plasmonic nanoantenna-based source and a detector as part of a terahertz time-domain spectroscopy (THz-TDS) system, and 3D-printed diffractive network, the experiments provided very good match to numerical results, successfully inferring the classes/digits of the input objects by maximizing the power of the wavelength corresponding to the true label.

In addition to optical classification of objects through spectral encoding of data classes, the system, in another embodiment, uses a shallow ANN with two hidden layers that is successively trained (after the diffractive network's training) to reconstruct the images of the classified objects based on their diffracted power spectra detected by a single-pixel spectroscopic detector. Using only ten (10) inputs, one for each class-specific wavelength, this shallow ANN is shown to successfully reconstruct images of the input objects even if they were incorrectly classified by the broadband diffractive network. Considering the fact that each image of a handwritten digit is composed of 784 pixels, this shallow image reconstruction ANN, with an input vector size of ten (10), performs a form of super-resolution to successfully decode the task-specific spectral encoding of the diffractive network (i.e., the optical front-end). Despite being a very modest ANN with ~684K learnable parameters, the success of this task-specific image reconstruction network, i.e., the decoder, also emphasizes the vital role of the collaboration between a trainable optical front-end and an all-electronic ANN-based back-end. In fact, the results also demonstrate that once the reconstructed images of the objects that were initially misclassified by the diffractive optical network are fed back into the same optical network as new inputs, their optical classification is corrected, significantly improving the overall inference accuracy of the broadband diffractive network.

The system and methods presented herein can be used for the development of various new machine vision systems that utilize spectral encoding of object information to achieve a specific inference task in a resource-efficient manner, with low-latency, low power and low pixel count. The teachings can also be extended to spectral domain interferometric measurement systems, such as Fourier-Domain Optical Coherence Tomography (FDOCT), Fourier Transform Infrared Spectroscopy (FTIR), interferometric measurements devices, and others to create fundamentally new 3D imaging and sensing modalities integrated with spectrally encoded classification tasks performed through diffractive optical networks. While the experimental results utilized solely the native dispersion properties of matter, one can also envision harnessing metamaterials and their engineered dispersion to design more enhanced spectral encoding diffractive networks.

In one embodiment, a system using diffractive spectral encoding for performing one or more of a machine vision task, machine learning task, and/or classification of objects includes a diffractive optical neural network device comprising a plurality of optically transmissive and/or reflective substrate layers arranged in an optical path, each of the plurality of optically transmissive/reflective substrate layers comprising a plurality of physical features formed on or within the plurality of optically transmissive and/or reflective substrate layers and having different complex-valued transmission and/or reflection coefficients as a function of lateral coordinates across each substrate layer, wherein the plurality of optically transmissive and/or reflection substrate layers and the plurality of physical features collectively define a trained function between an input optical signal from the objects illuminated at a plurality or a continuum of wavelengths and an output optical signal corresponding to one or more unique wavelengths or sets of wavelengths within the plurality or the continuum of wavelengths assigned to represent distinct data classes or object types or object classes created by optical diffraction and/or reflection through/off the plurality of optically transmissive and/or reflective substrate layers. The system has (or uses light from) light source configured to illuminate the objects and generate the input optical signal. The system further includes a detector or set of detectors configured to sense the output optical signal(s) or data from the diffractive optical neural network.

In another embodiment, a method of performing a machine vision task, machine learning task, and/or classification of objects using a diffractive optical neural network device, includes passing light from the objects through the diffractive optical neural network device comprising a plurality of optically transmissive and/or reflective substrate layers arranged in an optical path, each of the plurality of optically transmissive and/or reflective substrate layers comprising a plurality of physical features formed on or within the plurality of optically transmissive and/or reflective substrate layers and having different complex-valued transmission/reflection coefficients as a function of lateral coordinates across each substrate layer, wherein the plurality of optically transmissive and/or reflection substrate layers and the plurality of physical features collectively define a trained function between an input optical signal from the objects illuminated at a plurality or a continuum of wavelengths and an output optical signal corresponding to one or more unique wavelengths or sets of wavelengths within the plurality or the continuum of wavelengths assigned to represent distinct data classes or object types or object classes created by optical diffraction and/or reflection through/off the plurality of optically transmissive and/or reflective substrate layers. Light from the diffractive optical neural network device is captured or received with a detector or a set of detectors that generate a signal or data that comprise the one or more unique wavelengths or sets of wavelengths within the plurality or the continuum of wavelengths assigned to represent distinct data classes or object types or object classes. The machine vision task, machine learning task, and/or classification of objects is performed based on the signal or data generated by the detector or set of detectors. A computing device may be used to receive the signal or data generated by the detector or set of detectors and using software perform the machine vision task, machine learning task, and/or classification of objects.

In another embodiment, a system using diffractive spectral encoding of an acoustic signal for performing a machine vision task, machine learning task, and/or classification of objects includes a diffractive acoustic neural network device comprising a plurality of acoustically transmissive and/or reflective substrate layers arranged in a path, each of the plurality of acoustically transmissive and/or reflective substrate layers comprising a plurality of physical features formed on or within the plurality of acoustically transmissive and/or reflective substrate layers and having different transmission/reflection coefficients as a function of lateral coordinates across each substrate layer, wherein the plurality of acoustically transmissive and/or reflection substrate layers and the plurality of physical features collectively define a trained function between an input acoustic signal from the object exposed to a plurality or a continuum of frequencies and an output acoustic signal corresponding to one or more unique frequencies or sets of frequencies within the plurality or the continuum of frequencies assigned to represent distinct data classes or object types or object classes created by acoustic diffraction and/or reflection through/off the plurality of acoustically transmissive and/or reflective substrate layers. The system includes (or uses) an acoustic source configured to expose the objects along the path. A detector or set of detectors is configured to sense the acoustic optical signal from the diffractive acoustic neural network.

In another embodiment, a method of performing a machine vision task, machine learning task, and/or classifying objects using a diffractive acoustic neural network device includes passing an acoustic signal from one or more objects through the diffractive acoustic neural network device comprising a plurality of acoustically transmissive and/or reflective substrate layers arranged in a path, each of the plurality of acoustically transmissive and/or reflective substrate layers comprising a plurality of physical features formed on or within the plurality of acoustically transmissive and/or reflective substrate layers and having different transmission/reflection coefficients as a function of lateral coordinates across each substrate layer, wherein the plurality of acoustically transmissive and/or reflection substrate layers and the plurality of physical features collectively define a trained function between an input acoustic signal from the one or more objects exposed to a plurality or a continuum of frequencies and an output acoustic signal corresponding to one or more unique frequencies or sets of frequencies within the plurality or the continuum of frequencies assigned to represent distinct data classes or object types or object classes created by acoustic diffraction and/or reflection through/off the plurality of acoustically transmissive and/or reflective substrate layers. The output acoustic signal from the diffractive acoustic neural network device is captured or received with a detector or a set of detectors that generate a signal or data that comprise the one or more unique frequencies or sets of frequencies within the plurality or the continuum of frequencies assigned to represent distinct data classes or object types or object classes. The machine vision task, machine learning task, and/or classification of objects is then performed based on the signal or data generated by the detector or set of detectors. A computing device may be used to receive the signal or data generated by the detector or set of detectors and using software perform the machine vision task, machine learning task, and/or classification of objects.

BRIEF DESCRIPTION OF THE DRAWINGS

FIG. 3A shows the optical layout of the single detector machine vision concept for spectrally-encoded classification of handwritten digits. As an example, digit ‘8’ is illuminated with a broadband pulsed light, and the subsequent diffractive optical network transforms the object information into the power spectrum of the diffracted light collected by a single detector. The object class is determined by the maximum of the spectral class scores, s, defined over a set of discrete wavelengths, each representing a data class (i.e., digit). FIG. 3B schematically illustrates the task-specific image reconstruction using the diffractive network’s spectral class scores as an input. A separately-trained shallow neural network (e.g., ANN) recovers the images of handwritten digits from the spectral information encoded in s. Each reconstructed image is composed of >780 pixels, whereas the input vector, s, has 10 spectral values.

FIG. 4A shows a 3D-printed diffractive optical neural network device. FIG. 4B illustrates the learned thickness profiles of the three diffractive layers in FIG. 4A. FIG. 4C is a photograph of the experimental setup. FIG. 4D illustrates the physical layout of the diffractive optical neural network setup (top) and a zoomed-in version on the bottom. Note that dimensions listed in FIG. 4D were those used in the experiments and are not limiting as other dimensions may be used. The object is a binary handwritten digit (from MNIST data), where the opaque regions are coated with aluminum to block the light transmission. Bottom: schematic of the THz-TDS setup. Thick lines depict the optical path of the femtosecond pulses generated by a Ti:Sapphire laser operating at 780 nm wavelength. Thin lines indicate the optical path of the terahertz pulse (peak frequency ~500 GHz, observable bandwidth ~5 THz), which is modulated by the 3D-printed diffractive neural network to spectrally encode the task-specific spatial information of the object.

FIG. 5A shows the experimentally measured (solid line) and the numerically computed (dashed line) output power spectra for optical classification of three different handwritten digits. The object class is determined by the maximum of the spectral class scores, s, defined over a set of discrete wavelengths, each representing a digit. FIG. 5B illustrates on the top a confusion matrix, summarizing the numerical classification performance of the diffractive optical network that attains a classification accuracy of 95.05% over 10,000 handwritten digits in the blind testing set. The bottom matrix of FIG. 5B shows the confusion matrix for the experimental results obtained by 3D-printing 50 handwritten digits randomly selected from the numerically successful classification samples in the blind testing set. An 88% match between the experimentally inferred and the numerically computed object classes is observed. FIG. 5C illustrates the comparison of three (3) different diffractive networks that were trained, fabricated and experimentally tested in terms of (1) their numerical blind testing accuracies (solid squares), (2) the match between experimentally measured and numerically predicted object classes (solid circles), and (3) the inference accuracy achieved by feeding the decoder ANN’s reconstructed images back to the diffractive network as new inputs (dashed triangles).

(FIG. 7A) Experimentally measured (solid line) and the numerically computed (dashed line) output power spectra for optical classification of three different handwritten digits. (FIG. 7B) Top left: confusion matrix summarizing the numerical classification performance of the diffractive optical network that attains a classification accuracy of 84.02% over 10,000 handwritten digits in the blind testing set. Top right: confusion matrix for the experimental results obtained by 3D-printing 50 handwritten digits randomly selected from the numerically successful classification samples in the blind testing set. A 96% match between the experimentally inferred and the numerically computed object classes is observed. Middle left: confusion matrix provided by max(s') computed by feeding the reconstructed images back to the diffractive network. The blind testing accuracy of 91.29% is achieved, demonstrating a significant classification accuracy improvement (7.27%) (also see FIG. 6). Middle right: confusion matrix for the experimental results using the same 50 digits. Lower left: same as the middle left matrix in (FIG. 7B), but solely for the digits that are correctly predicted by the optical network (corresponding to the diagonal entries in the top left confusion matrix in (FIG. 7B)). Its diagonal entries can be interpreted as the digits that are retained to be correctly predicted, while its off-diagonal entries represent the "losses" after the image reconstruction and feedback process. Lower right: same as the left one, but solely for the digits that are incorrectly classified by the optical network (corresponding to the off-diagonal entries in the top left matrix in FIG. 7B). Its diagonal entries indicate the optical classification "corrections" after the image reconstruction and feedback process, while its off-diagonal entries represent the ones that remained to be wrongly classified. The number $N_C-N_L=727$ is the classification accuracy "gain" achieved through max(s'), corresponding to a 7.27% increase in the numerical testing accuracy of the diffractive model (also see FIG. 5C).

FIG. 8A illustrates the training strategy for image reconstruction ANN based on a structural loss function that pixel-wise compares the reconstructed image, $O_{recon}$, with the ground truth $O_{input}$. FIG. 8B illustrates the application of the image feedback mechanism used for tailoring the image reconstruction space of the decoder ANN in order to collaborate with the corresponding diffractive optical network and help its optical classification.

FIG. 10A illustrates experimentally measured (solid line) and the numerically computed (dashed line) output power spectra for optical classification of three different handwritten digits, shown as examples.

($s=[s_0, s_1, \ldots, s_9]$) to successfully decode the task-specific spectral encoding of the diffractive optical network.

Figure 14A:
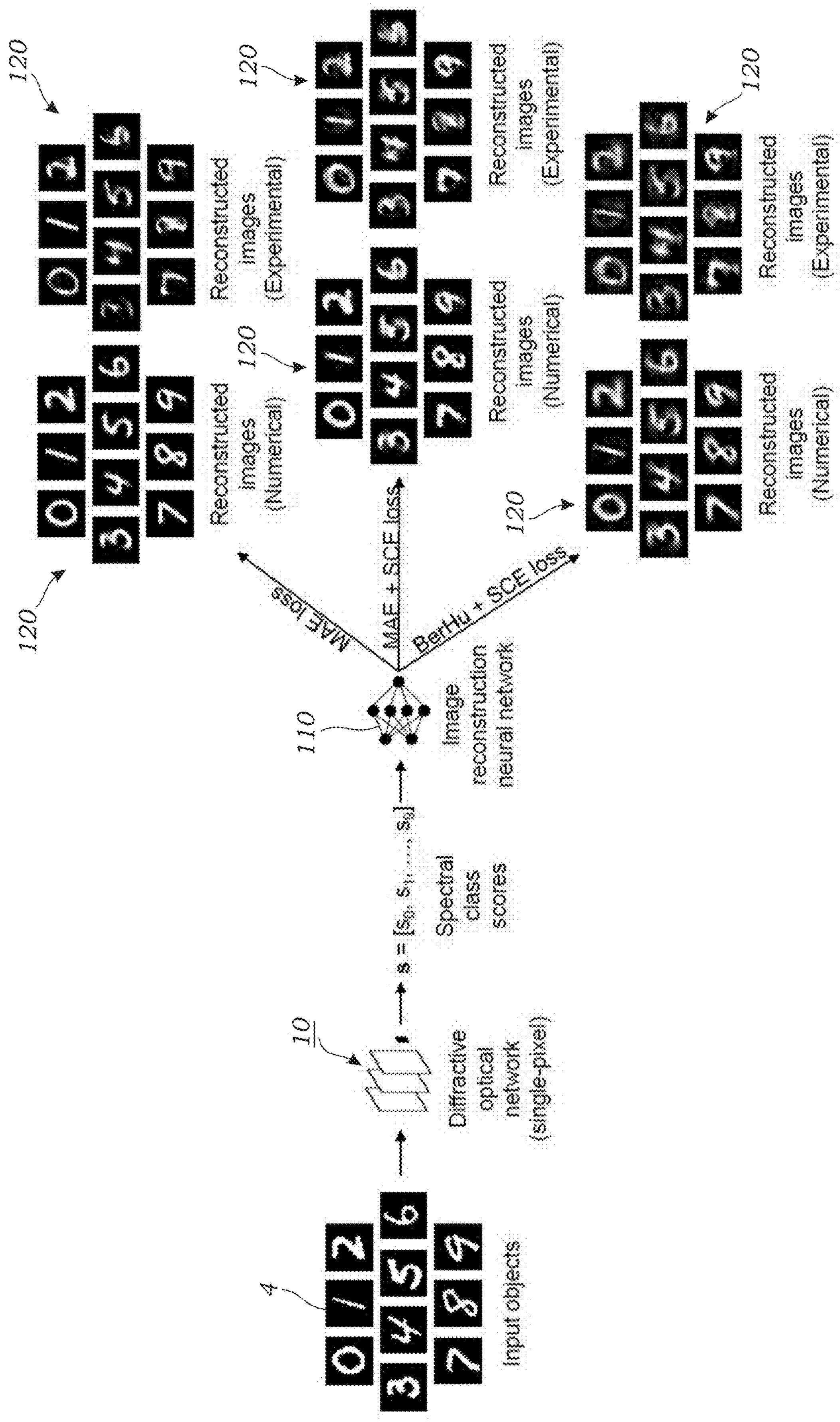
FIG. 14A: Image reconstruction results using decoder ANNs trained with different loss functions. Same as in FIG. 13A, except that the diffractive optical network that provides a blind testing accuracy of 84.02% is used here ($1^{st}$ row of Table 1). Each image of a handwritten digit is composed of >780 pixels, and the shallow image reconstruction ANN with 2-hidden layers receives an input vector size of 10
Figure 14B:
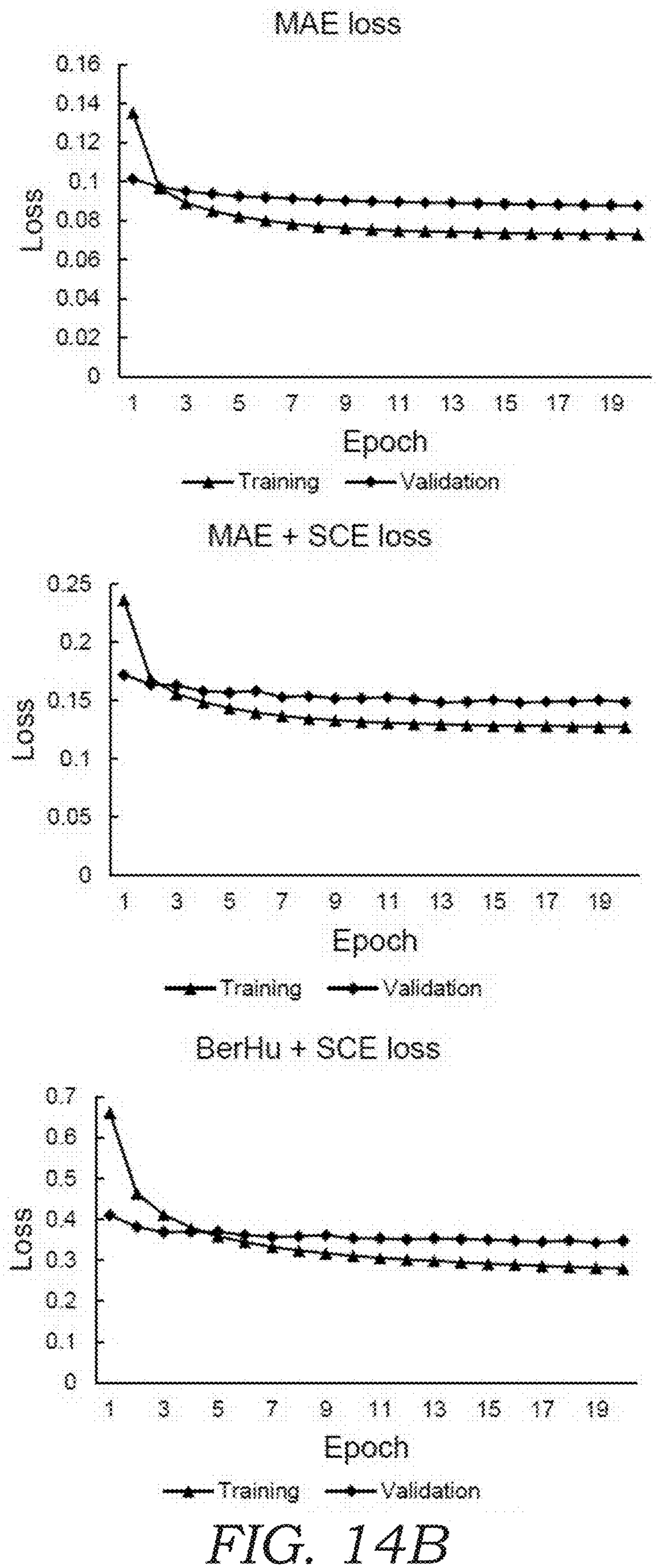

FIG. 14B: Illustrates the training and validation loss curves of the decoder ANNs of FIG. 14A trained with different loss functions.

Figure 15A:
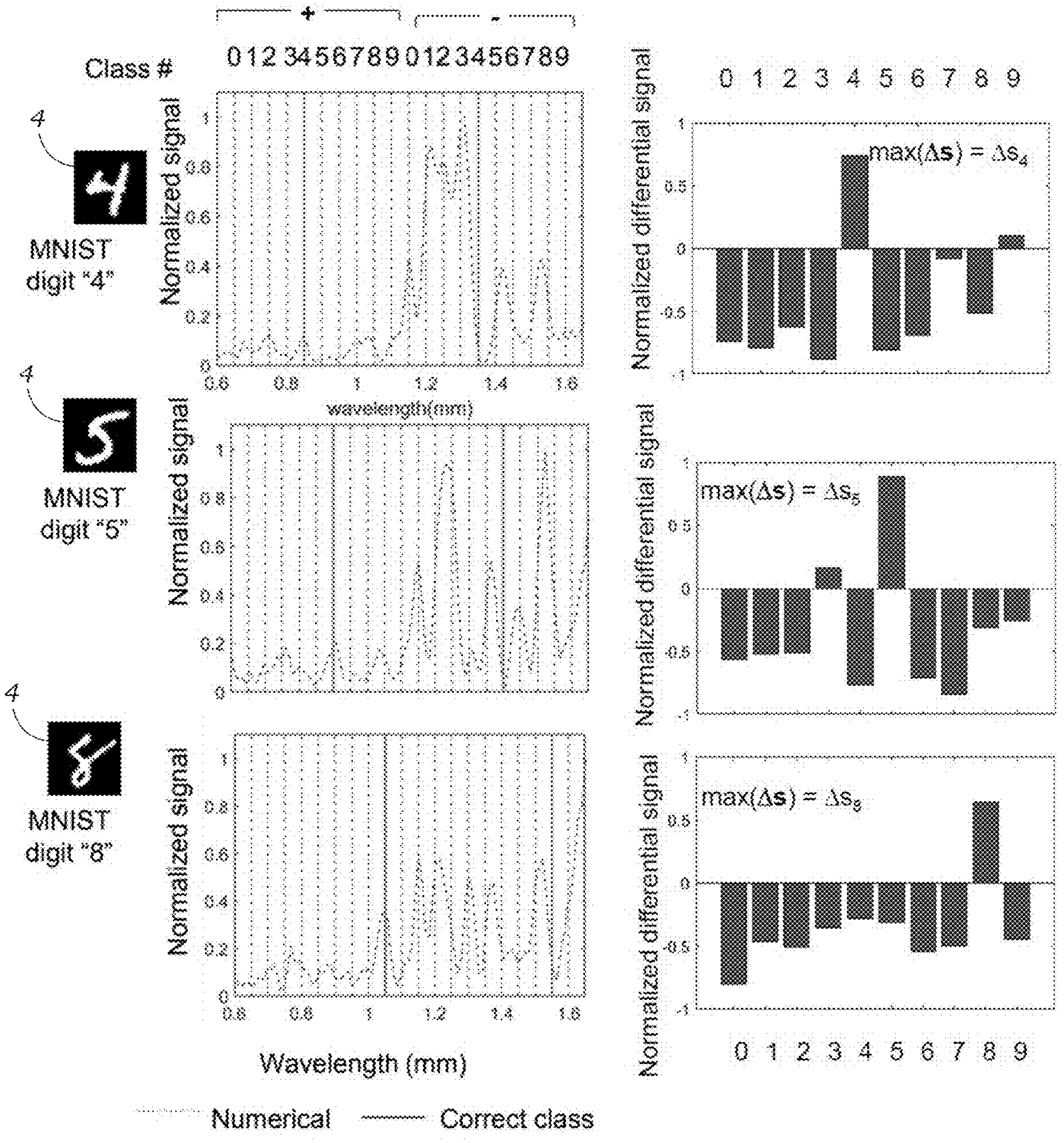
Figure 15B:
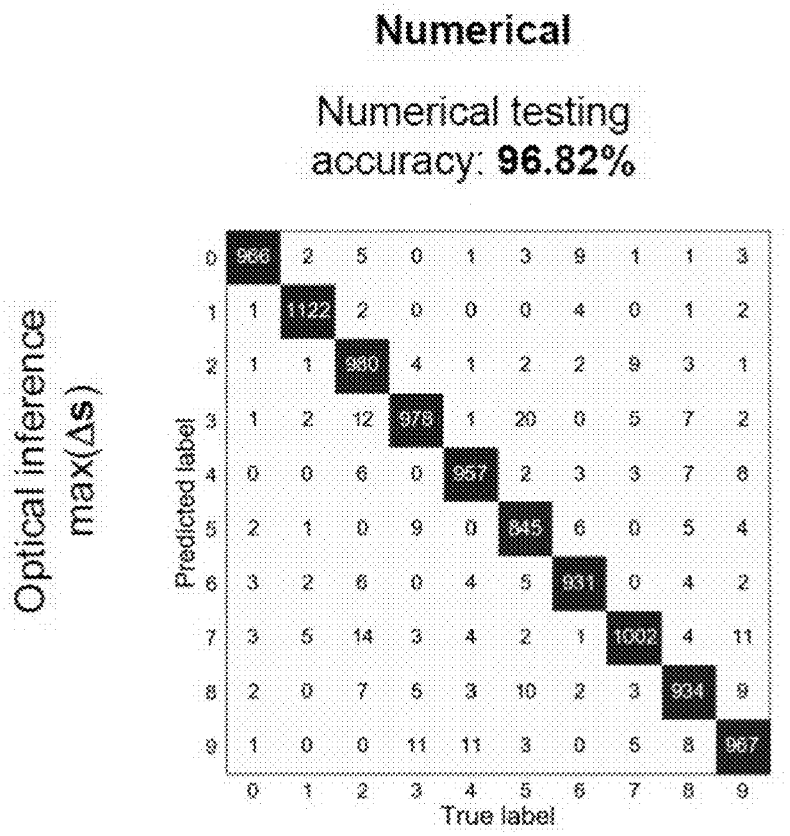

FIGS. 15A-15B: Blind testing performance of a differential diffractive optical network using spectral encoding of data classes. (FIG. 15A) The numerically computed (dashed lines) output power spectra for optical classification of three different handwritten digits and their normalized differential class scores, Δs. (FIG. 15B) Confusion matrix summarizing the numerical classification performance of the diffractive optical network using differential spectral encoding strategy (max(Δs)) that attains a classification accuracy of 96.82% over 10,000 handwritten digits in the blind testing set.

Figure 16:
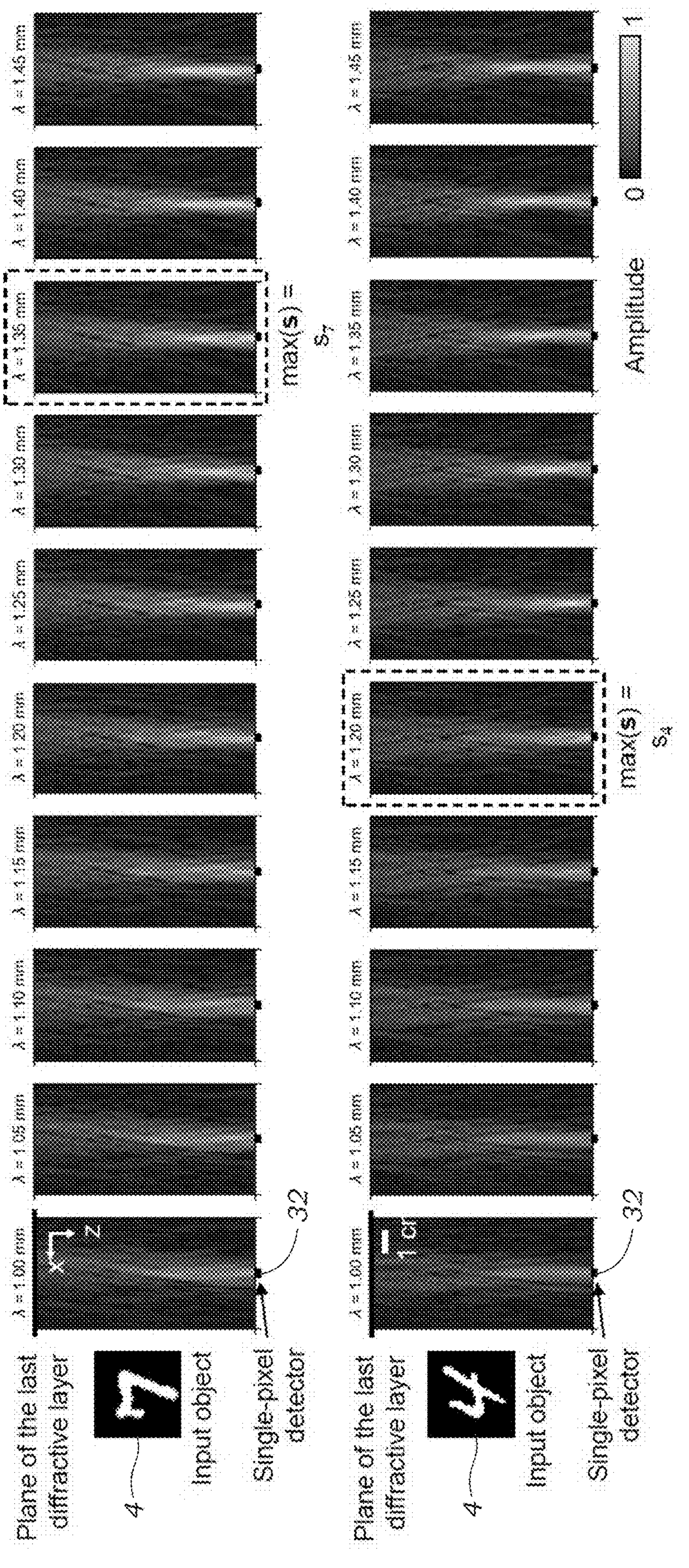

FIG. 16: The projection of the spatial amplitude distributions created by 2 input objects (handwritten digits) on the x-z plane (y=0, where the detector is located) for 10 different wavelengths that encode the spectral class scores, s. The z range is from the plane of the last diffractive layer (grey lines) to the plane of the detector (small red rectangles), and the diffractive model used here is the one that has an 84.02% numerical testing accuracy (see FIGS. 7A-7B and FIGS. 14A-14B). The spectral class scores (s) can be viewed as the integral of the light intensity at the detector region in each case and the maximum ones predict the correct data classes (dashed boxes for each row).

Figure 17A:
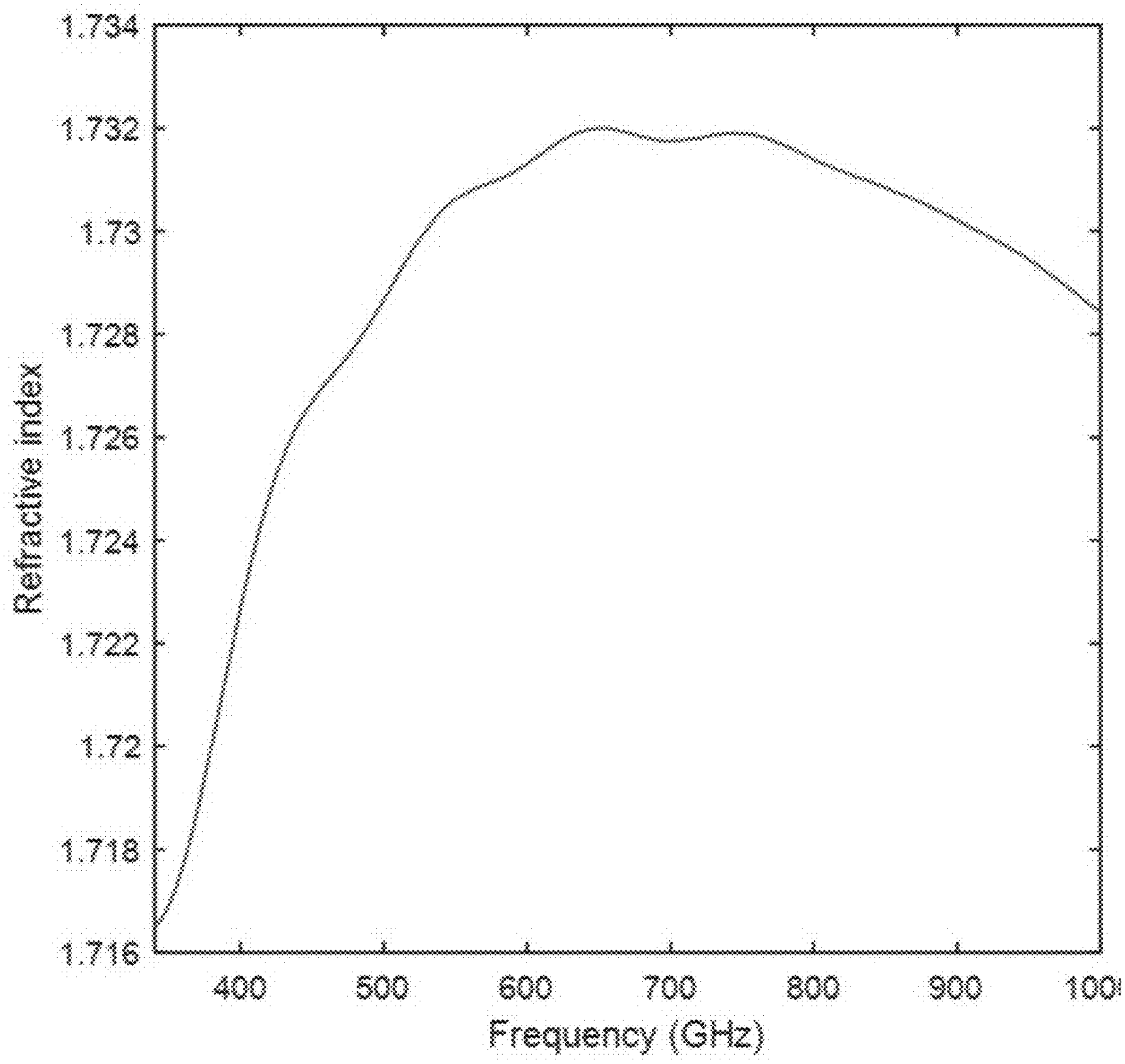
Figure 17B:
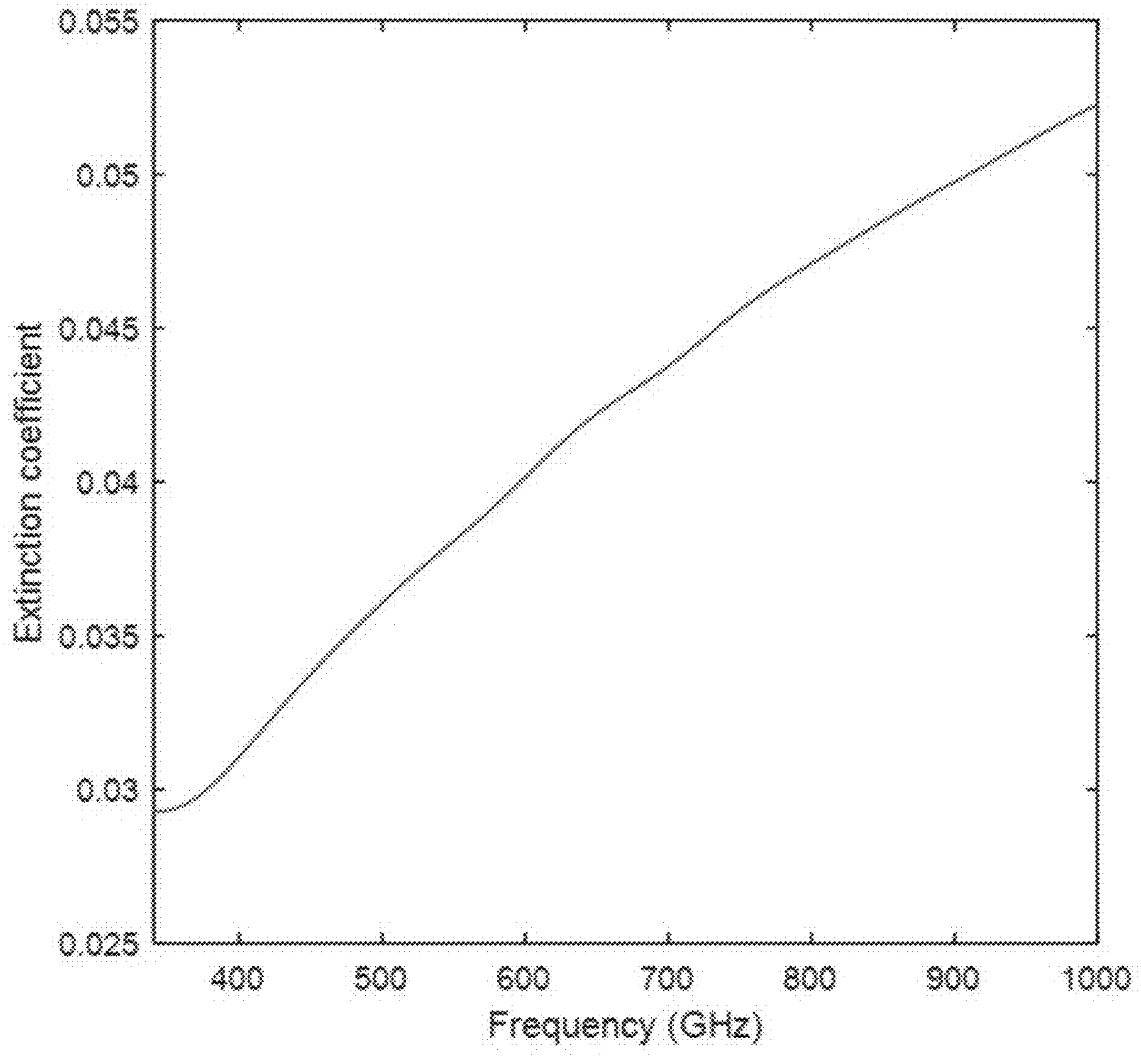
Figure 18A:
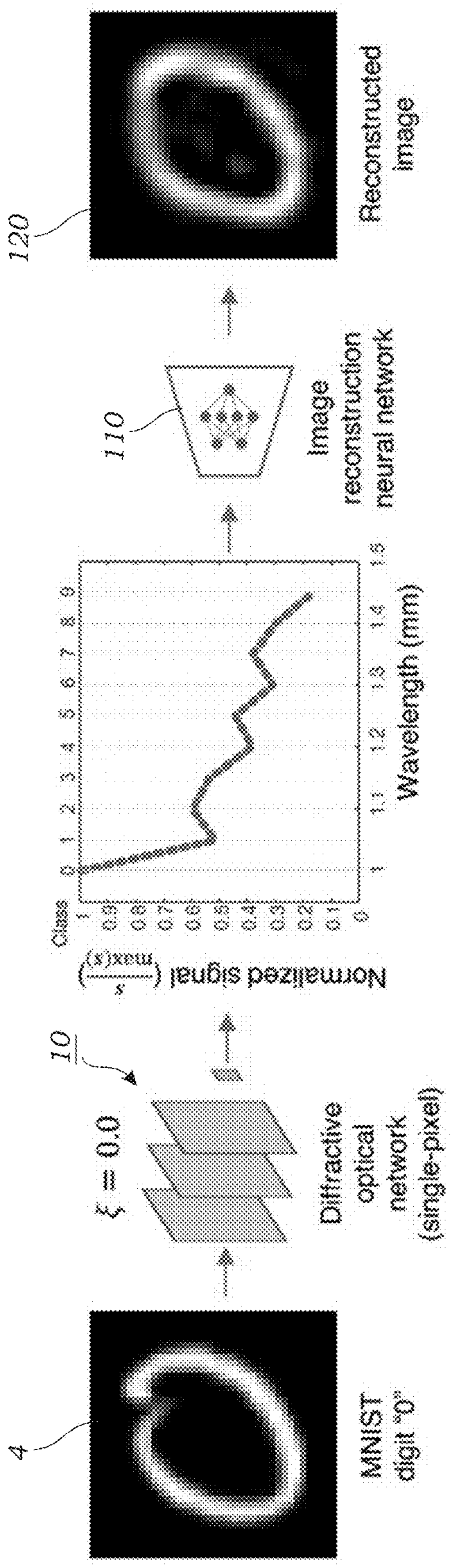
Figure 18B:
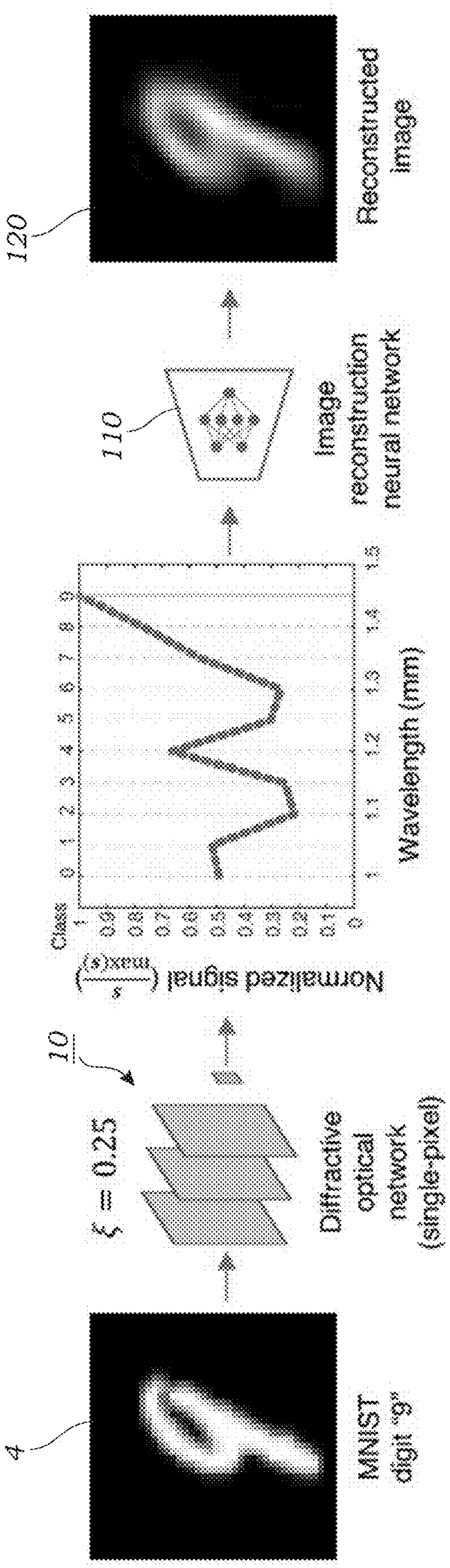
Figure 18C:
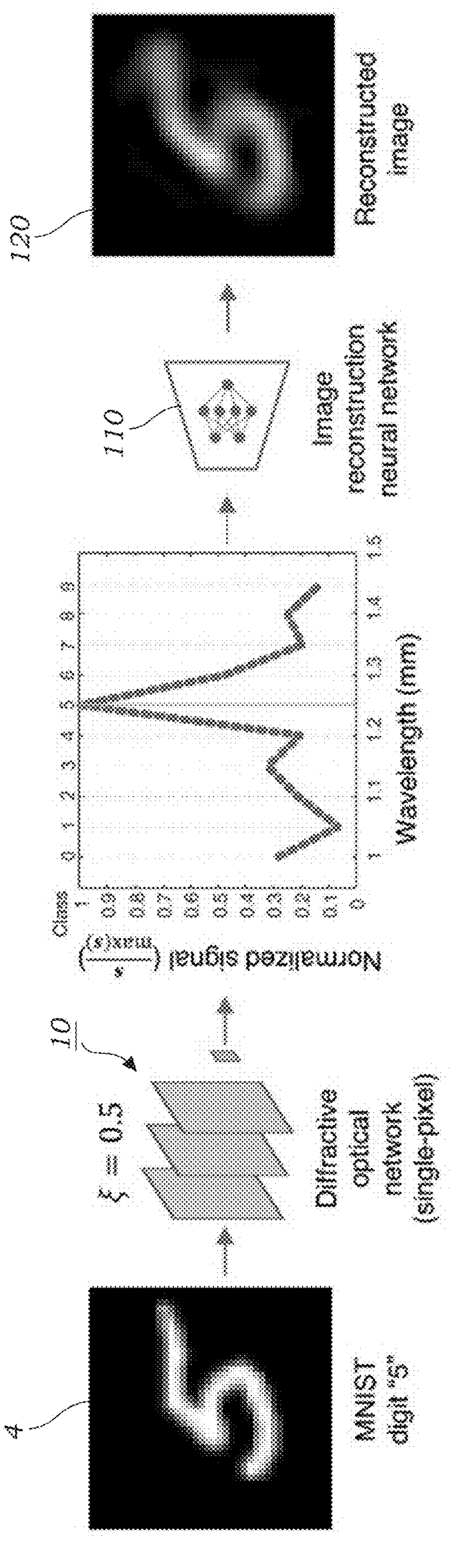
Figure 18D:
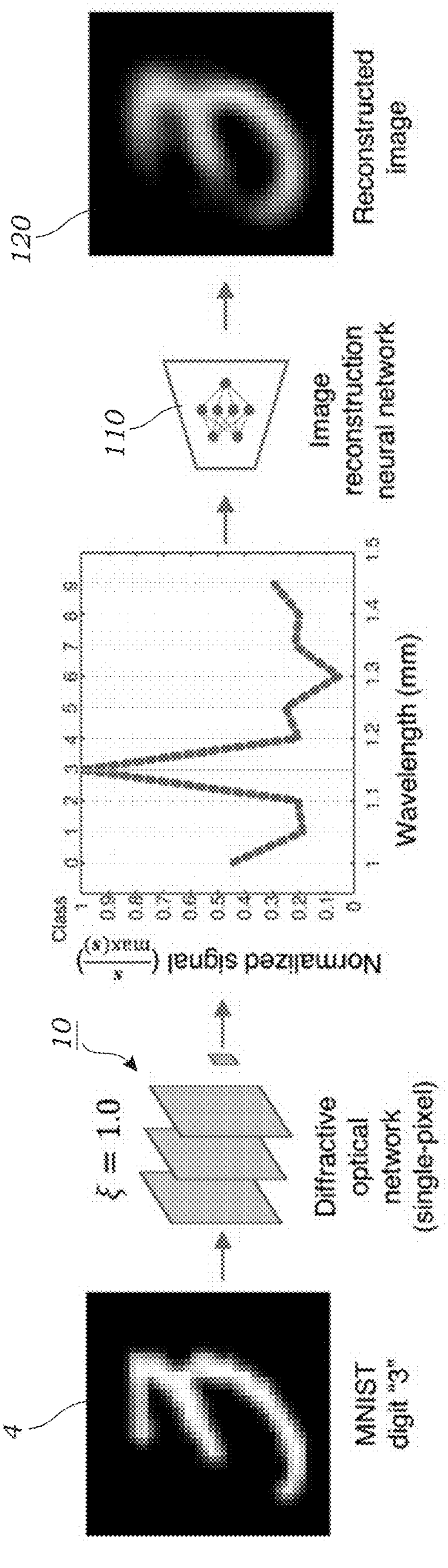
Figure 19A:
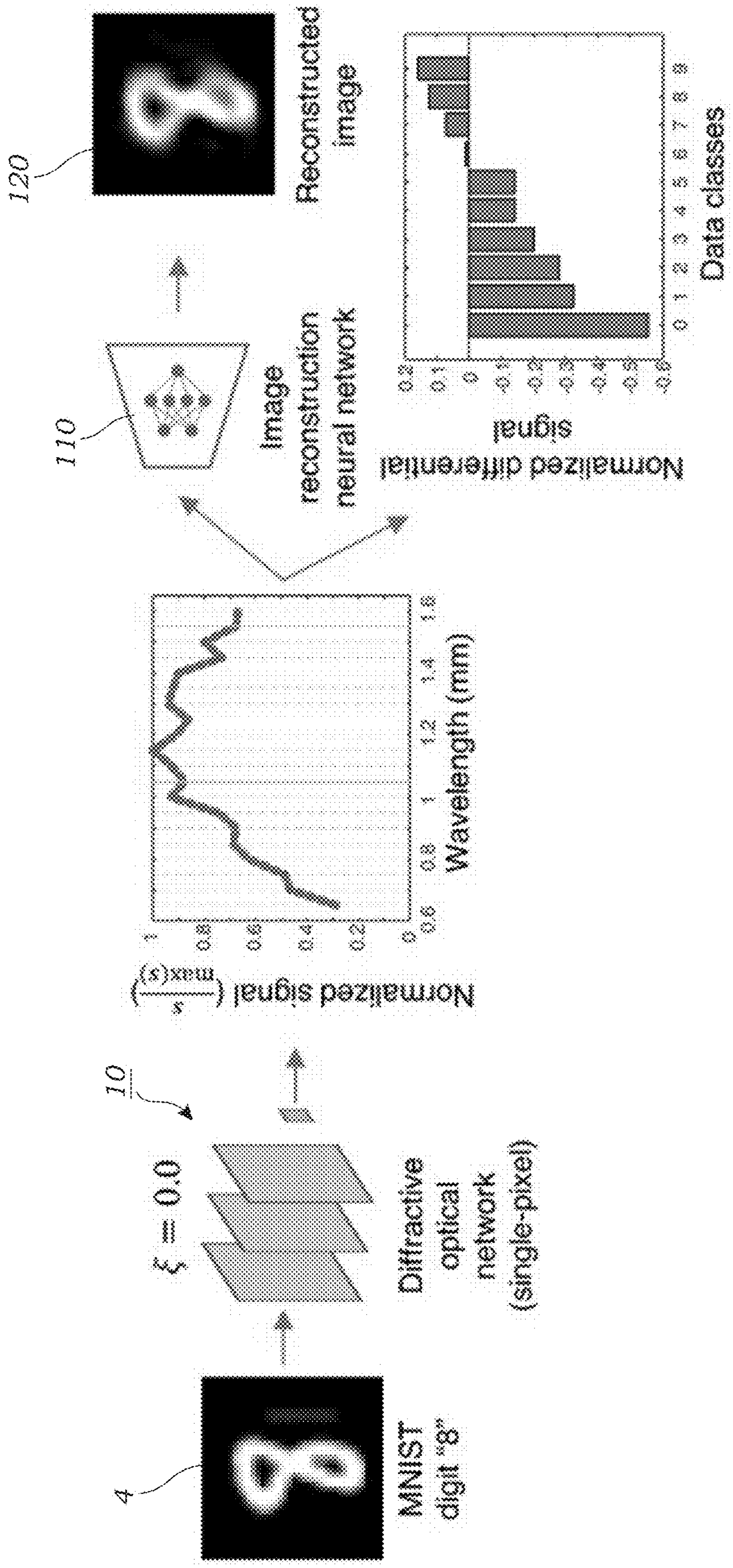
Figure 19B:
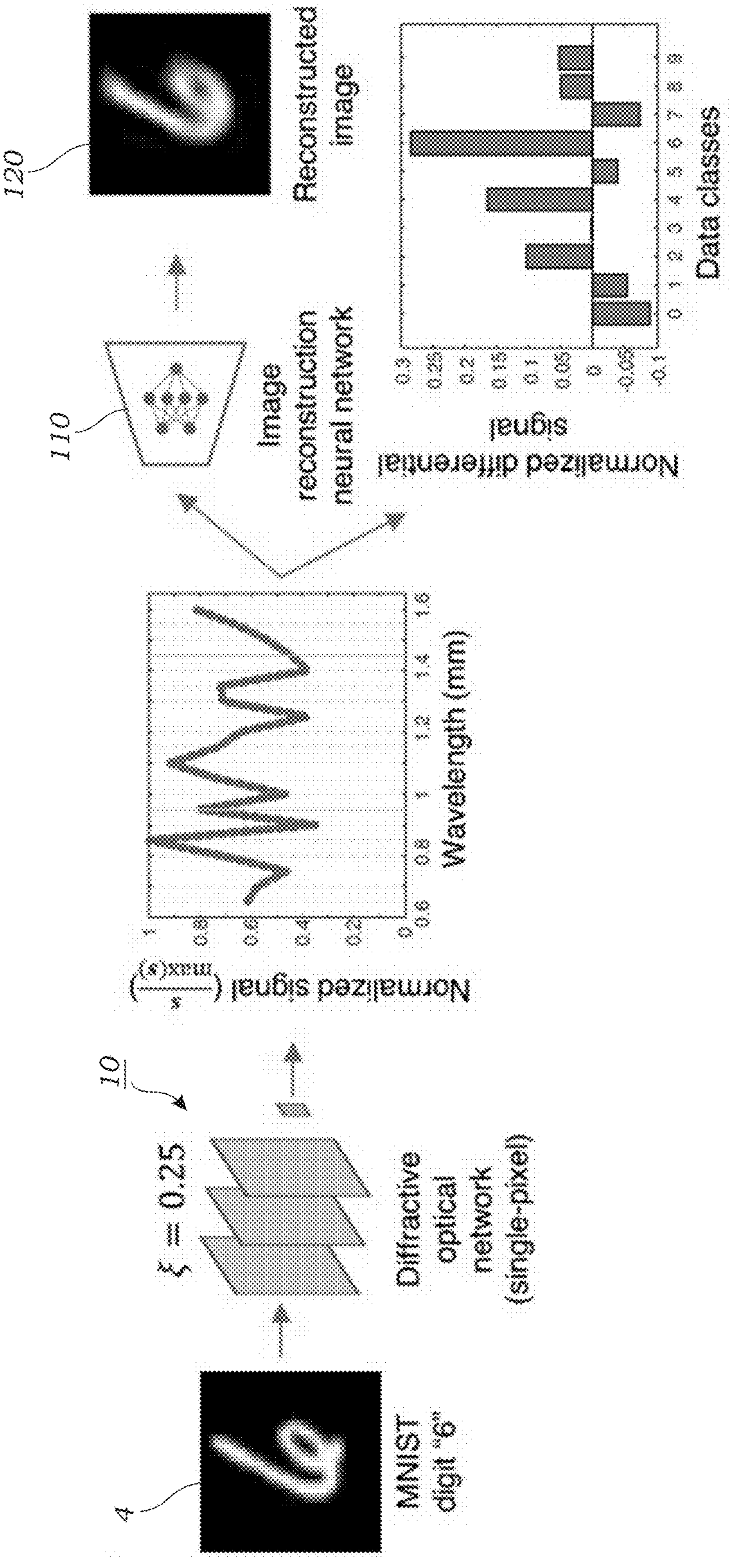
Figure 19C:
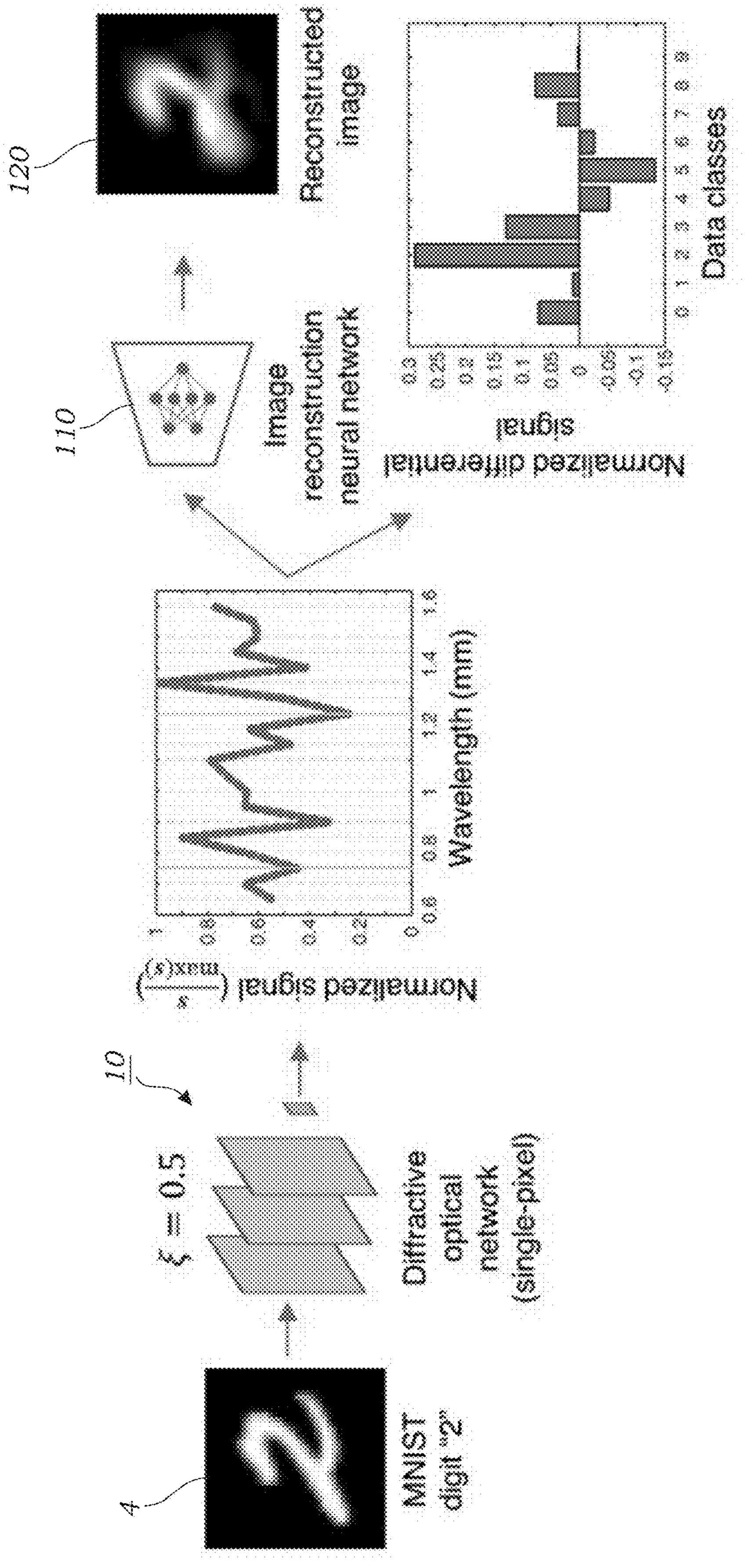
Figure 19D:
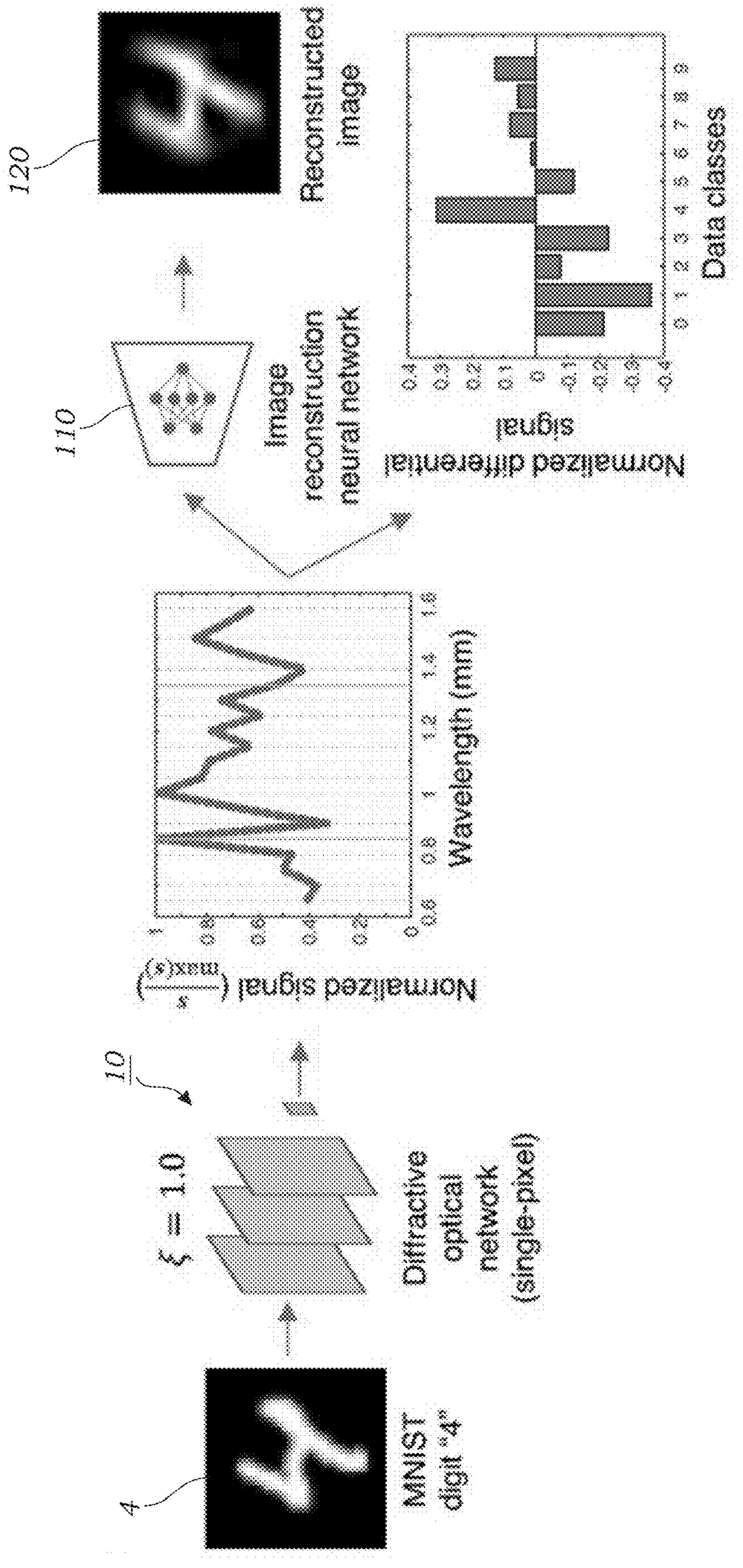

FIGS. 17A-17B: Measured dispersion curves of the polymer material used for 3D fabrication of the diffractive optical network models. The refractive index (FIG. 17A) and the extinction coefficient (FIG. 17B) of VeroBlackPlus RGD875 printing material were extracted from the real and imaginary parts of the complex refractive index, respectively, and used for n(λ) and κ(λ) in Eqs. (8) and (9).

FIGS. 18A-18D: Jointly-trained hybrid machine vision systems for all-optical image classification and ANN-based image reconstruction using spectral encoding of data classes through a single-pixel. (FIG. 18A) ξ=0. (FIG. 18B) ξ=0.25. (FIG. 18C) ξ=0.5. (FIG. 18D) ξ=1.0. The input object is an amplitude-encoded MNIST digit and it propagates through the diffractive spectral encoder; its data class is blindly inferred by max(s) at the output of a single-pixel spectroscopic detector. The collected power coefficients of 10 wavelengths are further processed by the image reconstruction ANN to blindly recover the image of the input object. Also see Table 3.

FIGS. 19A-19D: Jointly-trained hybrid machine vision systems for all-optical image classification and ANN-based image reconstruction using differential spectral encoding of data classes through a single-pixel. (FIG. 19A) ξ=0. (FIG. 19B) ξ=0.25. (FIG. 19C) ξ=0.5. (FIG. 19D) ξ=1.0. The input object is an amplitude-encoded MNIST digit and it propagates through the diffractive spectral encoder; its data class is blindly inferred by a normalized differential signal, max (Δs), at the output of a single-pixel spectroscopic detector. The collected power coefficients of M=20 wavelengths are further processed by the image reconstruction ANN to blindly recover the image of the input object. For ξ=0 shown in (a), the jointly-trained model completely focused on the image reconstruction task, and ignored the optical classification loss, which resulted in a poor classification accuracy, unlike the other cases shown here. Also see Table 3.

Figure 20A:
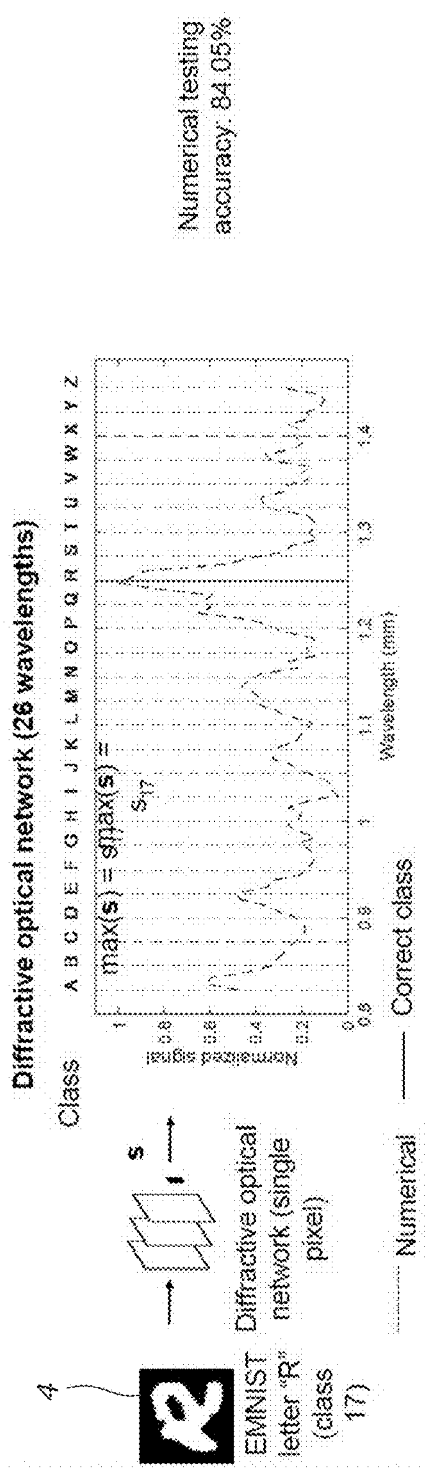
Figure 20B:
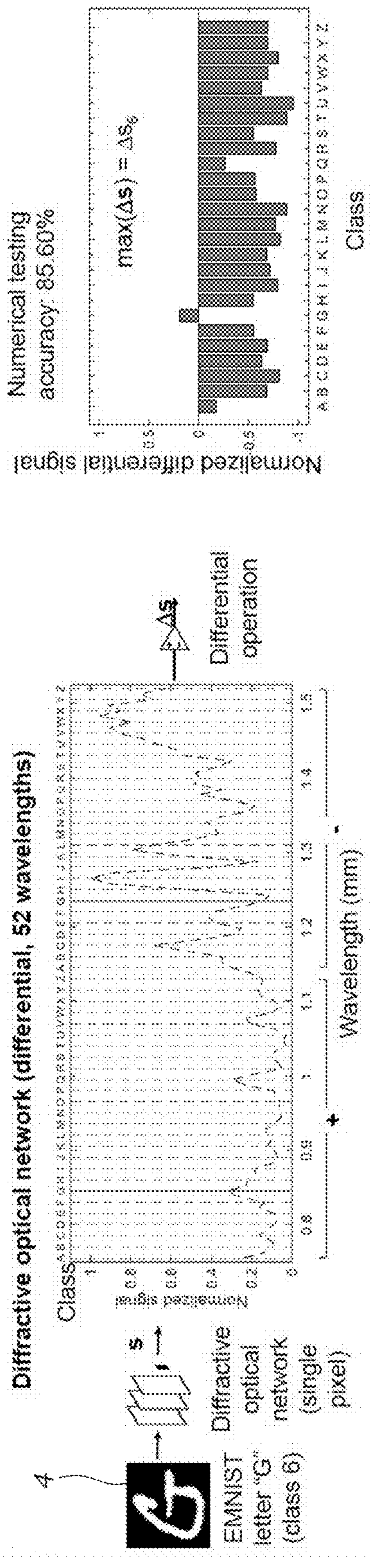
Figure 20C:
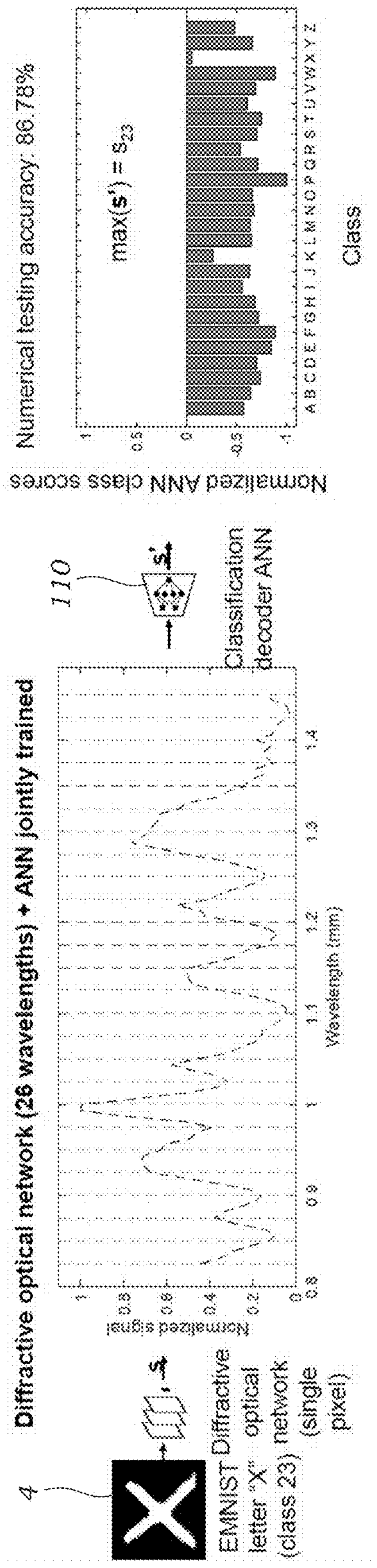
Figure 20D:
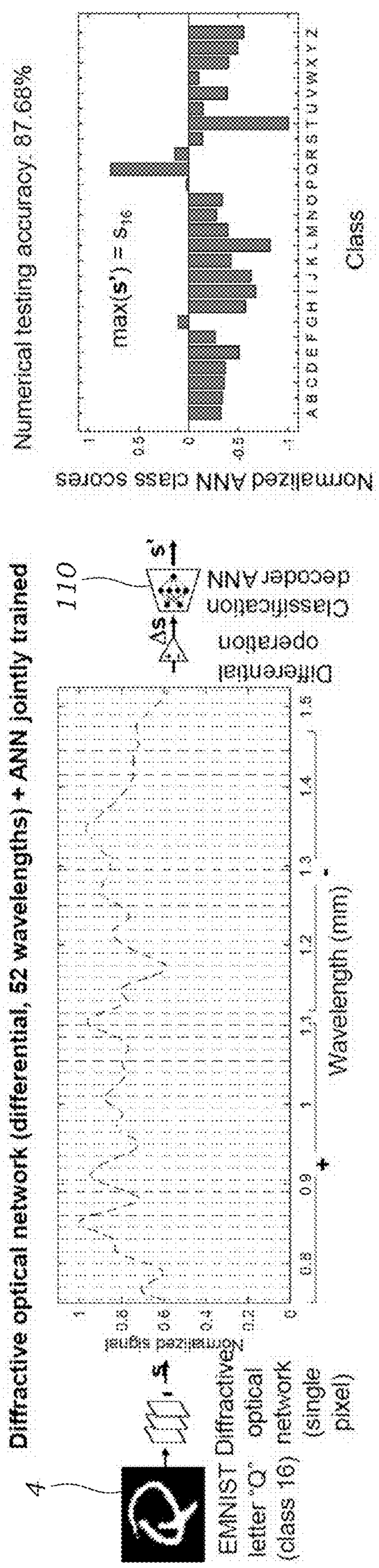

FIGS. 20A-20D: EMNIST image classification results. FIG. 20A shows the numerically computed output power spectrum for optical classification of one handwritten capital letter (shown as an example) using a trained standard diffractive optical network which performs space-to-spectrum encoding based on 26 discrete wavelengths, achieving a blind testing accuracy of 84.05%. FIG. 20B same as in FIG. 20A, but a differential diffractive network that performs differential class encoding based on 52 discrete wavelengths is used, which achieved a classification accuracy of 85.60%. The wavelengths are divided into two groups, one containing 26 wavelengths for positive ("+") spectral signals while the other one for negative ("−") spectral signals. The computed differential class scores of the sample object, Δs, are normalized and shown in the bar chart. FIG. 20C, same as in (FIG. 20A), but a back-end decoder ANN is introduced and jointly-trained with the front-end diffractive network, which helped to achieve a classification accuracy of 86.78%. The bar chart shows the normalized final class scores, s', given by the output of the decoder ANN. FIG. 20D, same as (FIG. 20C), but the standard diffractive network is replaced with a differential diffractive network design, and a classification accuracy of 87.68% is achieved.

DETAILED DESCRIPTION OF ILLUSTRATED EMBODIMENTS

Figure 1A:
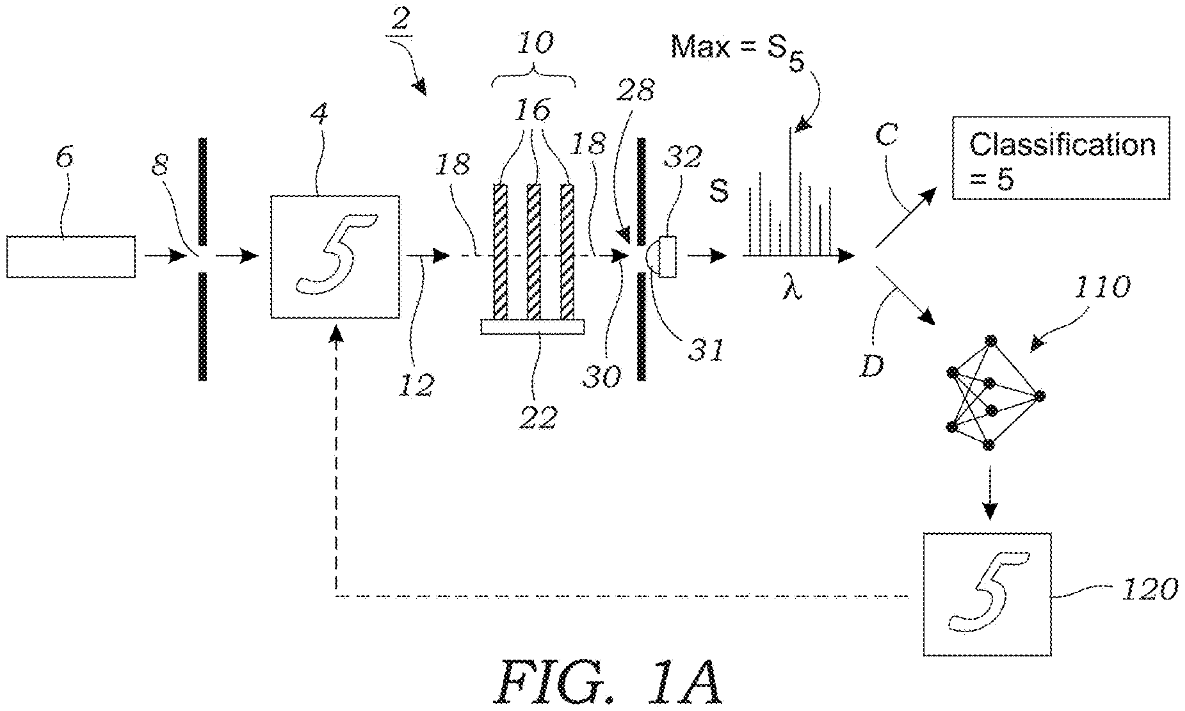
FIG. 1A schematically illustrate an embodiment of a system using diffractive spectral encoding for performing one or more of a machine vision task, machine learning task, and/or classification of one or more objects. In this embodiment, light is transmitted through the optically transmissive substrate layers. An optional thin or light trained neural network may also be used for image reconstruction to improve results.

FIG. 1A schematically illustrate an embodiment of a system 2 using diffractive spectral encoding for performing one or more of a machine vision task, machine learning task, and/or classification of one or more objects 4. The system 2, in some embodiments, includes a light source 6 that is used to illuminate the object 4. The object 4 may be macro-sized (i.e., large such as those visible without magnification) in some embodiments. In other embodiments, for example, for microscopic applications, the object 4 may be very small (e.g., microscopic). The light source 6 preferably emits a plurality or a continuum of wavelengths. In one example, this is a broadband light source. Alternatively, it may also include a light source 6 or multiple light sources 6 that emit light in a series of discrete frequency/wavelength lines (e.g., such as with a frequency comb). The object 4 may be illuminated with the light source 6 with the plurality or continuum of wavelengths simultaneously or sequentially. The light source 6 may, in some embodiments, include a natural light source (e.g., sunlight).

The light source 6 may also include an artificial light source such as a laser, light bulb, light emitting diode(s) (LED), laser diode(s), and the like. In some instances, the light source 6 may be filtered prior to illuminating the object 4. The light source 6 that illuminates the object 4 may include visible light (e.g., light with a wavelength in the range of about 380 nm to about 740 nm) as well as light outside the perception range of humans. For example, the wavelength operating range may extend beyond the visible perception range of humans (e.g., from about 300 nm to about 1,000 nm). The light source 6 may also emit light within the ultra-violet, visible, infrared, terahertz, millimeter, or radio portion of the electromagnetic spectrum.

Illumination of the object 4 by the light source may transmit through the object 4, reflect off the object 4, or combinations thereof. FIG. 1A illustrates a light source 6 transmitting light through an object 4 that is the form of the Arabic numeral 5. The light from the light source 6 first passes through an input aperture 8 and then through the object 4 (or reflects off the object 4) then is delivered along an optical path 18. The input aperture 8 may be optional in some embodiments.

The light from the object 4 enters a diffractive optical neural network device 10. The diffractive optical neural network devices 10 described herein may be used for machine learning, classification, and/or processing (separately or combinations thereof) of at least one optical image, optical signal, or optical data (e.g., optically encoded data). As seen in FIG. 1A, an optical input 12 is input to the diffractive optical neural network device 10. The optical input 12 may include an optical image, optical signal, or optical data as described herein. This may include, for example, images of one or more objects that are then classified by the diffractive optical neural network device 10. In some embodiments, the optical input 12 may include an image including one or more objects 4 therein. For example, an optical image 12 may be generated when a source of light directs light onto an object 4 (or multiple objects 4) which reflects off (or is transmitted through) and is directed through the diffractive optical network device 10. The object(s) may also emit their own optical signal 12 (e.g., emit fluorescence light). The object(s) 4 may be macro-sized (i.e., large such as those visible without magnification) in some embodiments. In other embodiments, for example, for microscopic applications, the object(s) may be very small (e.g., microscopic). Optical images may also be captured by a front-end camera or optical device and projected through the diffractive optical neural network device 10.

Figure 1B:
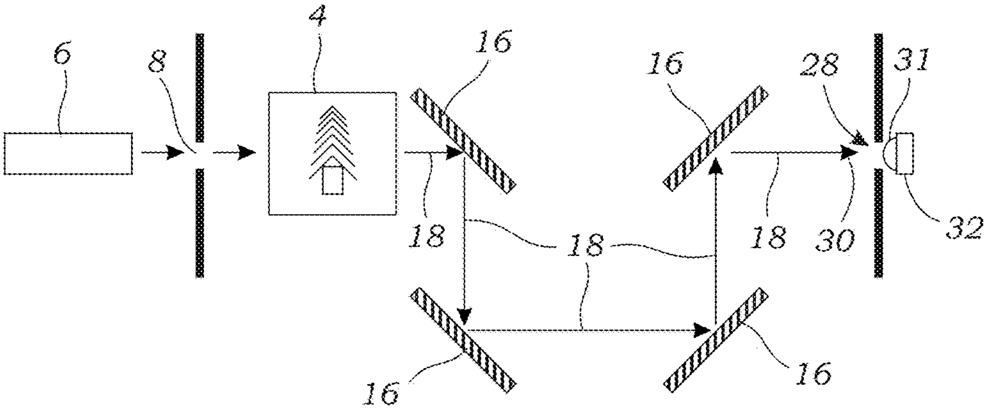
FIG. 1B illustrates another embodiment of a system using diffractive spectral encoding for performing one or more of a machine vision task, machine learning task, and/or classification of one or more objects. In this embodiment, light is reflected off the optically reflective substrate layers.

The diffractive optical neural network device 10 contains a plurality of optically transmissive and/or reflective substrate layers 16 arranged in one or more optical paths. The substrate layers 16 are formed as a physical substrate or matrix of optically transmissive material (for transmission mode such as illustrated in FIG. 1A) or optically reflective material (for reflective mode as illustrated in FIG. 1B). Combinations of optically transmissive and optically reflective substrate layers 16 may also be used.

FIG. 1A illustrates substrate layers 16 in transmission mode where light or optical radiation transmits and diffracts through the substrate layers 16. Exemplary materials that may be used for the substrate layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. In some embodiments, one or more substrate layers 16 of the diffractive network may comprise reconfigurable features such as, for example, spatial light modulators. That is to say the layers 16 of the optical may include reconfigurable regions within or on the substrate layers 16 using, for instance, spatial light modulators.

Each substrate layer 16 of the diffractive optical neural network device 10 has a plurality of physical features 20 (FIG. 1C) formed on the surface of the substrate layer 16 or within the substrate layer 16 itself that collectively define a pattern of physical locations along the length and width of each substrate layer 16 that have varied complex-valued transmission coefficients (or varied complex-valued transmission reflection coefficients). The physical features 20 formed on or in the substrate layers 16 thus create a pattern of physical locations on or within the substrate layers 16 that have different complex-valued transmission coefficients as a function of lateral coordinates (e.g., length and width and in some embodiments depth) across each substrate layer 16. In some embodiments, each separate physical feature 20 may define a discrete physical location on the substrate layer 16 while in other embodiments, multiple physical features 20 may combine or collectively define a physical region with a particular complex-valued transmission coefficient. These locations or regions on or in the substrate layers 16 form pixel or neuron-like regions that alter of affect the light that transmits/reflects therethrough or therefrom.

The plurality of substrate layers 16 that are arranged along the optical path 18 collectively define a trained mapping function between an input optical signal 12 from the object 4 to the plurality of substrate layers 16 and an output optical signal 30 that is created by optical diffraction through the plurality of substrate layers 16 (or reflection from the substrate layers 16). The pattern of physical locations formed by the physical features 20 may define, in some embodiments, an array located across the surface of the substrate layer 16. Additional details regarding the substrate layers 16 and physical features 20 that are formed thereon may be found in International Patent Application Publication No. WO 2019/200289, which is incorporated herein by reference.

Figure 1C:
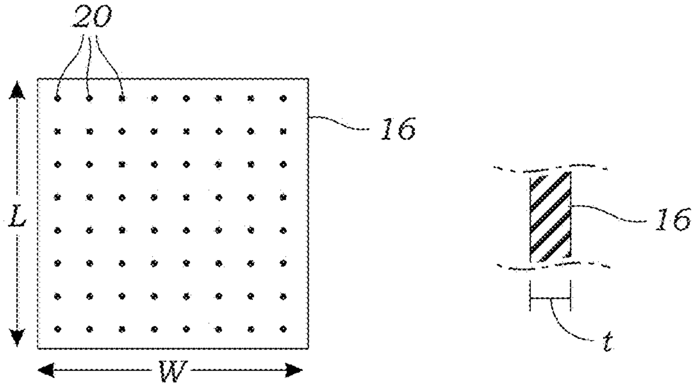
FIG. 1C illustrates an example of an optically transmissive/reflective substrate layer.

As seen in FIG. 1C, the substrate layer 16 in one embodiment is a two-dimensional generally planer substrate having a length (L), width (W), and thickness (t) that all may vary depending on the particular application. In other embodiments, the substrate layer 16 may be non-planer such as, for example, curved. The physical features 20 and the physical regions formed thereby act as artificial "neurons" that connect to other "neurons" of other substrate layers 16 of the optical neural network device 10 through optical diffraction (or reflection) and alter the phase and/or amplitude of the light wave. The particular number and density of the physical features 20 and the artificial neurons that are formed thereby in each substrate layer 16 may vary depending on the type of application. In some embodiments, the total number of artificial neurons may only need to be in the hundreds or thousands while in other embodiments, hundreds of thousands or millions of neurons or more may be used.

The light or optical radiation that forms the input optical signal 12 is directed through the substrate layers 16 of the diffractive optical network device 10 along an optical path 18 (or in other embodiments along multiple optical paths 18 such as seen in FIG. 1B). The substrate layers 16 are held within a holder 22 (e.g., mount, housing, or the like) that maintain the various substrate layers 16 in a fixed state whereby the various layers are separated from one another. The actual number of substrate layers 16 that collectively defined the diffractive optical network 10 may vary but is typically two (2) or more and less than ten (10), but may vary.

In some embodiments, the input optical signal 12 may originate from one or more objects 4 that illuminated from a light source 6 (e.g., artificial source of light or natural lighting (e.g., sun light). In still other embodiments, the object 4 may emit fluorescent light or emissive radiation in response to the light from the source of light 6. For example, the source of light 6 may act as an excitation light source and the diffractive optical network device 10 receives fluorescent light that is emitted from the object 4.

The output optical signal 30 is captured by a detector 32 or set of detectors 32. As seen in FIGS. 1A and 1B, an output aperture 28 is interposed between the last of the substrate layers 16 of the diffractive optical network device 10 and the detector 32. In some embodiments, the output aperture 28 may be omitted. In one embodiment, the detector 32 is a single-pixel spectroscopic detector. An optional lens 31 may be used to collect and concentrate and/or focus light on the active region of the detector 32. The detector 32 or set of detectors 32 is configured to sense the output optical signal(s) 30 from the diffractive optical network device 10. The detector 32 may include a single pixel detector in some embodiments or an array of pixels in a single detector 32. In other embodiments multiple separate detectors 32, for example, a set of detectors, may be used to capture spectroscopic optical signals (e.g., one detector 32 detects a first range of wavelengths while a second detector detects 32 another range of wavelengths, etc.) and effectively operate as a single "detector." The detector 32 may include CCD detectors, photomultiplier tube (PMT), photodiodes, and the like. The detector 32 or set of detectors 32 generates output signals or data 34 that used to perform the machine vision task, machine learning task, and/or classification of objects 4. The output signals or data 34 may be used directly or indirectly to perform the desired task or classification. For example, the detector 32 may generate a time domain signal (temporal signal) or data that contains (e.g., in its Fourier transform) output information of the diffractive optical neural network device 10 from the object 4. The detector 32 may also generate a spectral domain signal or data that directly reveals the output information of the diffractive optical neural network device 10 from the object 4.

The plurality of substrate layers 16 arranged along the optical path(s) 18 collectively define a trained function between the input optical signal 12 from the object 4 illuminated at a plurality or a continuum of wavelengths (i.e., the broadband light source) and the output optical signal(s) 30 corresponding to one or more unique wavelengths or sets of wavelengths within the plurality or the continuum of wavelengths assigned to represent distinct data classes, object types, or object classes created by optical diffraction and/or reflection through/off the plurality of optically transmissive/reflective substrate layers 16. The output optical signal(s) 30 from the diffractive optical neural network device 10 may comprise an optical signal that contains or encodes extracted features or feature representation scheme of the object(s) 4.

Figure 1D:
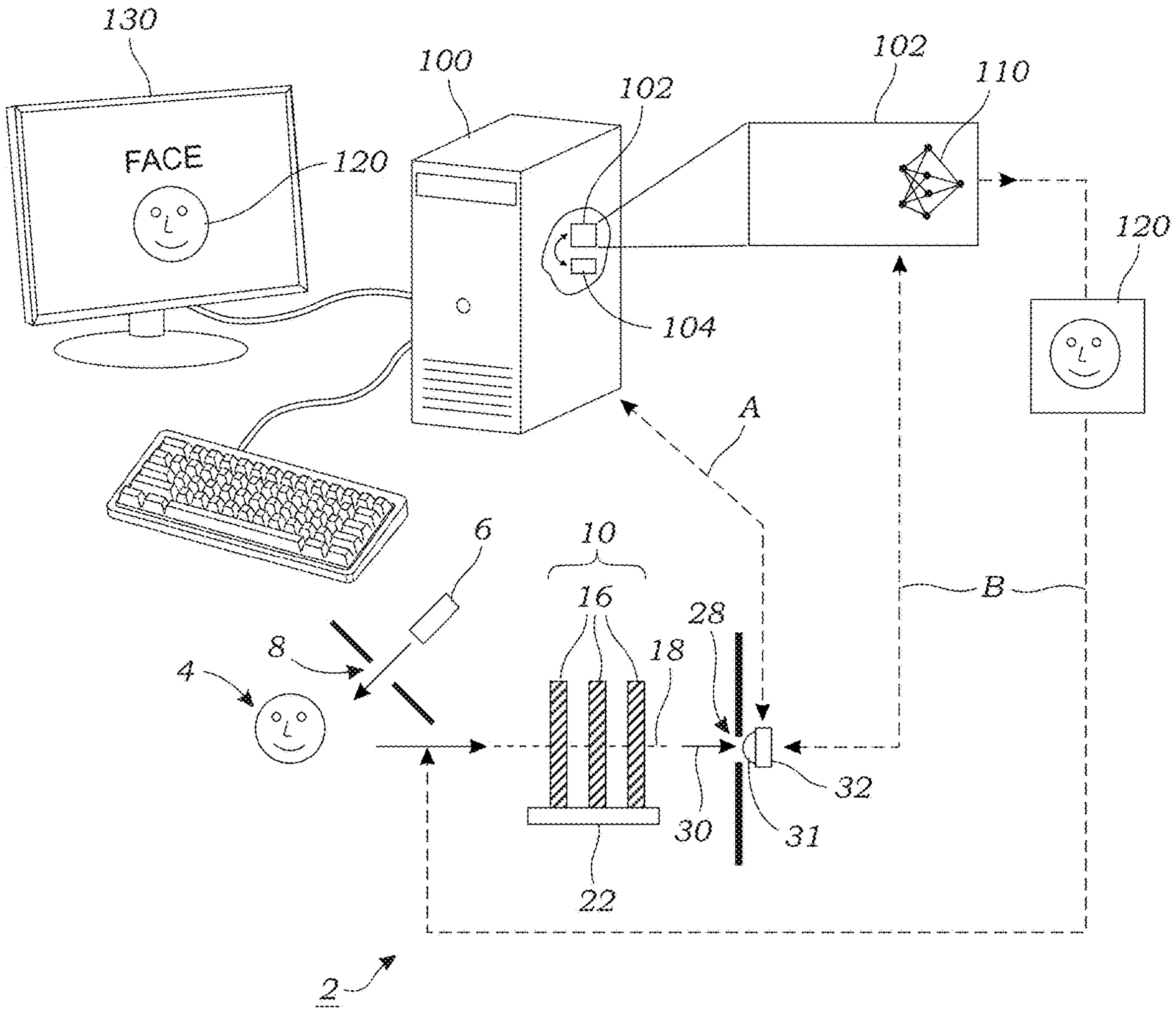
FIG. 1D illustrates a further embodiment of the system using diffractive spectral encoding for performing one or more of a machine vision task, machine learning task, and/or classification of one or more objects with the assistance of a computing device that executes software. An associated computing device is illustrated that is used to perform one or more of a machine vision task, machine learning task, and/or classification of one or more objects (classification is displayed in FIG. 1D). In some embodiments, a trained neural network is used for image reconstruction and to improve the results of FIG. 2 illustrates an alternative embodiment of the diffractive acoustic neural network device. In this embodiment, an acoustic signal (e.g., sound waves) is used instead of an optical (light) signal.

With reference to FIG. 1D, the system 2 may include, in some embodiments, an optional computing device 100 may be used to run software 102 that receives/transmits signals and/or data from/to the detector 32. The computing device 100 may include a computer or the like such as a personal computer, laptop, server, mobile computing device. The computing device 100 may run software 102 that performs a number of functions via one or more processors 104. This includes, for example, converting the raw temporal signal/data from the detector 32 into, for example, a power spectrum using a Fourier transform operation. For example, the Fourier transform functionality of off-the-shelf software like MATLAB may be used for this purpose. The software 102 may also be used to perform object classification or object typing using spectral class scores as described herein. This embodiment and the communication between the detector 32 and the software 102 is illustrated as arrow A in FIG. 1D. In some embodiments, the computing device 100 may run or execute a trained neural network 110 (sometimes also referred to as ANN) that performs image reconstruction (i.e., an image reconstruction neural network) as part of the software 102. For example, the trained neural network 110 may be implemented on Python or TensorFlow software as examples. In one example, the trained neural network 110 is a three layer fully-connected neural network with two hidden layers. Generally, the trained neural network 110 should have five or less hidden layers. As explained herein, in one embodiment, the trained neural network 110 receives an input of spectral class score vector (s) and outputs a reconstructed image 120 of the object 4. In another embodiment, the trained neural network 110 receives an input of spectral class score vector (s) and outputs a classification of the object 4.

The trained neural network 110 may be trained using at least one of the following: (i) a structural loss term, (ii) a cross entropy loss term, (iii) softmax-cross-entropy loss term, (iv) a diffractive network inference accuracy related penalty term, or (v) combinations of (i-iv) with different weights. The computing device 100 may execute an algorithm or software program 102 (or other dedicated hardware) may also be used to perform various post-processing operations of the output signals or data from the detector 32. This includes, by way of illustration, one or more operations of: Fourier transform, addition, subtraction, multiplication, standardization, peak detection or combinations thereof. As explained herein, in some embodiments, the reconstructed images 120 are fed back to the same diffractive optical neural network device 10 as new inputs to improve the inference accuracy of the same. This operation is illustrated by dashed arrows B in FIG. 1D. FIG. 1A illustrates how the diffractive optical neural network device 10 may work without the trained neural network 110 and perform classification (or other task) as seen in arrow C. Arrow D illustrates an alternative path in which the trained neural network 110 us used to improve the results by generating a reconstructed image 120 that is fed back to the diffractive optical network device 10. This may be accomplished by projecting the reconstructed image 120 back through the diffractive optical network device 10 using a projector or the like (not shown). In addition, as explained herein, in some embodiments, the trained neural network 110 may instead be trained to assist in object classification (or other task) instead of outputting or generating a reconstructed image 120.

The computing device 100 may have or be connected to a display 130 that can be used to display results of the machine vision task, machine learning task, and/or classification of objects 4. For example, FIG. 1D illustrates the classification of the object 4 as being a "FACE" which appears on the display 130. An image of the object 4 which may be reconstructed image 120 may also be present on the display 130. It should be appreciated that other data may be presented to the user on the display 130. This may include, for example, the power spectrum obtained from the object 4 or other statistical data associated with the machine vision task, machine learning task, and/or classification that is performed.

In some embodiments, the light from the light source 6 may pass through one or more dispersive elements (e.g., lens or set of lenses) prior to impinging on the substrate layers 16 of the diffractive optical neural network device 10. One or more dispersive elements may also be interposed between the output of the diffractive optical neural network device 10 and the detector 32. One or more waveguides may optionally be used to guide light from the diffractive optical neural network device 10 prior to arrival at the detector 32. These may include, by way of examples, optical fibers or the like.

Figure 2:
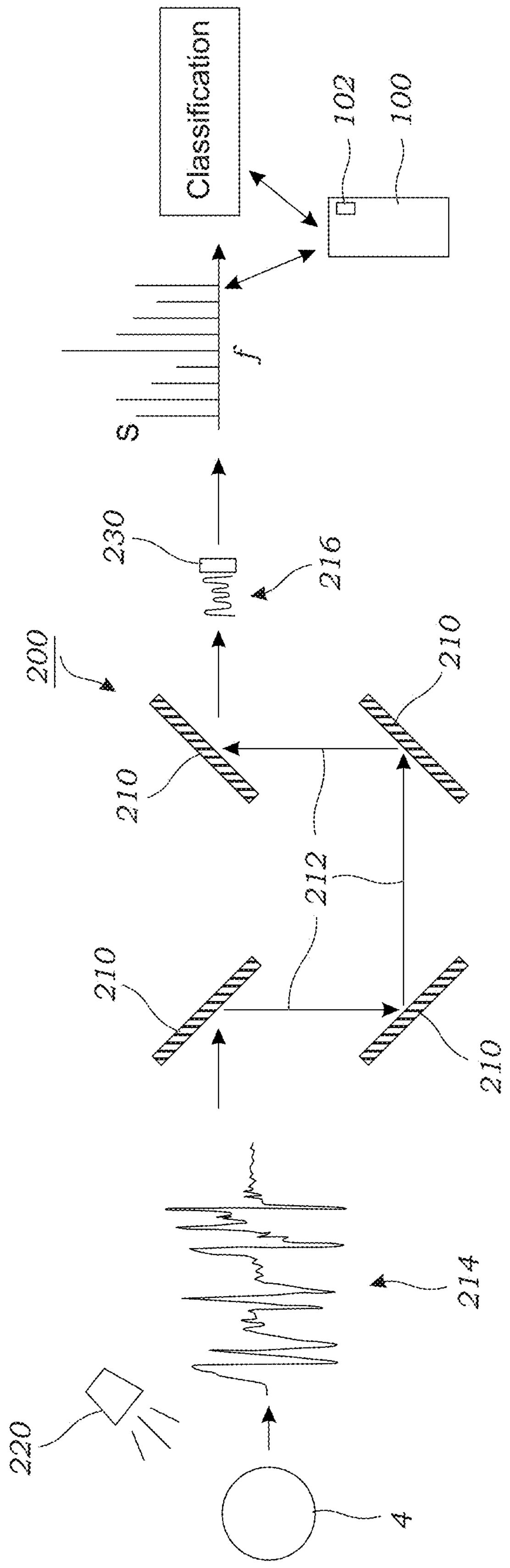

FIG. 2 illustrates an alternative embodiment of the diffractive acoustic neural network device 200. This embodiment operates under the same principles as the light-based embodiment but inputs an acoustic signal to the diffractive acoustic neural network device 200 and not light. The diffractive acoustic neural network device 200 comprising a plurality of acoustically transmissive and/or reflective substrate layers 210 arranged in a path 212, each of the plurality of acoustically transmissive and/or reflective substrate layers 210 comprising a plurality of physical features formed on or within the plurality of acoustically transmissive and/or reflective substrate layers and having different transmission/reflection coefficients or properties as a function of lateral coordinates across each substrate layer 210. In the embodiment of FIG. 2 shows a diffractive acoustic neural network device 200 which uses acoustically reflective substrate layers 210.

The plurality of acoustically transmissive and/or reflection substrate layers 210 and the plurality of physical features collectively define a trained function between an input acoustic signal 214 from the object 4 exposed to a plurality or a continuum of frequencies and an output acoustic signal 216 corresponding to one or more unique frequencies or sets of frequencies within the plurality or the continuum of frequencies assigned to represent distinct data classes or object types or object classes created by acoustic diffraction and/or reflection through/off the plurality of acoustically transmissive and/or reflective substrate layers 210.

In one embodiment, an acoustic source 220 is provided and configured to expose the object 4 and generate the input acoustic signal 214. Apertures (not shown) similar to apertures 8, 28 may be used at the front/back end of the diffractive acoustic neural network device 200 similar to the light embodiments of FIGS. 1A-1D. A detector 230 or set of detectors 230 are provided to receive the output acoustic signal 216 from the diffractive acoustic neural network device 200. As seen in FIG. 2, the sensed temporal signal from the detector 230 may then be converted into, for example, a power spectrum using a Fourier transform to identify the particular peak frequency (or wavelength) that is used to classify the object 4.

Experimental

Results

Figure 3A:
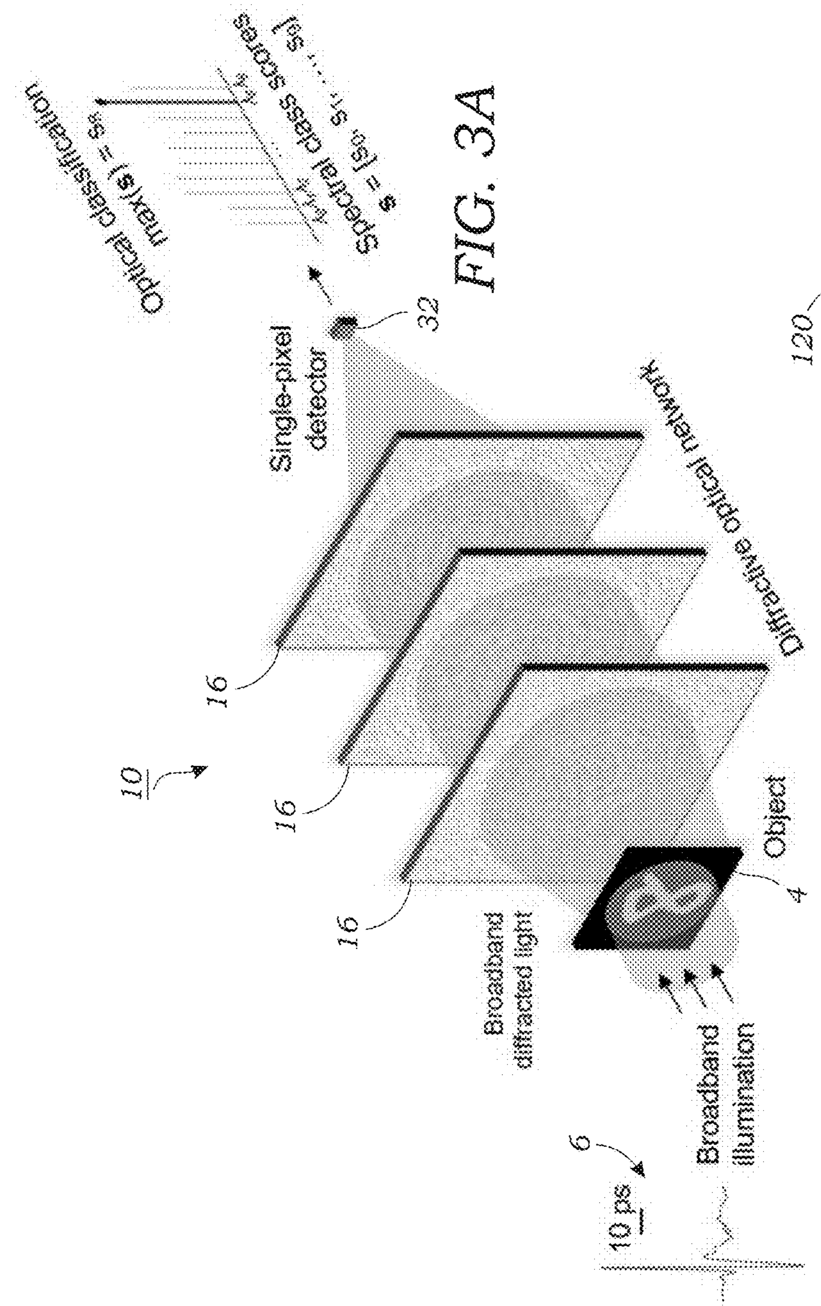
FIGS. 3A-3B schematically illustrate spectrally-encoded machine vision/task/classification framework for object classification and image reconstruction.

FIG. 3A illustrates the machine vision framework based on spectral encoding using the diffractive optical neural network device 10. A broadband diffractive optical neural network device 10 is trained to transform the spatial information of the objects 4 into the spectral domain through a pre-selected set of class-specific wavelengths measured by a single-pixel spectroscopic detector 32 at the output plane; the resulting spectral class scores are denoted by the vector $s=[s_0, s_1, \ldots, s_9]$ (FIG. 3A). Because the learning task assigned to the diffractive optical neural network device 10 is the optical classification of handwritten digits (MNIST database), after its training and design phase, for a given input image it learns to channel more power to the spectral component assigned to the correct class (e.g., digit '8' in FIG. 3A) compared to the other class scores; therefore, max(s) reveals the correct data class. As demonstrated in FIG. 3B, the same class score vector, s, can also be used as an input to a shallow trained neural network 110 to reconstruct an image of the input object 4, decoding the spectral encoding performed by the broadband diffractive network 10. Of course, other learning tasks may be used in accordance with the invention.

Based on the system architecture shown in FIG. 3A, broadband diffractive optical neural network devices 10 were trained by taking the thickness of each pixel of a diffractive layer 16 as a learnable variable (sampled at a lateral period of $\lambda_{min}/2$, where $\lambda_{min}$ refers to the smallest wavelength of the illumination bandwidth), and accordingly defined a training loss ($\mathcal{L}_D$) for a given diffractive network design:

$$\mathcal{L}_D = \mathcal{L}_I + \alpha \cdot \mathcal{L}_E + \beta \cdot \mathcal{L}_P, \quad (1)$$

where $\mathcal{L}_I$ and $\mathcal{L}_E$ refer to the loss terms related to the optical inference task (e.g., object classification) and the diffractive power efficiency at the output detector 32, respectively (see Material and Methods section for details). The spatial purity loss, $\mathcal{L}_P$, on the other hand, has a rather unique aim of clearing the light intensity over a small region of interest surrounding the active area of the single-pixel detector 32 to improve the robustness of the machine vision system for uncontrolled lateral displacements of the detector 32 position with respect to the optical axis (see Material and Methods for detailed definitions of $\mathcal{L}_I$, $\mathcal{L}_E$ and $\mathcal{L}_P$). The hyperparameters, α and β, control the balance between the three major design factors represented by these training loss terms.

To exemplify the performance of this design framework as a function of different parameters, with ten class-specific wavelengths uniformly distributed between $\lambda_{min}$=1.0 mm and $\lambda_{max}$=1.45 mm, a 3-layer 16 diffractive optical neural network device 10 with α=β=0 can achieve >96% blind testing accuracy for spectrally encoded optical classification of handwritten digits (see Table 1, $4^{th}$ row). Fine tuning of the hyperparameters, α and β, yields broadband diffractive optical neural network device 10 designs that provide improved diffractive power efficiency at the single-pixel detector 32 and partial insensitivity to misalignments without excessively sacrificing inference accuracy. For example, using α=0.03 and β=0.1, 95.05% blind testing accuracy was obtained for spectrally encoded optical classification of handwritten digits with ~1% inference accuracy drop compared to the diffractive model trained with α=β=0, while at the same time achieving ~8 times higher diffractive power efficiency at the output detector 32 (see Table 1). FIG. 4B illustrates the resulting layer thickness distributions of the substrate layers 16 of this diffractive optical neural network device 10 trained with α=0.03 and β=0.1, setting a well-engineered example of the balance among inference accuracy, diffractive power efficiency at the output detector 32 and misalignment resilience of the diffractive optical neural network device 10.

Figure 4A:
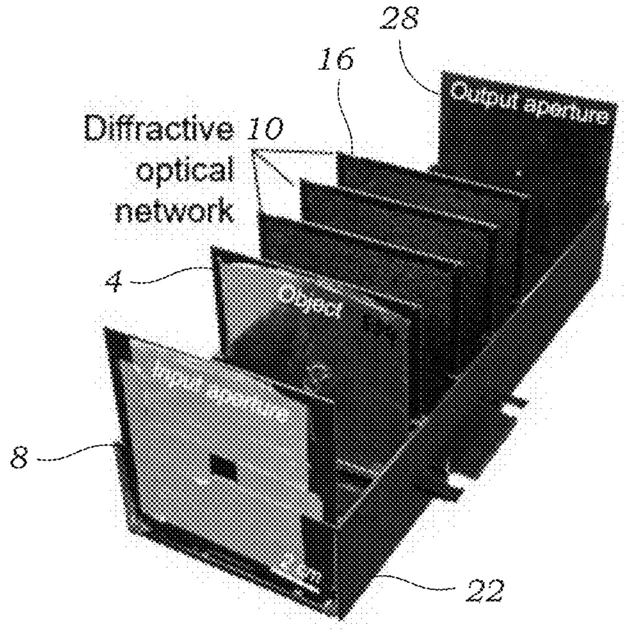
FIGS. 4A-4D: Experimental setup is illustrated.
Figure 4B:
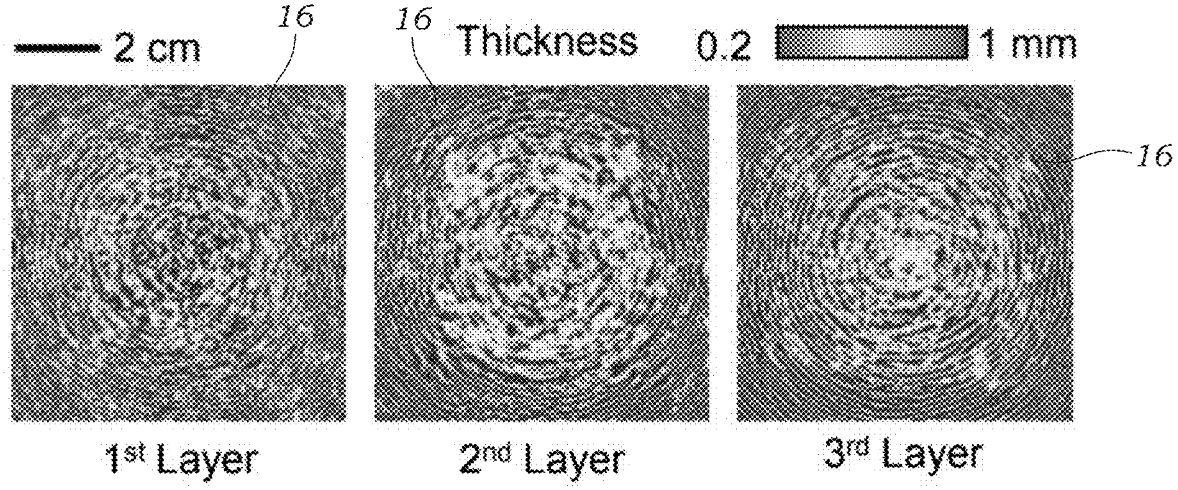
Figure 4C:
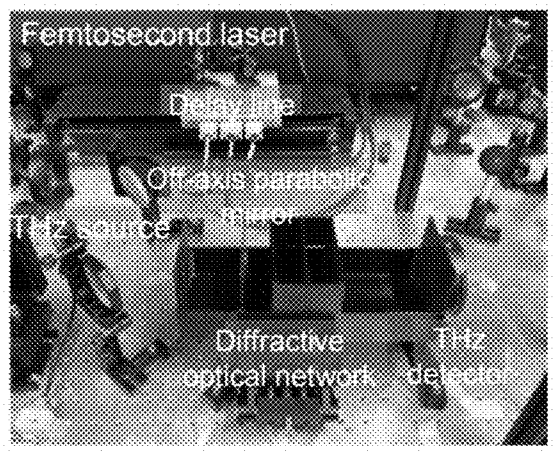
Figure 4D:
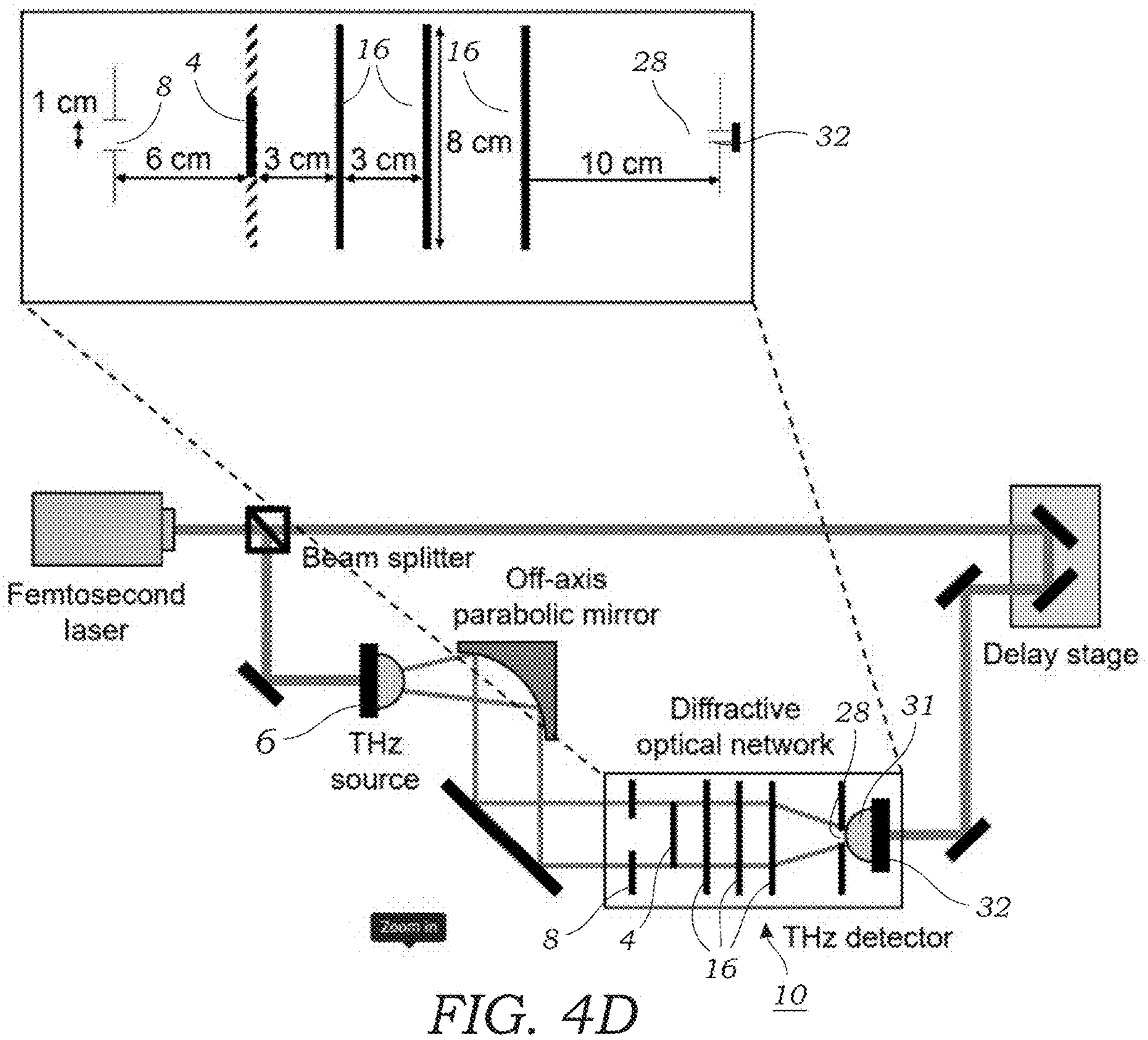
Figure 5A:
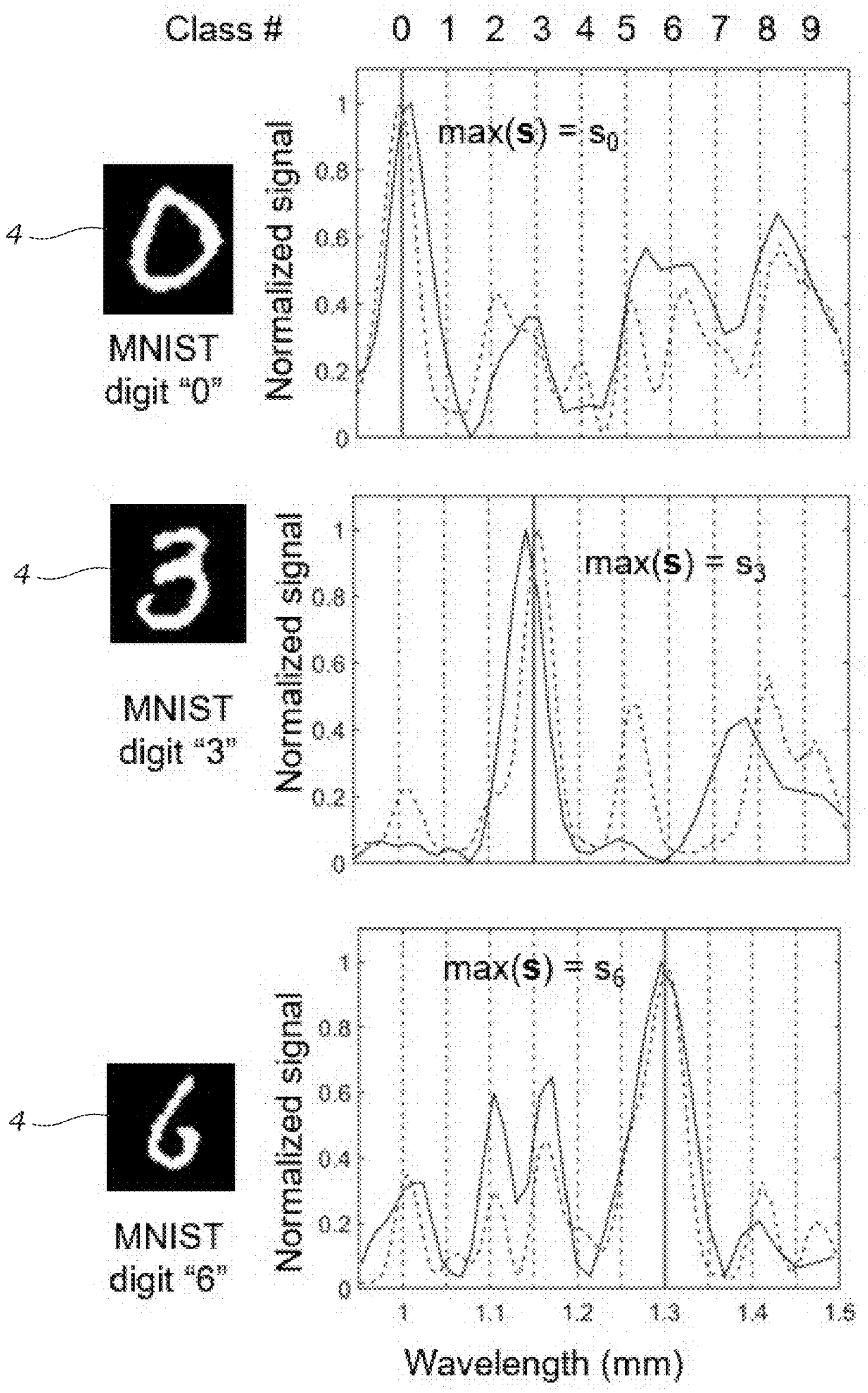
FIGS. 5A-5C: Spectrally encoded optical classification of handwritten digits with a single output detector.
Figure 5B:
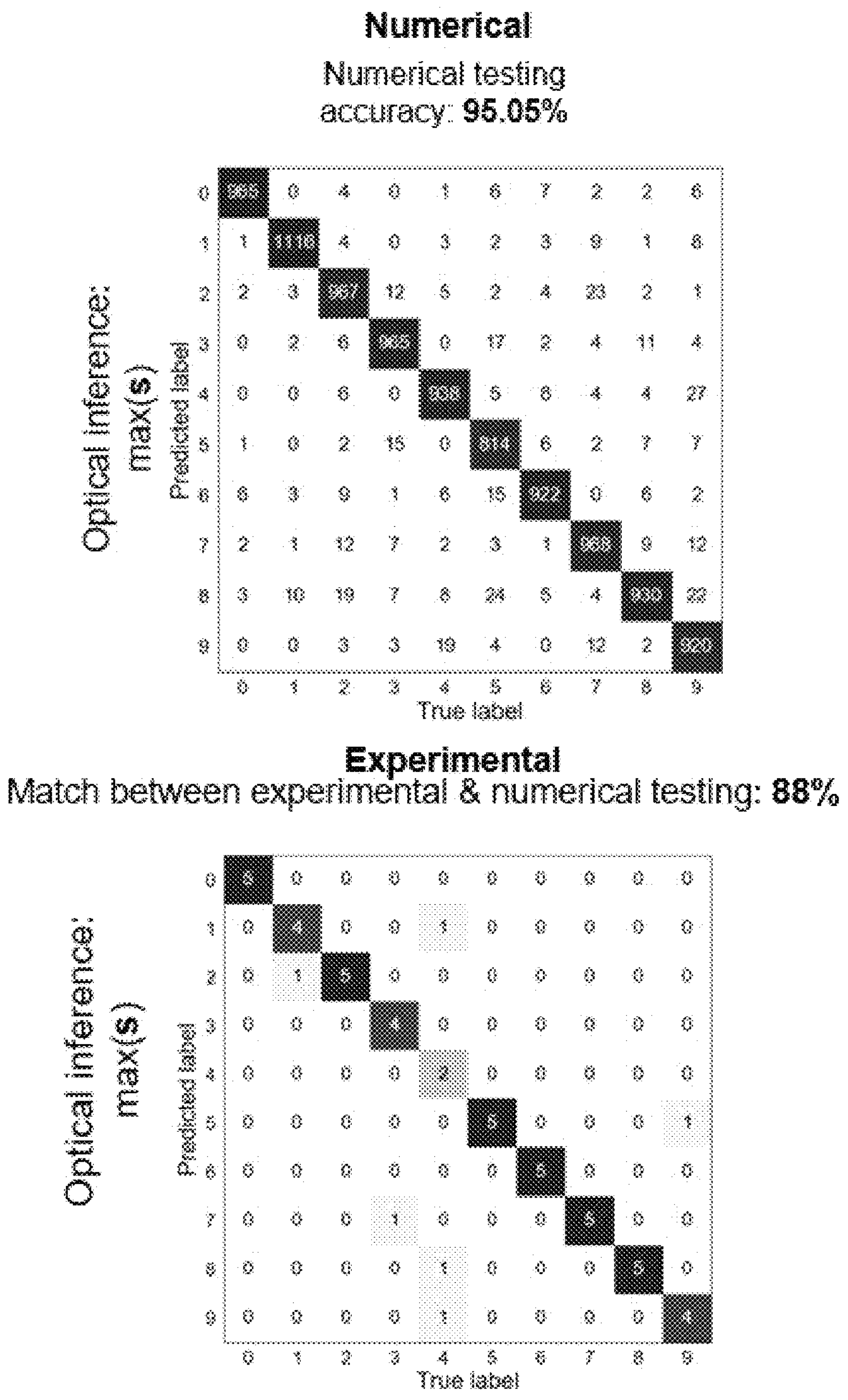

Next, the substrate layers 16 shown in FIG. 4B were manufactured (trained with α=0.03, β=0.1 to achieve 95.05% blind testing accuracy) along with 50 handwritten digits (5 per digit) randomly selected from the correctly classified blind testing samples using 3D-printing (see FIG. 4A for the resulting diffractive optical neural network device 10). FIG. 4C also shows the THz-TDS experimental setup with a plasmonic photoconductive detector 32 that was used for the experimental validation of the machine vision framework. In this setup, the light emerging from a plasmonic photoconductive pulsed terahertz source 6 is collimated and directed toward a square aperture 8 with an area of 1 $cm^2$ (FIG. 4D), which serves as an entrance pupil to illuminate an unknown input object 4 to be classified. As shown in FIG. 4D, there are no optical components or modulation layers between the illumination aperture 8 and the object plane, indicating that there is no direct mapping between the spatial coordinates of the object plane and the spectral components of the illumination beam. Based on this experimental setup, the comparison between the power spectrum numerically generated using the forward optical model (dashed line) and its experimentally measured counterpart (straight line) for 3 fabricated digits, as examples, is illustrated in FIG. 5A, providing a good match between the two spectra, also revealing the correct class inference in each case through max(s). Despite 3D-printing errors, possible misalignments and other sources of error in the setup, the match between the experimental and numerical testing of the diffractive optical neural network device 10 design was found to be 88% using 50 handwritten digits that were 3D-printed (see FIG. 5B).

Figure 3B:
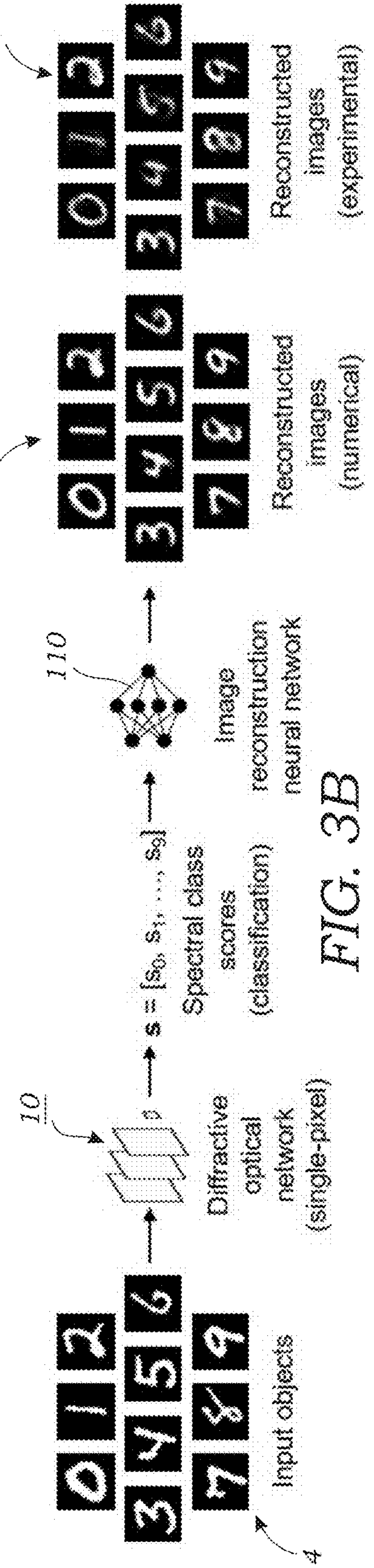

For the same 3D-printed diffractive optical neural network device 10 (FIGS. 4A, 4B), a shallow, fully-connected trained neural network 110 was trained with only 2 hidden layers in order to reconstruct images 120 of the input objects 4 based on the detected s. The training of this decoder neural network 110 is based on the knowledge of: (1) class scores ($s=[s_0, s_1, \ldots, s_9]$) resulting from the numerical diffractive network model, and (2) the corresponding input object images. Without any fine tuning of the network parameters for possible deviations between the numerical forward model and the experimental setup, when the shallow, trained neural network 110 was blindly tested on the experimental measurements (s), the reconstructions of the images of the handwritten digits were successful as illustrated in FIG. 3B (also see FIGS. 13A-13B, 14A-14B), further validating the presented framework as well as the experimental robustness of the diffractive optical neural network device 10 (see Materials and Methods section for further details). It should be emphasized that this shallow, trained neural network 110 ANN is trained to decode a highly compressed form of information that is spectrally-encoded by a diffractive front-end and it uses only ten (10) numbers (i.e., $s_0, s_1, \ldots, s_9$) at its input to reconstruct an image 120 that has >780 pixels. Stated differently this trained neural network 110 performs task-specific super-resolution, the task being the reconstruction of the images 120 of handwritten digits based on spectrally-encoded inputs. In addition to performing task-specific image reconstruction, the proposed machine vision framework can possibly be extended for the design of a general-purpose, high-resolution, single-pixel imaging system based on spectral encoding.

Figure 5C:
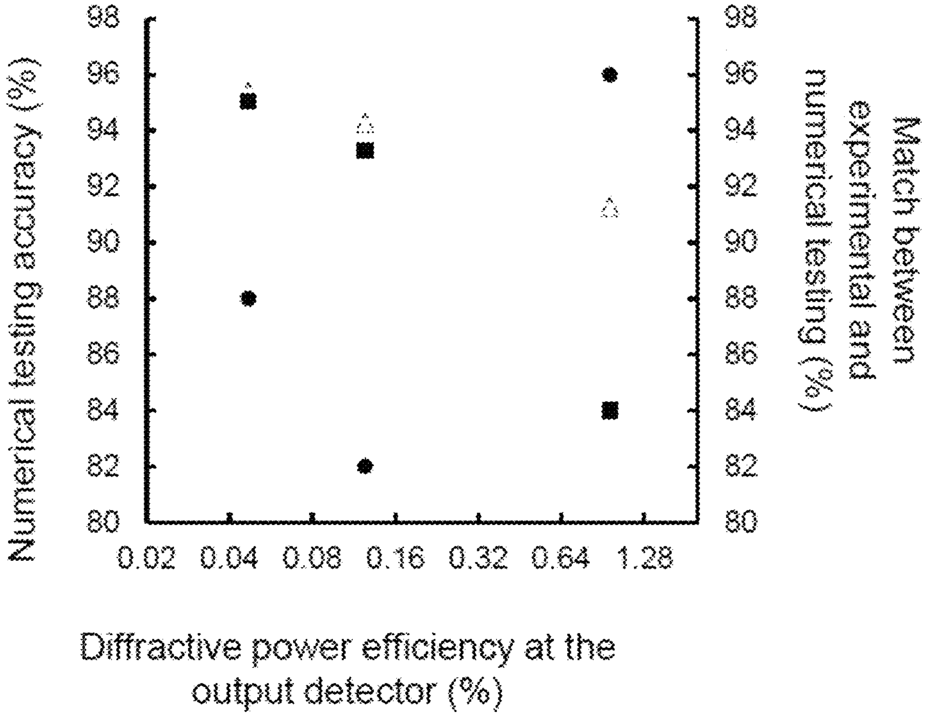

In addition to the diffractive optical neural network device 10 shown in FIGS. 4A-4D that achieved a numerical blind testing accuracy of 95.05%, two additional diffractive optical neural network devices 10 were also 3D-fabricated and experimentally tested to further evaluate the match between the numerical models and their experimental/physical counterparts. By using different (α, β) pairs for the loss function defined in Eq. (1), the balance between the optical inference accuracy and the two practical design merits, i.e., the diffractive power efficiency at the output detector 32 and the insensitivity to misalignments, is shifted in these two new diffractive designs in favor of experimental robustness, with the expectation of a better match between the numerical and experimental results. Performance comparisons of these diffractive optical neural network models/devices 10 is summarized in Table 1 and FIG. 5C; for example, using α=0.4 and β=0.2, the blind testing accuracy attained by the same 3-layer diffractive network architecture decreased to 84.02% for the handwritten digit classification task, while the diffractive power efficiency at the output detector 32 increased by a factor of ~160 as well as the match between the experimental and numerical testing results increased to 96%. These results, as summarized in FIG. 5C and Table 1, further demonstrate the trade-off between the inference accuracy and the diffraction efficiency and experimental robustness of the diffractive network models.

Figure 9:
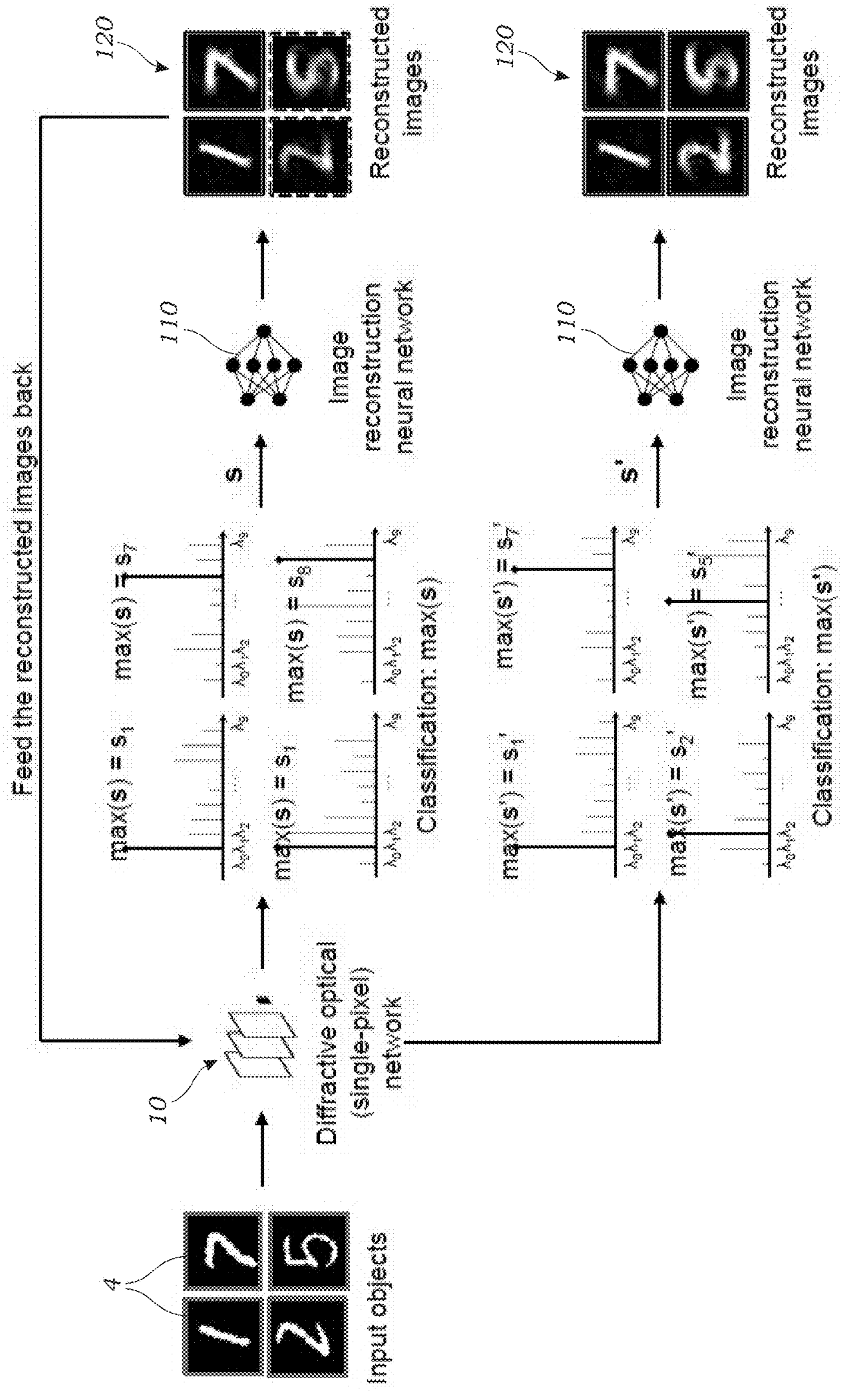
FIG. 9: Illustration of the collaboration between the image reconstruction decoder ANN and the spectral encoding diffractive optical network. Same as in FIG. 6, except for the diffractive network design reported in the $3^{rd}$ row of Table 1. The blind testing accuracy of this diffractive optical network for handwritten digit classification increased from 95.05% to 95.37% using this image feedback loop (see FIGS. 5C, 7B and Table 1). The image reconstruction ANN was trained using the BerHu loss defined in Eq. (23) and softmax-cross-entropy loss reported in Eq. (17).
Figure 10A:
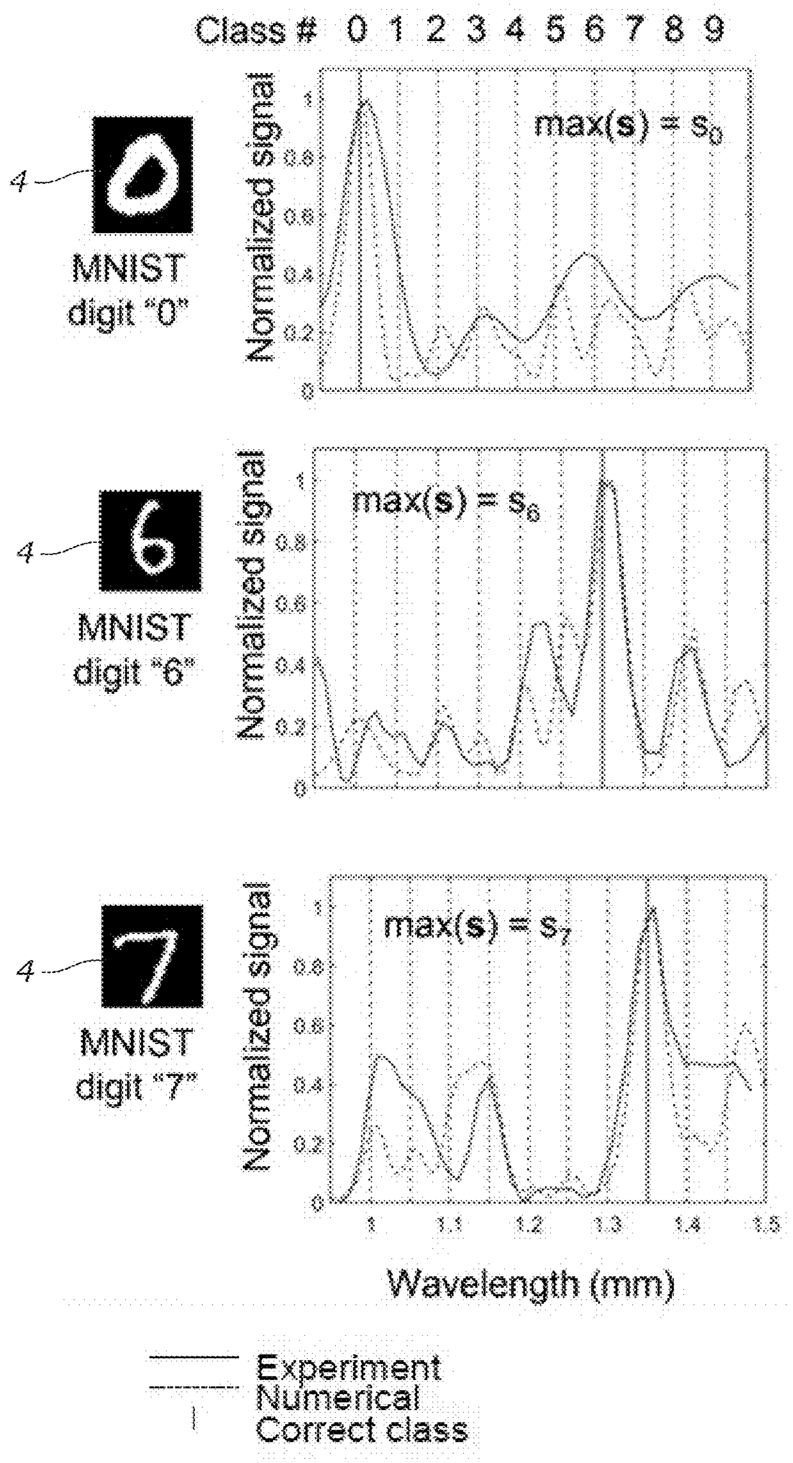
FIG. 10A: Blind testing performance of a diffractive optical network using spectral encoding and its coupling with a corresponding decoder ANN.
Figure 10B:
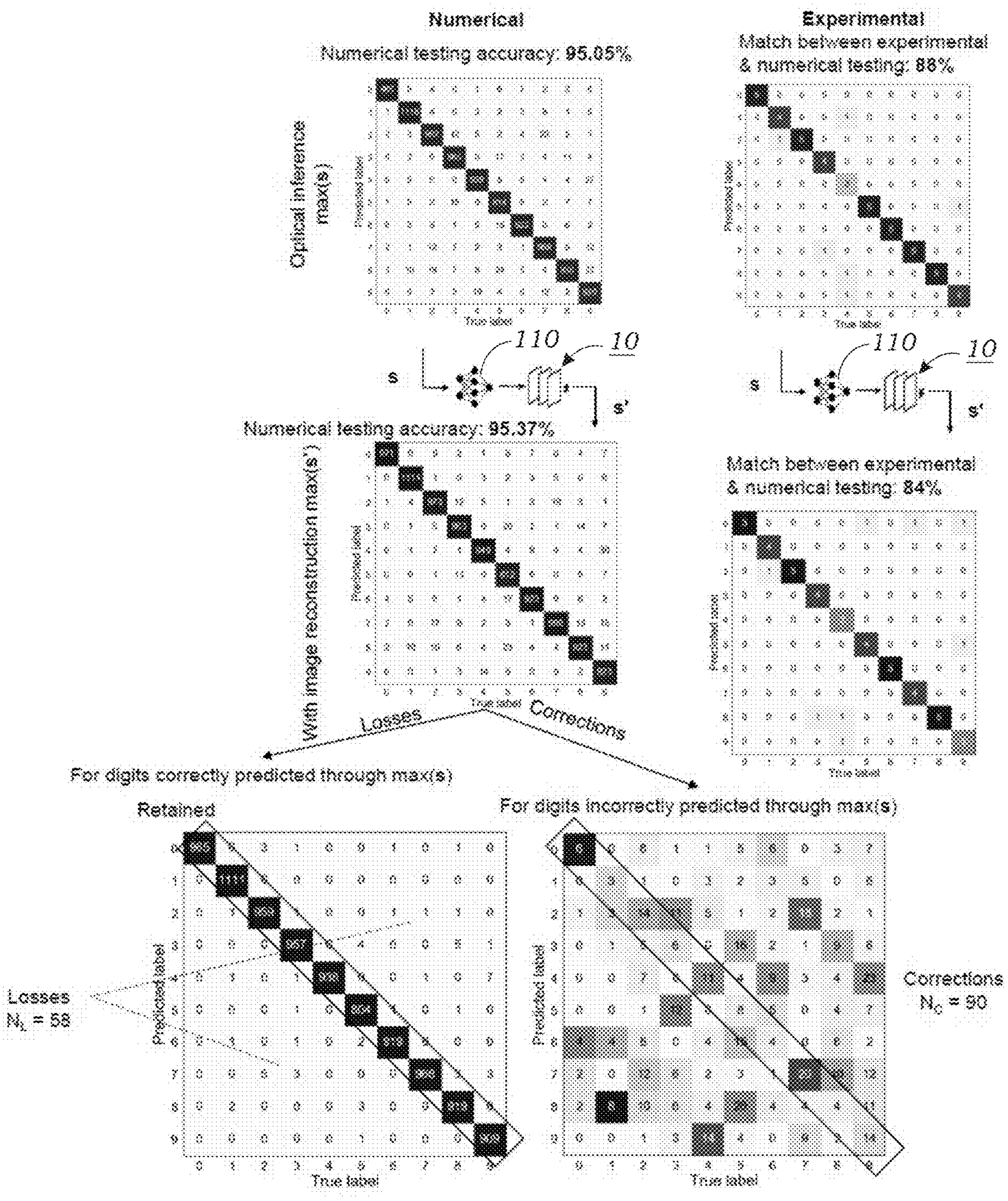
FIG. 10B: Illustrates numerical and experimental confusion matrices. Top left: confusion matrix summarizing the numerical classification performance of the diffractive optical network that attains a classification accuracy of 95.05% over 10,000 handwritten digits in the blind testing image set. Top right: confusion matrix for the experimental results obtained by 3D-printing 50 handwritten digits randomly selected from the numerically successful classification samples in the blind testing set. An 88% match between experimentally inferred and numerically computed object classes is observed. Middle left: confusion matrix provided by max(s') computed by feeding the reconstructed images back to the diffractive network. A blind testing accuracy of 95.37% is achieved, demonstrating a classification accuracy improvement (0.32%). Middle right: confusion matrix for the experimental results using the same 50 digits. Lower left: same as the middle left matrix in (FIG. 10B), but solely for the digits that are correctly predicted by the optical network (corresponding to the diagonal entries in the top left confusion matrix in (FIG. 10B)). Its diagonal entries can be interpreted as the digits that are retained to be correctly predicted, while its off-diagonal entries represent the "losses" after the image reconstruction and feedback process. Lower right: same as the left one, but solely for the digits that are incorrectly classified by the optical network (corresponding to the off-diagonal entries in the top left matrix in (FIG. 10B)). Its diagonal entries indicate the classification "corrections" after the image reconstruction and feedback process, while its off-diagonal entries represent the ones that remained to be wrongly classified. The number $N_C-N_L=32$ is the classification accuracy "gain" achieved through max(s'), corresponding to a 0.32% increase in the numerical testing accuracy of the diffractive model (also see FIG. 5C).
Figure 11A:
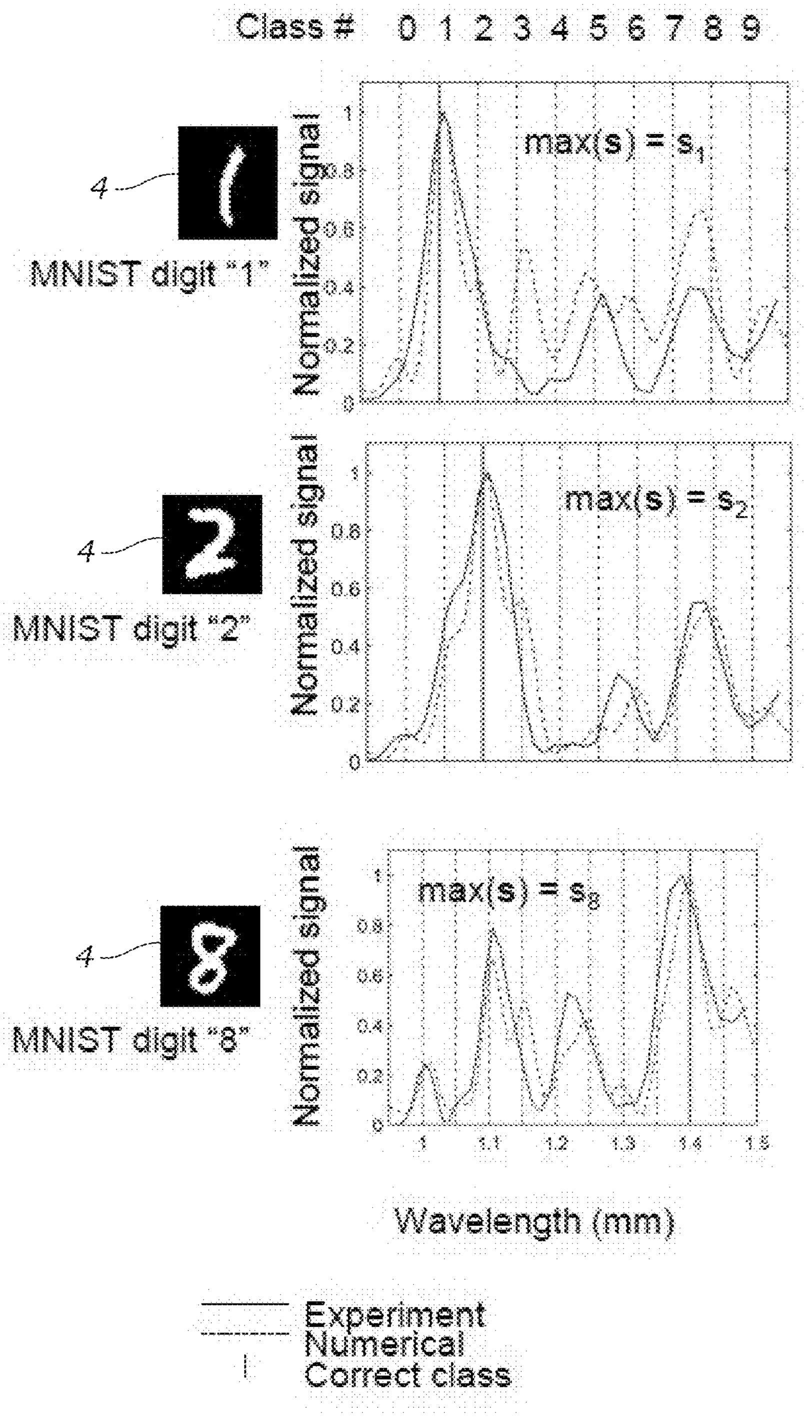
FIGS. 11A-11B: Illustrate blind testing performance of a diffractive optical network using spectral encoding and its coupling with a corresponding decoder ANN. Same as in FIGS. 10A-10B, except for the diffractive network design reported in the $2^{nd}$ row of Table 1. The number $N_C-N_L=74$ is the classification accuracy "gain" achieved through max(s'), corresponding to a 0.74% increase in the numerical testing accuracy of the diffractive model (also see FIG. 5C).
Figure 11B:
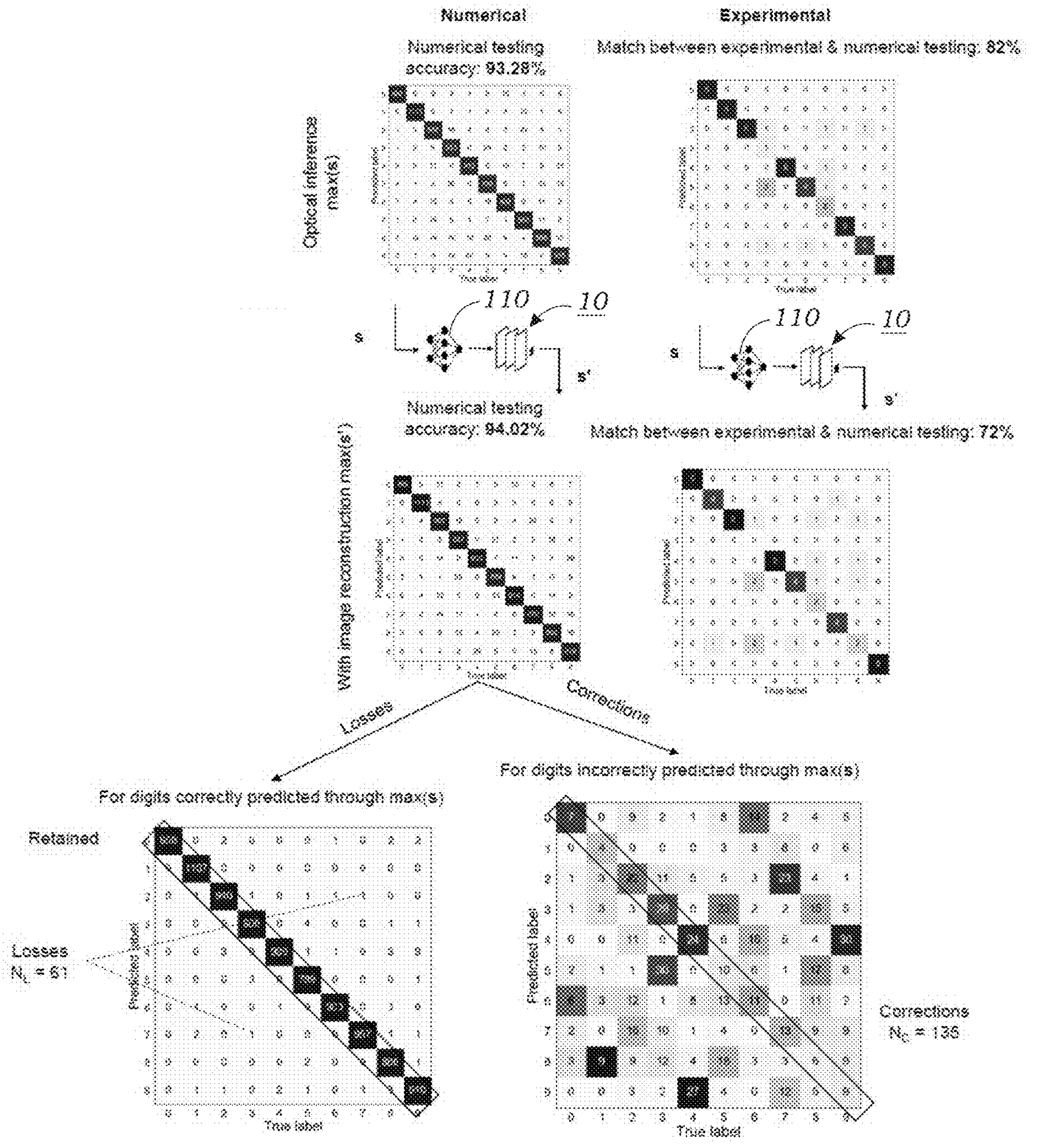

To provide a mitigation strategy for this trade-off, a collaboration framework was introduced between the diffractive optical neural network device 10 and its corresponding trained neural network 110 (for image reconstruction). This collaboration is based on the fact that the decoder trained neural network 110 can faithfully reconstruct the images 120 of the input objects 4 using the spectral encoding present in s, even if the optical classification is incorrect, pointing to a wrong class through max(s). It was observed that by feeding the reconstructed images 120 from the trained neural network 110 back to the diffractive optical neural network device 10 as new inputs it can correct its initial wrong inference (see FIG. 6 and FIG. 9). Through this collaboration between the diffractive optical neural network device 10 and its corresponding trained neural network 110, the overall inference accuracy of a given diffractive network model was improved as summarized in FIG. 5C and Table 1. For example, for the same, highly-efficient diffractive optical neural network model that was trained using α=0.4 and β=0.2, the blind testing accuracy for handwritten digit classification increased from 84.02% to 91.29% (see FIGS. 5C and 7B), demonstrating a substantial improvement through the collaboration between the trained neural network 110 and the broadband diffractive optical neural network device 10. A close examination of FIGS. 5A-5C and the provided confusion matrices reveals that the trained neural network 110 (i.e., decoder), through its image reconstruction, helped to correct 870 misclassifications of the diffractive optical neural network device 10 (FIG. 7B), while there were also a smaller number of losses (143) which are the handwritten digits that were initially correctly classified by the diffractive optical neural network device 10, but were later misclassified through the reconstructed input images; this results in an overall gain/improvement of 7.27% in the blind inference performance of the optical network. Similar analyses for the other diffractive optical neural network models are also presented in FIGS. 10A-10B, 11A-11B, 12A-12B.

In this collaboration between the diffractive optical neural network model/device 10 and its corresponding shallow, trained neural network 110, the training loss function of the latter was coupled to the classification performance of the diffractive optical neural network model/device 10. In other words, in addition to a structural loss function ($\mathcal{L}_S$) that is needed for a high-fidelity image reconstruction, a second loss term was added that penalized the neural network 110 by a certain weight if its reconstructed image 120 cannot be correctly classified by the diffractive optical neural network model/device 10 (see the Materials and Methods section). This ensures that the collaboration between the optical encoder and its corresponding decoder (i.e., trained neural network 110) is constructive, i.e., the overall classification accuracy is improved through the feedback of the reconstructed images 120 onto the diffractive optical neural network model/device 10 as new inputs. Based on this collaboration scheme, the general loss function of the decoder trained neural network 110 can be expressed as:

$$\mathcal{L}_{Recon} = \gamma \cdot \mathcal{L}_S(O_{recon}, O_{input}) + (1-\gamma) \cdot \mathcal{L}_I, \tag{2}$$

where $\mathcal{L}_S$ refers to structural loss, e.g., Mean Absolute Error (MAE) or reversed Huber ("BerHu") loss, which are computed through pixel-wise comparison of the reconstructed image ($O_{recon}$) with the ground truth object image ($O_{input}$) (see Materials and Methods section for details). The second term in Eq. (2), $\mathcal{L}_I$, refers to the same loss function used in the training of the diffractive optical neural network model/device 10 (front-end) as in Eq. (1), except this time it is computed over the new class scores, s', obtained by feeding the reconstructed image, $O_{recon}$, back to the same diffractive optical neural network model/device 10 (see FIG. 7B and FIGS. 8A and 8B). Eq. (2) is only concerned with the training of the image reconstruction trained neural network 110, and therefore, the parameters of the decoder trained neural network 110 are updated through standard error backpropagation, while the diffractive optical neural network model is preserved.

Table 1 summarizes the performance comparison of different loss functions employed to train the decoder trained neural network 110 and their impact on the improvement of the classification performance of the diffractive optical neural network device 10. Compared to the case when $\gamma$=1, which refers to independent training of the reconstruction trained neural network 110 without taking into account $\mathcal{L}_I$, one sees significant improvements in the inference accuracy of the diffractive optical neural network model through max(s') when the trained neural network 110 has been penalized during its training (with e.g., $\gamma$=0.95) if its reconstructed images 120 cannot be correctly classified by the diffractive optical neural network model (refer to the Materials and Methods section for further details). Stated differently, the use of $\mathcal{L}_I$ term in Eq. (2) for the training of the decoder trained neural network 110 tailors the image reconstruction space to generate object features that are more favorable for the diffractive optical classification, while also retaining its reconstruction fidelity to the ground truth object, $O_{input}$ by the courtesy of the structural loss term, $\mathcal{L}_S$, in Eq. (2).

TABLE 1

Figure 12A:
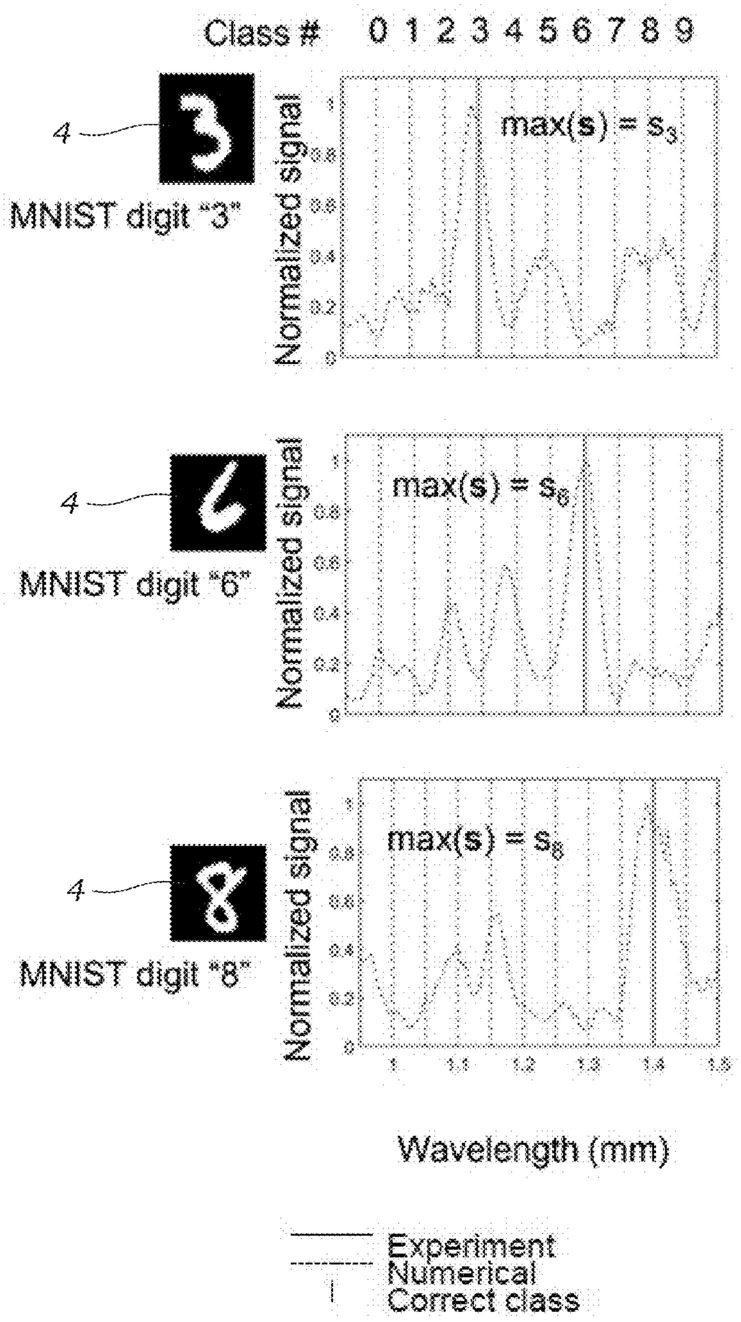
FIGS. 12A-12B: Illustrate blind testing performance of a diffractive optical network using spectral encoding and its coupling with a corresponding decoder ANN. Same as in FIGS. 10A-10B, except for the diffractive network design reported in the $4^{th}$ row of Table 1. The number $N_C-N_L=23$ is the classification accuracy "gain" achieved through max(s'), corresponding to a 0.23% increase in the numerical testing accuracy of the diffractive model.
Figure 12B:
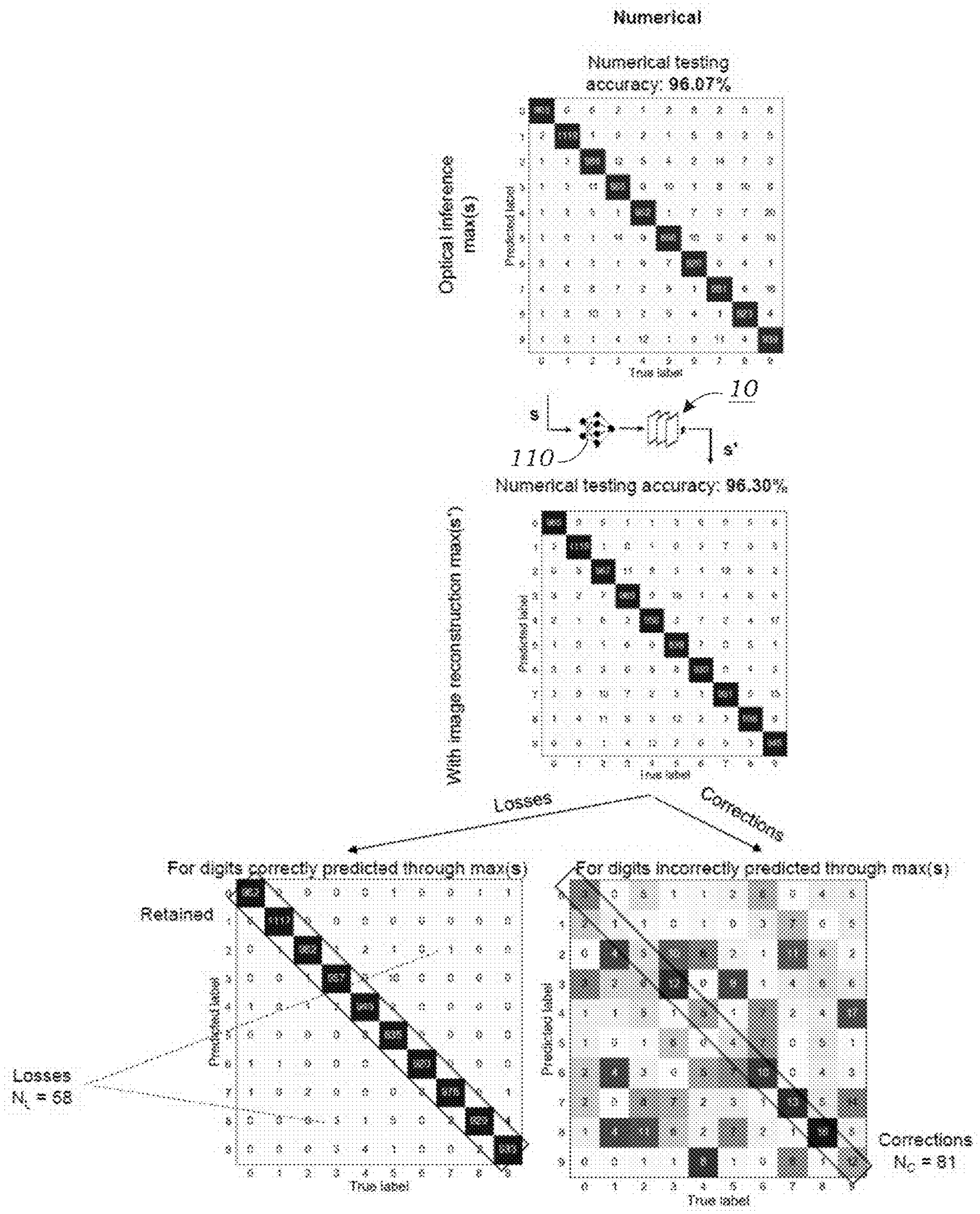
Figure 13A:
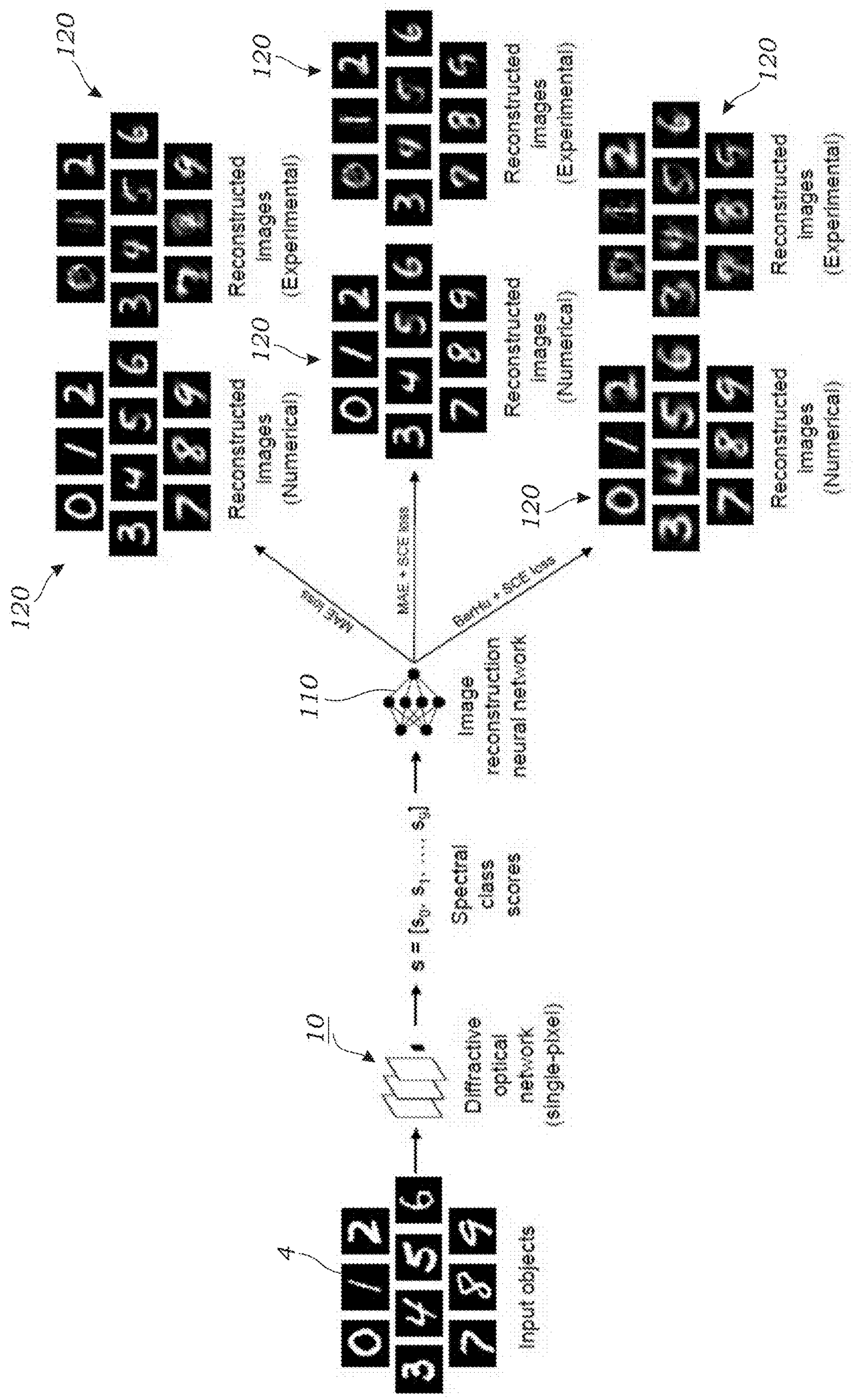
FIG. 13A: Image reconstruction results using decoder ANNs trained with different loss functions. The images of the input objects reconstructed from both numerically predicted and experimentally measured spectral class scores, s, are shown. The diffractive optical network that provides a blind testing accuracy of 95.05% is used here ($3^{rd}$ row of Table 1). Each image of a handwritten digit is composed of >780 pixels, and the shallow image reconstruction ANN with 2-hidden layers receives an input vector size of 10 ($s=[s_0, s_1, \ldots, s_9]$) to successfully decode the task-specific spectral encoding of the diffractive optical network.
Figure 13B:
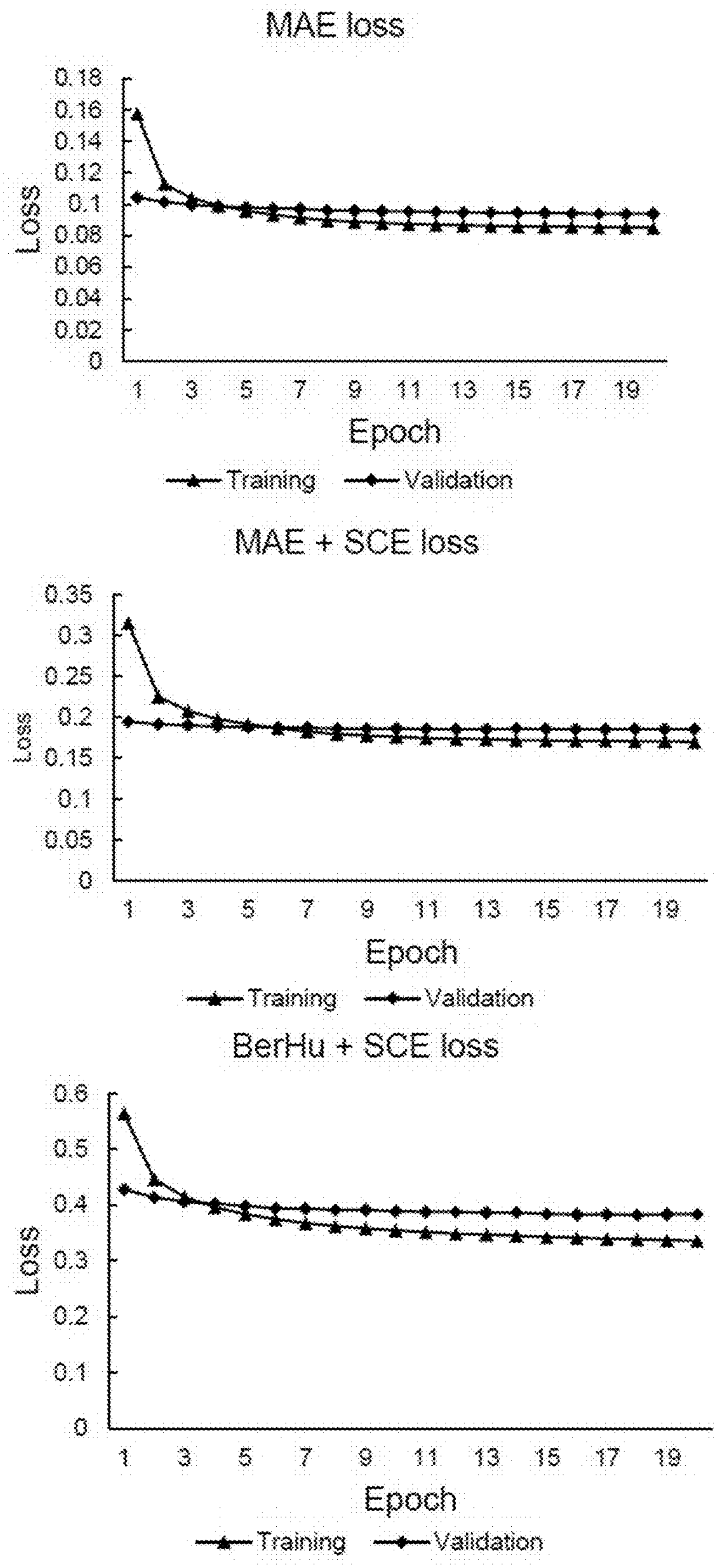
FIG. 13B: Illustrates the training and validation loss curves of the decoder ANNs of FIG. 13A trained with different loss functions.

| Diffractive optical network | Diffractive power efficiency at the output detector: η (%) | Testing accuracy max(s) (%) | Testing accuracy max(s') (%) |
|---|---|---|---|
| 10 wavelengths, $\alpha$ = 0.4, $\beta$ = 0.2 (FIGS. 7A-7B) $s = [s_0, s_1, \ldots, s_9]$ | 0.964 ± 0.466 | 84.02 | MAE: 84.03<br>MAE + SCE: 91.29<br>BerHu + SCE: 91.06 |
| 10 wavelengths, $\alpha$ = 0.08, $\beta$ = 0.2 (FIGS. 11A-11B) $s = [s_0, s_1, \ldots, s_9]$ | 0.124 ± 0.062 | 93.28 | MAE: 91.31<br>MAE + SCE: 94.27<br>BerHu + SCE: 94.02 |
| 10 wavelengths, $\alpha$ = 0.03, $\beta$ = 0.1 (FIGS. 5A-5C, 10A-10B) $s = [s_0, s_1, \ldots, s_9]$ | 0.047 ± 0.026 | 95.05 | MAE: 93.40<br>MAE + SCE: 95.32<br>BerHu + SCE: 95.37 |
| 10 wavelengths, $\alpha$ = $\beta$ = 0 FIG. 12A-12B $s = [s_0, s_1, \ldots, s_9]$ | 0.006 ± 0.004 | 96.07 | MAE: 94.58<br>MAE + SCE: 96.26<br>BerHu + SCE: 96.30 |
| 20 wavelengths (Differential), $\alpha$ = $\beta$ = 0 FIGS. 15A-15B $s_D = [s_{0+}, s_{0-}, s_{1+}, s_{1-}, \ldots, s_{9+}, s_{9-}]$ $s = \Delta s = [\Delta s_0, \Delta s_1, \ldots, \Delta s_9]$ | 0.004 ± 0.002 | 96.82 | MAE: 90.15<br>MAE + SCE: 96.81<br>BerHu + SCE: 96.64 |

Table 1. Numerical blind testing accuracies of different diffractive networks and their integration with decoder image reconstruction ANNs. The diffractive optical networks presented in the first 3 rows were trained with different ($\alpha$,$\beta$) pairs for experimental validation, resulting in different diffractive power efficiencies at the output detector, while the model in the $4^{th}$ row was trained with $\alpha$==0. The mean diffractive power efficiencies ($\eta$) of the diffractive network models were calculated at the output detector, considering the whole testing dataset, represented with the corresponding standard deviations (see Materials and Methods section for details).

Discussion

Even though Eq. (1) tries to find a balance among the optical inference accuracy, detector photon efficiency and resilience to possible detector 32 misalignments, there are other sources of experimental errors that contribute to the physical implementations of diffractive optical neural networks 10. First, due to multi-layer 16 layout of these networks 10, any inter-layer 16 misalignments might have contributed to some of the errors that were observed during the experiments. In addition, the optical forward model does not take into account multiple reflections that occur through the diffractive layers 16. These are relatively weaker effects that can be easily mitigated by e.g., time-gating of the detector 32 output and/or using anti-reflection coatings that are widely employed in the fabrication of conventional optical components. Moreover, any measurement errors that might have taken place during the characterization of the dispersion of the diffractive-layer material can cause the numerical models to slightly deviate from their physical implementations (i.e., the fabricated diffractive optical neural network device 10). Finally, 3D fabrication errors stemming from printing overflow and crosstalk between diffractive features on the substrate layers 16 can also contribute to some of the differences observed between the numerical and experimental results.

In addition to the above discussed physical implementation-related possible improvements to the results, the performance of the presented spectral encoding-based machine vision framework can be further improved using a differential class encoding strategy. The use of two different wavelengths was explored to encode each class score: instead of using 10 discrete wavelengths to represent a spectral class score vector, $s=[s_0, s_1, \ldots, s_9]$, the spatial information of an object 4 was encoded into 20 different wavelengths ($s_{0+}$, $s_{0-}$, $s_{1+}$, $s_{1-}$, . . . , $s_{9+}$, $s_{9-}$) that are paired in groups of two in order to differentially represent each spectral class score, i.e., $$\Delta s_C = \frac{s_{C,+} - s_{C,-}}{s_{C,+} + s_{C,-}}.$$

In this differential spectral encoding strategy, the diffractive network makes an inference based on max($\Delta$s) resulting from the spectral output at the single-pixel detector 32. With this spectrally encoded differential classification scheme, 96.82% optical classification accuracy was attained for handwritten digits (see Table 1 and FIGS. 15A-15B).

As an alternative to the shallow decoder trained neural network 110 with 2-hidden layers, the use of a much deeper convolutional architecture was investigated as the image reconstruction network 110 in the spectrally-encoded machine vision framework. For this, the output of the 2-hidden layer fully-connected network (with an input of s) is further processed by a U-Net-like deep convolutional neural network 110 with skip connections and a total of >1.4M trainable parameters in order to reconstruct the images 120 of handwritten digits using s. It was found out that the collaboration of the diffractive networks with this deeper, trained neural network 110 architecture yielded only marginal improvements over the classification accuracies presented in Table 1. For instance, when the diffractive optical network design shown in FIG. 4B ($\alpha$=0.03, $\beta$=0.1) was paired with this new deep decoder trained neural network 110 (through the feedback depicted in FIG. 6), the blind classification accuracy increased to 95.52% compared to the 95.37% provided by the shallow decoder trained neural network 110 with 2-hidden layers. As another example, for the diffractive optical neural network model trained with $\alpha$=0.4 and $\beta$=0.2, the collaboration with the deeper convolutional trained neural network 110 provides a classification accuracy of 91.49%, which is a minor improvement with respect to the 91.29% accuracy produced through the shallow trained neural network 110, falling short to justify the disadvantages of the deeper trained neural network 110 architecture in terms of its slower inference speed and more power consumption per image reconstruction.

The function of the decoder trained neural network 110, up to this point, has been to reconstruct the images 120 of the unknown input objects 4 based on the encoding present in the spectral class scores, $s=[s_0, s_1, \ldots, s_9]$, which also helped to improve the classification accuracy of the diffractive optical neural network device 10 by feeding these reconstructed images 120 back to it. As an alternative strategy, the decoder trained neural network 110 was investigated for a different task: to directly classify the objects 4 based on the spectral encoding (s) provided by the diffractive optical neural network device 10. In this case, the decoder trained neural network 110 is solely focused on improving the classification performance with respect to the optical inference results that are achieved using max(s). For example, based on the spectral class scores encoded by the diffractive optical neural network models/devices 10 that achieved 95.05% and 96.07% accuracy for handwritten digit classification using max(s), a fully-connected, shallow classification trained neural network 110 with 2-hidden layers improved the blind testing accuracy to 95.74 and 96.50%, respectively. Compared to the accuracies presented in Table 1, these numbers indicate that a slightly better classification performance is possible, provided that the image reconstruction is not essential for the target application, and can be replaced with a classification decoder trained neural network 110 that takes s as its input.

In the earlier systems 2 that have been described above, the diffractive optical neural network model and the corresponding back-end electronic trained neural network 110 or ANN have been separately trained, i.e., after the training of the diffractive optical neural network model for optical image classification, the back-end trained neural network 110 was trained based on the spectral encoding of the converged diffractive network model, yielding either the reconstruction trained neural network 110 or the classification trained neural network 110, as discussed earlier. As an alternative strategy, such hybrid systems can also be jointly-trained, through the error backpropagation between the electronic trained neural network 110 and the diffractive optical front-end.

This was demonstrated using the MNIST dataset and jointly-trained a diffractive network with an image reconstruction trained neural network 110 at the back-end. The same approach will may also be extended to jointly-train a diffractive network with a classification trained neural network 110 at the back-end, covering a different dataset (EMNIST). In the joint-training of hybrid network systems composed of a diffractive optical neural network model (for ultimate use as a device 10) and a reconstruction trained neural network 110, a linear superposition of two different loss functions was used to optimize both the optical classification accuracy and the image reconstruction fidelity: see Eq. 24 and Table 3.

Through this linear superposition, the impact of different relative weights of these loss functions were explored on (1) the image classification accuracy of the diffractive optical neural network, and (2) the quality of the image reconstruction performed by the back-end trained neural network 110. For this goal, the relative weight ($\xi$) of the optical classification loss term was changed in order to shift the attention of the hybrid design between these two tasks. For instance, when the weight of the optical classification loss is set to be zero ($\xi$=0), the entire hybrid system becomes a computational single-pixel imager that ignores the optical classification accuracy and focuses solely on the image reconstruction quality; as confirmed in FIGS. 18A-18D, 19A-19D and Table 3, this choice ($\xi$=0) results in a substantial degradation of the optical image classification accuracy with a considerable gain in the image reconstruction fidelity, as expected. By using different relative weights, one can achieve a sweet spot in the joint-training of the hybrid network system, where both the optical image classification accuracy and the ANN image reconstruction fidelity are very good; see e.g., $\xi$=0.5 in Table 3, FIGS. 18A-18D and 19A-19D.

The inference performance of these hybrid systems was also investigated in terms of the number of wavelengths that are simultaneously processed through the diffractive network. For this, hybrid systems were jointly trained that assign a group of wavelengths to each data class: inference of an object class is then based on the maximum average power accumulated in these selected spectral bands, where each band represents one data class. The results, summarized in Table 3, reveal that assigning e.g., 5 distinct wavelengths to each data class (i.e., a total of 50 wavelengths for 10 data classes), achieved a similar optical classification accuracy, compared to their counterparts that encoded the objects' spatial information using fewer wavelengths. This indicates that the diffractive optical neural network devices 10 can be designed to simultaneously process a larger number of wavelengths to successfully encode the spatial information of the input FOV into spectral features.

To further explore the capabilities of the system 2 for more challenging image classification tasks beyond handwritten digits, the EMNIST dataset was used, containing 26 object classes, corresponding to handwritten capital letters (see FIG. 20A). For this EMNIST image dataset, non-differential and differential diffractive classification networks were trained, encoding the information of the object data classes into the output power of 26 (FIGS. 20A, FIG. 20C) and 52 distinct wavelengths (FIGS. 20B, 20D), respectively. Furthermore, to better highlight the benefits of the collaboration between the optical and electronic networks, hybrid network systems that use a shallow classification ANN 110 (with 2 hidden layers) described earlier were jointly-trained to extract the object class from the spectral encoding performed by the diffractive optical front-end, through a single-pixel detector 32, same as before. Table 2 summarizes the results on this 26-class handwritten capital letter image dataset. First, a comparison between the all-optical diffractive classification networks and the jointly-trained hybrid network systems highlight the importance of the collaboration between the optical and electronic networks, the jointly-trained hybrid systems (where a diffractive optical neural network device 10 is followed by a classification encoder (i.e., electronic trained neural network 110) can achieve higher object classification accuracies (see Table 2). For example, a jointly-trained hybrid network using 52 encoding wavelengths that are processed through 3 diffractive layers 16 and a shallow decoder trained neural network 110 achieved a classification accuracy of 87.68% for EMNIST test dataset, which is >2% higher compared to the inference accuracy attained solely by an optical diffractive network design based on differential spectral encoding using the same 52 wavelengths (Table 2). The results presented in Table 2 further reveal that both the jointly-trained hybrid systems and the optical diffractive classification systems that utilize 52 distinct wavelengths to encode the spatial information of the objects achieve higher classification accuracies compared to their counterparts that are designed to process 26 wavelengths.

TABLE 2

| Diffractive network | Testing accuracy max(s) or max(s') (%) |
|---|---|
| 26 wavelengths<br>$s = [s_0, s_1, \ldots, s_{25}]$<br>(FIG. 20A) | 84.05 |
| 52 wavelengths (differential)<br>$s_D = [s_{0+}, s_{0-}, s_{1+}, s_{1-}, \ldots, s_{25+}, s_{25-}]$<br>$s = \Delta s = [\Delta s_0, \Delta s_1, \ldots, \Delta s_{25}]$<br>(FIG. 20B) | 86.78 |
| 26 wavelengths (jointly-trained with ANN)<br>$s = [s_0, s_1, \ldots, s_{25}]$<br>(FIG. 20C) | 85.60 |
| 52 wavelengths (differential, jointly-trained with ANN)<br>$s_D = [s_{0+}, s_{0-}, s_{1+}, s_{1-}, \ldots, s_{25+}, s_{25-}]$<br>$s = \Delta s = [\Delta s_0, \Delta s_1, \ldots, \Delta s_{25}]$<br>(FIG. 20D) | 87.68 |

Table 2: Blind testing accuracies for EMNIST handwritten capital letter classification. Also see FIGS. 20A-20D.

TABLE 3

| Diffractive network | ξ (Eq. 24) | Blind testing accuracy max(s) (%) |
|---|---|---|
| 10 wavelengths<br>$s = [s_0, s_1, \ldots, s_9]$<br>(FIG. 18A) | 0.0 | 10.72 |
| 10 wavelengths<br>$s = [s_0, s_1, \ldots, s_9]$<br>(FIG. 18B) | 0.25 | 94.94 |
| 10 wavelengths<br>$s = [s_0, s_1, \ldots, s_9]$<br>(FIG. 18C) | 0.5 | 95.66 |
| 10 wavelengths<br>$s = [s_0, s_1, \ldots, s_9]$<br>(FIG. 18D) | 1.0 | 96.01 |
| 20 wavelengths (differential)<br>$s_D = [s_{0+}, s_{0-}, s_{1+}, s_{1-}, \ldots, s_{9+}, s_{9-}]$<br>$s = \Delta s = [\Delta s_0, \Delta s_1, \ldots, \Delta s_9]$<br>(FIG. 19A) | 0.0 | 8.88 |

TABLE 3-continued

| Diffractive network | ξ (Eq. 24) | Blind testing accuracy max(s) (%) |
|---|---|---|
| 20 wavelengths (differential)<br>$s_D = [s_{0+}, s_{0-}, s_{1+}, s_{1-}, \ldots, s_{9+}, s_{9-}]$<br>$s = \Delta s = [\Delta s_0, \Delta s_1, \ldots, \Delta s_9]$<br>(FIG. 19B) | 0.25 | 95.17 |
| 20 wavelengths (differential)<br>$s_D = [s_{0+}, s_{0-}, s_{1+}, s_{1-}, \ldots, s_{9+}, s_{9-}]$<br>$s = \Delta s = [\Delta s_0, \Delta s_1, \ldots, \Delta s_9]$<br>(FIG. 19C) | 0.5 | 95.83 |
| 20 wavelengths (differential)<br>$s_D = [s_{0+}, s_{0-}, s_{1+}, s_{1-}, \ldots, s_{9+}, s_{9-}]$<br>$s = \Delta s = [\Delta s_0, \Delta s_1, \ldots, \Delta s_9]$<br>(FIG. 19D) | 1.0 | 96.04 |
| 50 wavelengths (averaging)<br>$s_D = [s_0^1, s_0^2, s_0^3, s_0^4, s_0^5, \ldots, s_9^1, s_9^2, s_9^3, s_9^4, s_9^5]$<br>$s = [s_0, s_1, \ldots, s_9]$ | 0.5 | 95.86% |
| 50 wavelengths (learnable weighted averaging)<br>$s_D = [s_0^1, s_0^2, s_0^3, s_0^4, s_0^5, \ldots, s_9^1, s_9^2, s_9^3, s_9^4, s_9^5]$<br>$s = [s_0, s_1, \ldots, s_9]$ | 0.5 | 95.22% |

Table 3: Blind testing accuracies of jointly-trained hybrid machine vision systems for MNIST image dataset. Image classification is performed by the corresponding diffractive optical neural network's output, max(s), and a decoder trained neural network 110 is jointly-trained for image reconstruction using the spectral encoding of data classes through a single-pixel detector. Also see FIGS. 18A-18D and 19A-19D.

An optical-based machine vision system 2 is presented that uses trainable matter composed of diffractive layers 16 to encode the spatial information of objects 4 into the power spectrum of the diffracted light, which is used to perform optical classification of unknown objects 4 with a single-pixel spectroscopic detector 32. A shallow, low-complexity trained neural networks 110 can be used as decoders to reconstruct images 120 of the input objects 4 based on the spectrally-encoded class scores, demonstrating task-specific super-resolution. Although terahertz pulses were used to experimentally validate the spectrally-encoded machine vision framework, it can be broadly adopted for various applications covering other parts of the electromagnetic spectrum. In addition to object recognition, this machine vision concept can also be extended to perform other learning tasks such as scene segmentation, multi-label classification, as well as to design single or few pixel, low-latency super-resolution imaging systems by harnessing the spectral encoding provided by diffractive optical neural network devices 10 coupled with shallow decoder trained neural networks 110.

It is important to note that if the material absorption of the diffractive layers 16 is lower and/or the signal-to-noise ratio of the single-pixel detector 32 is increased, the optical inference accuracy of the presented network designs could be further improved by e.g., increasing the number of diffractive layers 16 or the number of learnable features (i.e., neurons) within the diffractive optical neural network device 10. Compared to using wider diffractive layers 16, increasing the number of diffractive layers 16 offers a more practical method to enhance the information processing capacity of diffractive networks, since training higher numerical aperture diffractive systems through image data is in general relatively harder. Despite their improved generalization capability, such deeper diffractive systems composed of larger numbers of diffractive layers 16 would partially suffer from increased material absorption and surface back-reflections. However, one should note that the optical power efficiency of a broadband network also depends on the size of the output detector 32. For example, the relatively lower power efficiency numbers reported in Table 1 are by and large due to the small size of the output detector 32 used in these designs ($2\times\lambda_{min}$) and can be substantially improved by using a detector 32 with a much larger active area.

In some embodiments, dispersion engineered material systems such as metamaterials can open up a new design space for enhancing the inference and generalization performance of spectral encoding through trainable diffractive optical neural network devices 10. Finally, the methods presented herein would create new 3D imaging and sensing modalities that are integrated with optical inference and spectral encoding capabilities of broadband diffractive networks, and can be merged with some of the existing spectroscopic measurement techniques such as FDOCT, FTIR and others to find various new applications in biomedical imaging, analytical chemistry, material science and other fields. For example, the diffractive optical neural network device 10, light source 6, detector 32 or set of detectors 32 may be used in a time domain or spectral domain spectroscopy device, an interferometric measurement device, an optical coherence tomography (OCT) setup or device, a Fourier-transform infrared spectroscopy (FTIR) measurement system or device.

Materials and Methods

Terahertz time-domain spectroscopy setup. The schematic diagram of the terahertz time-domain spectroscopy (THz-TDS) setup is shown in FIG. 4D. A Ti:Sapphire laser (Coherent MIRA-HP) was employed in a mode-locked operation mode to generate femtosecond optical pulses at a center wavelength of 780 nm. The laser beam was first split in two parts. One part of the beam illuminated the terahertz source, a plasmonic photoconductive nano-antenna array, to generate terahertz pulses. The other part of the laser beam passed through an optical delay line and illuminated the terahertz detector 32, which was another plasmonic photoconductive nano-antenna array offering high-sensitivity and broadband operation. The generated terahertz radiation was collimated and guided to the terahertz detector 32 using an off-axis parabolic mirror. The output signal as a function of the delay line position, which provides the temporal profile of the detected terahertz pulses, was amplified using a current pre-amplifier (Femto DHPCA-100) and detected with a lock-in amplifier (Zurich Instruments MFLI). For each measurement, 10 time-domain traces were captured over 5 s and averaged. The acquired time-domain signal has a temporal span of 400 ps and its power spectrum was obtained through a Fourier transform. Overall, the THz-TDS system offers signal-to-noise ratio levels of >90 dB and observable bandwidths exceeding 5 THz.

The 3D-printed diffractive optical neural network device 10 was placed between the terahertz source 6 and the detector 32. It consisted of an input aperture 8, an input object 4, three diffractive layers 16 and an output aperture 28, as shown in FIGS. 1A and 4D, with their dimensions and spacing annotated. Upon the training in a computer, the diffractive optical networks (models or electronic) were then fabricated using a 3D printer (Objet30 Pro, Stratasys Ltd.) with a UV curable material (VeroBlackPlus RGD875, Stratasys Ltd.). A 1×1 cm square aperture 8 was positioned at the input plane serving as an entrance pupil for the subsequent optical system. The terahertz detector 32 has an integrated Si lens 31 in the form of a hemisphere with a radius of 0.6 cm directly attached to the backside of the chip. This Si lens 31 was modelled as an achromatic flat Si slab with a thickness of 0.5 cm and a refractive index of 3.4 in the optical forward model. During the experiments, a 2×2 mm output aperture 28 was placed at the output plane, right before the terahertz detector 32, to shrink the effective area of the Si lens 31, ensuring that the uniform slab model assumed during the training forward model accurately translates into the experimental setup. The input and output apertures 8, 28 as well as the 3D-printed objects 4 were coated with aluminum to block terahertz radiation outside the transparent openings and object features. Furthermore, a 3D-printed holder 22 (FIGS. 1A, 4A) was designed to support and align all of the components of the diffractive setup.

Forward model of the diffractive optical network and its training. A diffractive optical neural network device 10 is, in general, composed of successive diffractive layers 16 (transmissive and/or reflective) that collectively modulate the incoming object waves. According to the forward model used in this work, the diffractive layers 16 are assumed to be thin optical modulation elements, where the $i^{th}$ feature on the $l^{th}$ layer at a spatial location $(x_i, y_i, z_i)$ represents a wavelength ($\lambda$) dependent complex-valued transmission coefficient, $t^l$, given by:

$$t^l(x_i, y_i, z_i, \lambda) = a^l(x_i, y_i, z_i, \lambda)\exp\left(j\phi^l(x_i, y_i, z_i, \lambda)\right), \tag{3}$$

where a and $\phi$ denote the amplitude and phase coefficients, respectively.

The diffractive layers 16 are connected to each other by free-space propagation, which is modeled through the Rayleigh-Sommerfeld diffraction equation:

$$w_i^l(x, y, z, \lambda) = \frac{z - z_i}{r^2}\left(\frac{1}{2\pi r} + \frac{1}{j\lambda}\right)\exp\left(\frac{j2\pi r}{\lambda}\right), \tag{4}$$

where $$w_i^l$$

$(x, y, z, \lambda)$ is the complex-valued field on the $i^{th}$ pixel of the $l^{th}$ layer at (x, y, z) with a wavelength of $\lambda$, which can be viewed as a secondary wave generated from the source at $(x_i, y_i, z_i)$; and $r=\sqrt{(x-x_i)^2+(y-y_i)^2+(z-z_i)^2}$ and $j=\sqrt{-1}$. For the $l^{th}$ layer ($l\geq1$, treating the input plane as the $0^{th}$ layer), the modulated optical field $u^l$ at location $(x_i, y_i, z_i)$ is given by $$u^l(x_i, y_i, z_i, \lambda) = t^l(x_i, y_i, z_i, \lambda)\cdot\sum_{k\in I} u^{l-1}(x_k, y_k, z_k, \lambda)\cdot w_k^{l-1}(x_i, y_i, z_i, \lambda), \tag{5}$$

where I denotes all the pixels on the previous diffractive layer 16.

0.5 mm was used as the smallest feature size of the diffractive layers 16, which is mainly restricted by the resolution of the 3D-printer. To model the Rayleigh-Sommerfeld diffraction integral more accurately over a wide range of illumination wavelengths, the diffractive space was sampled with a step size of 0.25 mm so that the x and y coordinate system in the simulation window was over-sampled by two times with respect to the smallest feature size. In other words, in the sampling space a 2×2 binning was performed to form an individual feature of the diffractive layers 16, and thus all these four (4) elements share the same physical thickness, which is a learnable parameter. The printed thickness value, h, of each pixel of a diffractive layer is composed of two parts, $h_m$ and $h_{base}$, as follows;

$$h = q(h_m) + h_{base}, \tag{6}$$

where $h_m$ denotes the learnable thickness parameters of each diffractive feature and is confined between $h_{min}$=0 and $h_{max}$=0.8 mm. The additional base thickness, $h_{base}$, is a constant, non-trainable value chosen as 0.5 mm to ensure robust 3D printing and avoid bending of the diffractive layers after fabrication. Quantization operator in Eq. (6), i.e., q(•), denotes a 16-level/4-bit uniform quantization (0.05 mm for each level). To achieve the constraint applied to $h_m$, an associated latent trainable variable h, was defined using the following analytical form:

$$h_m = \frac{h_{max}}{2} \cdot (\sin(h_p) + 1). \tag{7}$$

Note that before the training starts, $h_m$ of all the diffractive neurons are initialized as 0.375 mm, resulting in an initial h of 0.575 mm. Based on these definitions, the amplitude and phase components of the complex transmittance of $i^{th}$ feature of layer l, i.e., $a^l(x_i, y_i, z_i, \lambda)$ and $\phi^l(x_i, y_i, z_i, \lambda)$, can be written as a function of the thickness of each individual neuron hi and the incident wavelength λ:

$$a^l(x_i, y_i, z_i, \lambda) = \exp\left(-\frac{2\pi\kappa(\lambda)h_i^l}{\lambda}\right), \tag{8}$$

$$\phi^l(x_i, y_i, z_i, \lambda) = (n(\lambda) - n_{air})\frac{2\pi h_i^l}{\lambda}, \tag{9}$$

where the wavelength dependent parameters n(λ) and κ(λ) are the refractive index and the extinction coefficient of the diffractive layer material corresponding to the real and imaginary parts of the complex-valued refractive index ñ(λ), i.e., ñ(λ)=n(λ)+jκ(λ). Both of these parameters for the 3D-printing material used herein were experimentally measured over a broad spectral range (see FIGS. 17A, 17B).

Based on this outlined optical forward model, FIG. 16 exemplifies the projection of the spatial amplitude distributions onto the x-z plane created by a diffractive network model in response to two input digits, '4' and '7'.

Based on the diffractive network layout reported in FIG. 4D, the half diffraction cone angle that enables full connectivity between the diffractive features/neurons on two successive layers 16 is found to be ~53°. This suggests that, for a lateral feature size of 0.5 mm, the smallest wavelength that can fully utilize all the free-space communication channel between two successive layers is −0.8 mm. Therefore, smaller wavelengths within the illumination band have a slight disadvantage in terms of layer-to-layer optical connectivity within the diffractive network. This imbalance among different spectral components of a given illumination band can be resolved in different ways: (1) using a smaller diffractive feature/neuron size through a higher-resolution fabrication method, or (2) increasing the layer-to-layer distance in the diffractive network design.

Spectral class scores. Each spectral component contained in the incident broadband terahertz beam is assumed to be a plane wave with a Gaussian lateral distribution. The beam waist corresponding to different wavelength components was experimentally measured. Although, a flat spectral magnitude (equal weight for each spectral component) was assumed during the training of the diffractive optical networks, the pulsed terahertz source used in the setup contained a different spectral profile within the band of operation. To circumvent this mismatch and calibrate the diffractive system (which is a one-time effort), the power spectrum was measured of the pulsed terahertz source 6 without any objects or diffractive layers serving as the experimental reference, $$I_{exp}^R(\lambda).$$

In addition, the corresponding wave of each spectral component was propagated through free-space containing equal power across the entire operation band from the plane of the input aperture 8 all the way to the output plane, forming the numerical reference wave collected by the detector aperture 28, i.e., $$I_{tr}^R(\lambda).$$

Based on these spectral power distributions used for calibration, the experimentally measured power spectrum, $I_{exp}(\lambda)$, that is optically created by a 3D-printed diffractive optical neural network 10 is normalized as:

$$I_{exp,corrected}(\lambda) = I_{exp}(\lambda) \cdot \frac{I_{tr}^R(\lambda)}{I_{exp}^R(\lambda)}, \tag{10}$$

which corrects the mismatch between the spectral profiles assumed in the training phase and the one provided by the broadband terahertz illumination source 6. In fact, this is an important practical advantage of the framework since the diffractive models can work with different forms of broadband radiation, following this calibration/normalization routine outlined above. FIGS. 5A, 7A, 10A, 11A, 12A, 15A illustrate the experimental spectral curves $I_{exp,\ corrected}(\lambda)$ defined by Eq. (10).

As described herein, there are two types of diffractive optical neural network devices 10 presented. With the number of wavelengths that one would like to encode the object information denoted by M and the number of data classes denoted by C, in the first type one assigns a single wavelength to each data class, thus one can take M=C (e.g., C=10 for MNIST data). For differential diffractive optical neural network devices 10, on the other hand, each data class is represented by a pair of spectral components, i.e., M=2C. As the dataset of handwritten digits has 10 classes, during the training of the standard diffractive optical networks, 10 discrete wavelengths were selected, each representing one digit. These wavelengths were uniformly distributed between $\lambda_{min}$=1.00 mm and $\lambda_{max}$=1.45 mm with 0.05 mm spacing; for the EMNIST image dataset this wavelength range was changed to be 0.825 mm to 1.45 mm with 0.025 mm spacing. For the differential diffractive optical neural network device 10 design, 20 wavelengths were uniformly distributed between $\lambda_{min}$=0.65 mm and $\lambda_{max}$=1.6 mm: for differential designs involving EMNIST image dataset, 52 wavelengths were used, uniformly distributed between $\lambda_{min}$=0.755 mm and $\lambda_{max}$=1.52 mm. The first 10 spectral components ($s_0$, $s_1$, . . . , $s_q$) are assigned to be positive signals ($s_{0,+}$, $s_{1,+}$, $s_{9,+}$) and the subsequent 10 spectral components ($s_{10}$, $s_{11}$, . . . , $s_{19}$) are assigned to be negative signals ($s_{0,-}$, $s_{1,-}$, . . . , $s_{9,-}$). Based on this, the differential spectral class score $\Delta s_c$ for class c is defined as:

$$\Delta s_c = \frac{1}{T} \cdot \frac{s_{c,+} - s_{c,-}}{s_{c,+} + s_{c,-}}, \tag{11}$$

where $s_{c,+}$ and $s_{c,-}$ denote the positive and negative spectral signals for the $c^{th}$ class, respectively, and T is a non-learnable hyperparameter (also referred to as the 'temperature' hyperparameter in machine learning literature) used only in the training phase to improve the convergence speed and the accuracy of the final model; T was empirically chosen as T=0.1.

Image reconstruction neural network architecture. The image reconstruction trained neural network 110 is a 3-layer (with 2 hidden layers) fully-connected neural network, which receives an input of spectral class score vector (s) and outputs a reconstructed image 120 of the object 4. The two (2) hidden layers have 100 and 400 neurons, respectively. The size of the 3D-printed objects 4 used in the experiments is 2 cm×2 cm and when they are sampled at 0.5 mm intervals, in the discrete space each input object corresponds to 40×40 pixels, hence the dimension of the output layer of the image reconstruction network is 1600. Each fully connected layer of this image reconstruction ANN has the following structure:

$$z_{k+1} = BN\{LReLU[FC\{z_k\}]\}, \tag{12}$$

where $z_k$ and $z_{k+1}$ denotes the input and output of the $k^{th}$ layer, respectively, FC denotes the fully connected layer, LReLU denotes leaky rectified linear unit, and BN is the batch normalization layer. In the architecture used, LReLU is defined as:

$$LReLU[x] = \begin{cases} x & \text{for } x > 0 \\ 0.2x & \text{otherwise} \end{cases}. \tag{13}$$

For the batch normalization layer, BN, with a d-dimensional input $x=(x^{(1)}, \ldots, x^{(d)})$, each dimension of the input is first normalized (i.e., re-centered and re-scaled) using its mean $\mu_B$ and standard deviation $\sigma_B$ calculated across the mini-batch B of size m, and then multiplied and shifted by the parameters $\gamma^{(k)}$ and $\beta^{(k)}$ respectively, which are both subsequently learnt during the optimization process:

$$BN[x_i] = \gamma^{(k)} \cdot \frac{x_i^{(k)} - \mu_B^{(k)}}{\sqrt{\sigma_B^{(k)2} + \epsilon}} + \beta^{(k)}, \tag{14}$$

$$\mu_B = \frac{1}{m}\sum_{i=1}^{m} x_i,\ \sigma_B^2 = \frac{1}{m}\sum_{i=1}^{m}(x_i - \mu_B)^2, \tag{15}$$

where $k\in[1,d]$, $i\in[1,m]$ and $\epsilon$ is a small number added in the denominator for numerical stability.

Loss function for the training of spectral encoding diffractive optical networks. The total loss for training of diffractive optical networks, $\mathcal{L}_D$, is defined as $$\mathcal{L}_D = \mathcal{L}_I + \alpha \cdot \mathcal{L}_E + \beta \cdot \mathcal{L}_P, \tag{16}$$

where $\mathcal{L}_I$ stands for the optical inference loss. $\mathcal{L}_E$ denotes the output detector diffractive power efficiency-related loss and $\mathcal{L}_P$ denotes the spatial purity loss. The non-trainable hyperparameters, α and β, are relative weight coefficients for the corresponding loss terms. For different diffractive optical networks presented herein, the (α, β) pairs are set to be (0.4,0.2), (0.08,0.2), (0.03,0.1), (0,0) and (0,0) providing 84.02%, 93.28%, 95.05%, 96.07% and 96.82% optical inference accuracy, respectively (see Table 1). For multi-class object classification, $\mathcal{L}_I$ was defined using softmax-cross-entropy (SCE) as follows:

$$\mathcal{L}_I = SCE(\hat{s}, g) \tag{17}$$

$$\mathcal{L}_I = -\sum_{c=1}^{C} g_c \cdot \log\left(\frac{\exp(\hat{s}_c)}{\sum_{c=1}^{C}\exp(\hat{s}_c)}\right),$$

where $\hat{s}_c$, C and $g_c$ denote the normalized spectral class score for the $c^{th}$ class, the number of data classes, and the $c^{th}$ entry of the ground truth label vector, respectively. In the 10-wavelength diffractive optical network designs, M=C=10, and $\hat{s}_c$ is calculated as:

$$\hat{s}_c = \frac{1}{T'} \cdot \frac{s_c}{\max(s)}, \tag{18}$$

where T' is a non-learnable hyperparameter, which is used only in the training phase and empirically chosen as 0.1. For the 20-wavelength differential diffractive optical network design, $\hat{s}_c$ is equal to $\Delta s_c$ defined in Eq. (3).

The output detector 32 diffractive power efficiency-related loss term $\mathcal{L}_E$ in Eq. (16) is defined as:

$$\mathcal{L}_E = \begin{cases} -\log\left(\frac{\eta}{\eta_{th}}\right), & \text{if } \eta < \eta_{th} \\ 0, & \text{if } \eta \geq \eta_{th} \end{cases}, \tag{19}$$

where η denotes the diffractive power efficiency at the output detector 32 and $\eta_{th}$ refers to the penalization threshold that was taken as 0.015 during the training phase. η is defined as:

$$\eta = \frac{I_{c_{GT}}}{I_{in}}, \tag{20}$$

where $I_{c_{GT}}$ represents the power (calculated at the output detector aperture 28) for the spectral component corresponding to the ground truth class of the input object 4, and $I_{in}$ represents the power of the same spectral component right after the input aperture 8, before the object 4 and the diffractive network.

The spatial purity loss $\mathcal{L}_P$ is used to clear the optical power over a small region of interest, 1 cm×1 cm surrounding the active area of the single-pixel detector, for the purpose of decreasing the sensitivity of the diffractive optical network to potential misalignment of the detector in the transverse plane with respect to the optical axis. $\mathcal{L}_P$ is calculated using:

$$\mathcal{L}_P = -\sum_{c=1}^{C} \log\left(\frac{I_{detector,c}}{I_{peripheral,c} + I_{detector,c}}\right), \tag{21}$$

where $I_{detector,\,c}$ and $I_{peripheral,\,c}$ denote the optical power of the $c^{th}$ spectral component collected by the active area of the output detector 32 and within a 1 cm×1 cm periphery around the output detector 32 aperture, respectively.

Figure 6:
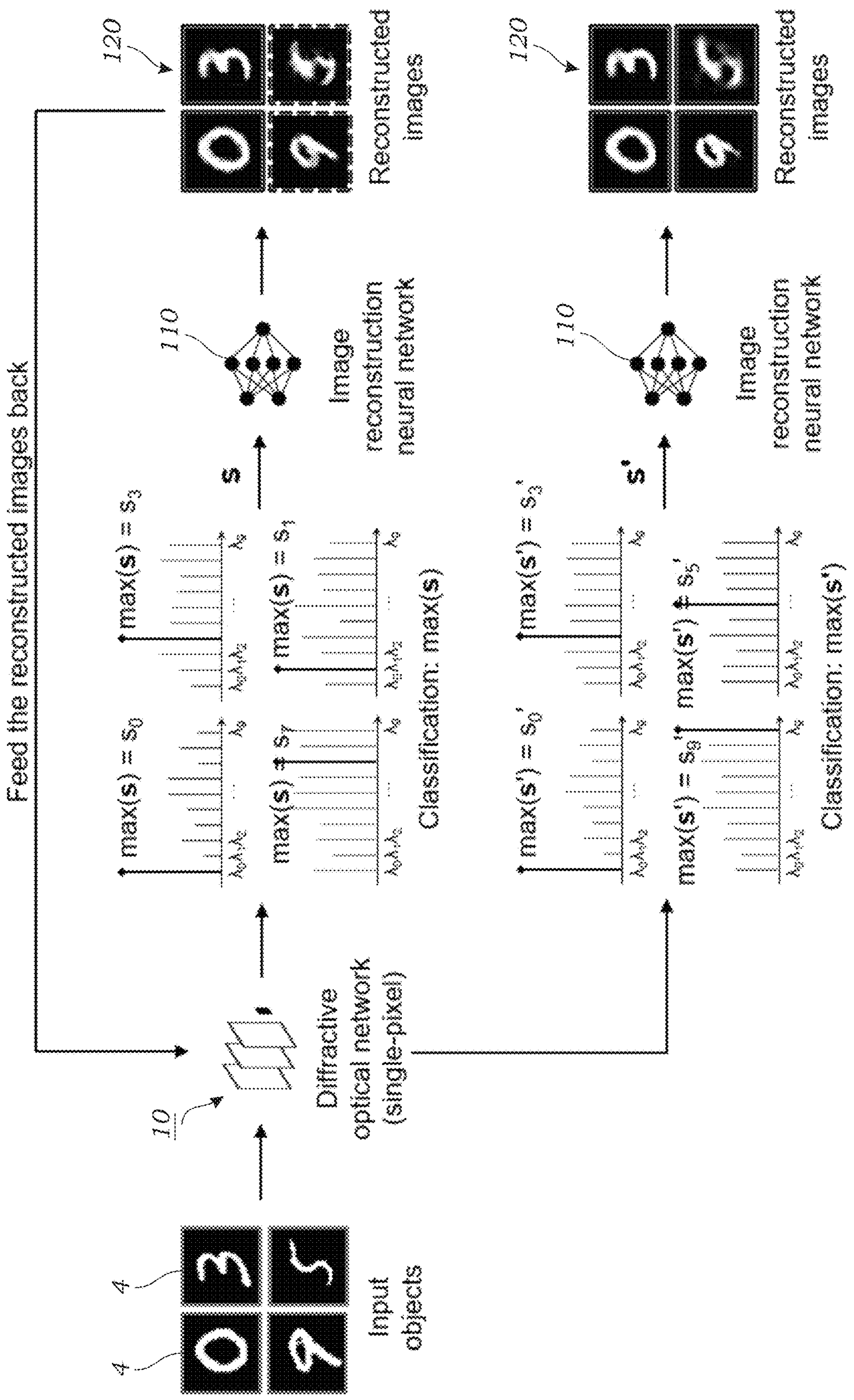
FIG. 6: Illustration of the coupling between the image reconstruction ANN and the diffractive optical network. Four MNIST images of handwritten digits are used here for illustration of the concept. Two of the four samples, “0” and “3”, are correctly classified by the diffractive network based on max(s) (tallest lines ($s_0$ and $s_3$)), while the other two, “9” and “5”, are misclassified as “7” and “1”, respectively (tallest lines ($s_7$ and $s_1$)). Then, using the same class scores (s) at the output detector of the diffractive network, a decoder ANN digitally reconstructs the images of the input objects. The results indicate that although the optical network misclassified two of these objects, their reconstructed images (lower two image boxes as shown by dashed outlines) are still visually similar to their ground truth classes. Next, these images are cycled back to the diffractive optical network as new input images and the new spectral class scores s' are inferred accordingly, where all of the four digits are correctly classified through max(s') (tallest lines). Finally, these new spectral class scores s' are used to reconstruct the objects again using the same image reconstruction ANN (all boxes). The blind testing accuracy of this diffractive network for handwritten digit classification increased from 84.02% to 91.29% using this feedback loop (see FIG. 5C and FIG. 7B). This image reconstruction ANN was trained using the MAE loss and softmax-cross-entropy loss (Eq. 2).
Figure 7A:
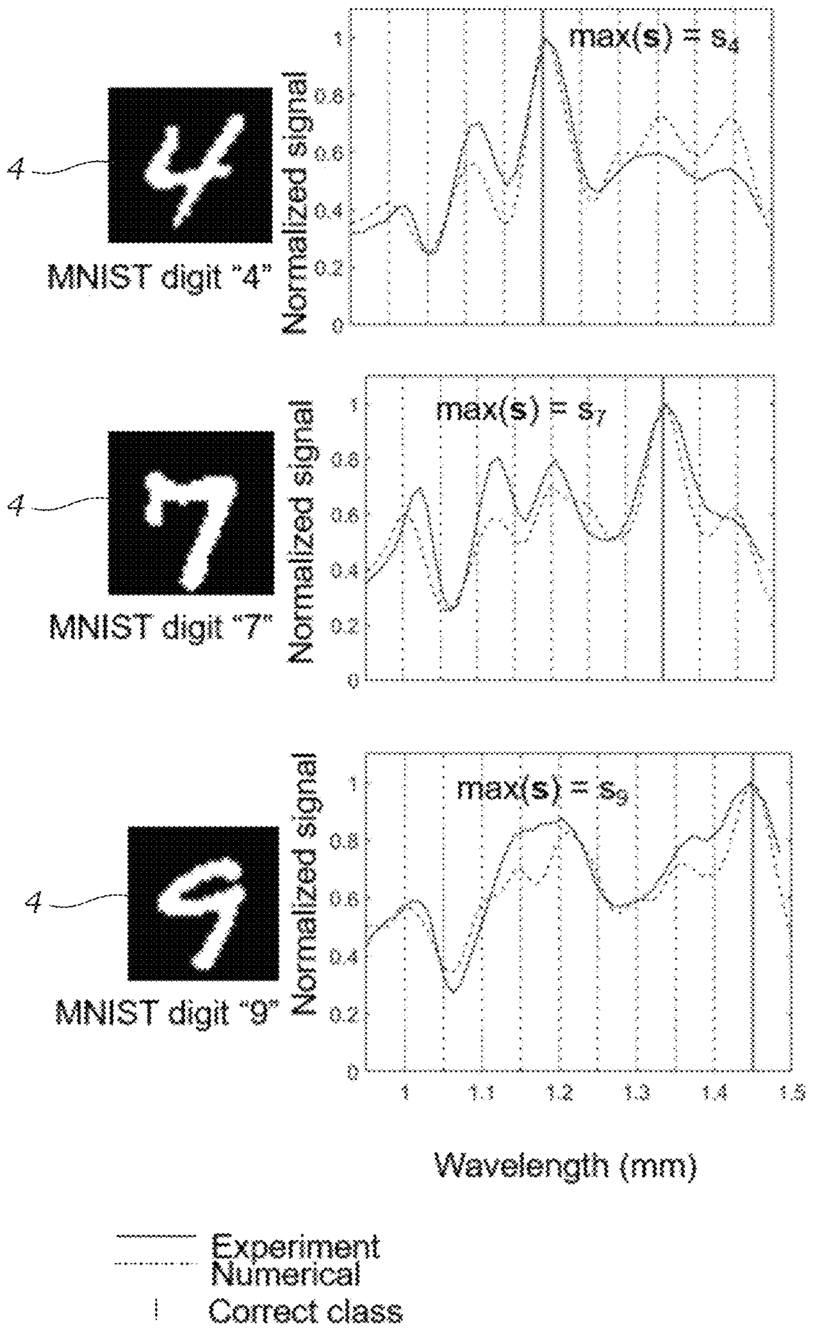
FIGS. 7A-7B: Blind testing performance of a highly-efficient diffractive optical network and its coupling with a corresponding decoder ANN.
Figure 7B:
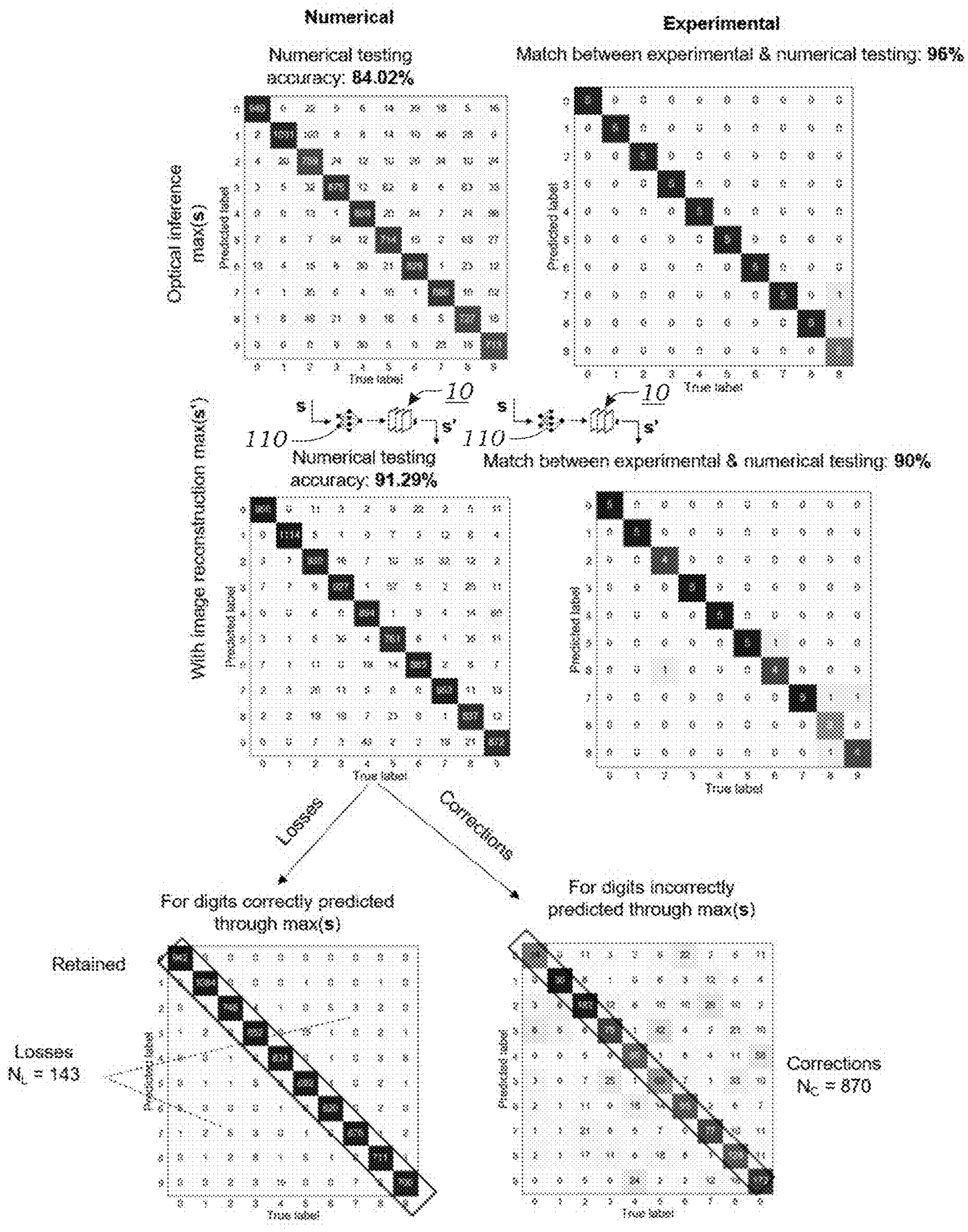

Loss function for the training of image reconstruction (decoder) networks. Total loss of an electronic image reconstruction network, $\mathcal{L}_{Recon}$, is defined as:

$$\mathcal{L}_{Recon} = \gamma \cdot \mathcal{L}_S(O_{recon}, O_{input}) + (1-\gamma)\cdot \mathcal{L}_I, \tag{22}$$

where $\mathcal{L}_S$ stands for the pixel-wise structural loss between the reconstructed image of the object $O_{recon}$ and the ground truth object structure $O_{input}$. $\mathcal{L}_I$ is the same loss function defined in Eq. (17); except, instead of ŝ, it computes the loss SCE($\hat{s}'$, g) using $\hat{s}'$ and ground truth label vector g. Here, $\hat{s}'$ denotes the new class scores computed by cycling $O_{recon}$ back to the object plane of the diffractive optical network model at hand and numerically propagating it through the optical forward model as depicted in FIG. 6. The hyperparameter, γ, is a coefficient that controls the ratio of two loss terms. In the training phase, γ was empirically chosen as γ=0.95. Two kinds of image structural loss terms, i.e., Mean Absolute Error (MAE) loss and reversed Huber (or "BerHu") loss, are used. Reversed Huber loss between 2D images a and b is defined as:

$$BerHu(a,b) = \sum_{\substack{x,y \\ |a(x,y)-b(x,y)|\le q}} |a(x,y)-b(x,y)| + \sum_{\substack{x,y \\ |a(x,y)-b(x,y)|>q}} \frac{[a(x,y)-b(x,y)]^2+q^2}{2q}, \tag{23}$$

where q is a hyperparameter that is empirically set as 20% of the standard deviation of the normalized input ground truth image. Examples of the reconstructed images using these different loss terms are shown in FIGS. 13 and 14.

Figure 8A:
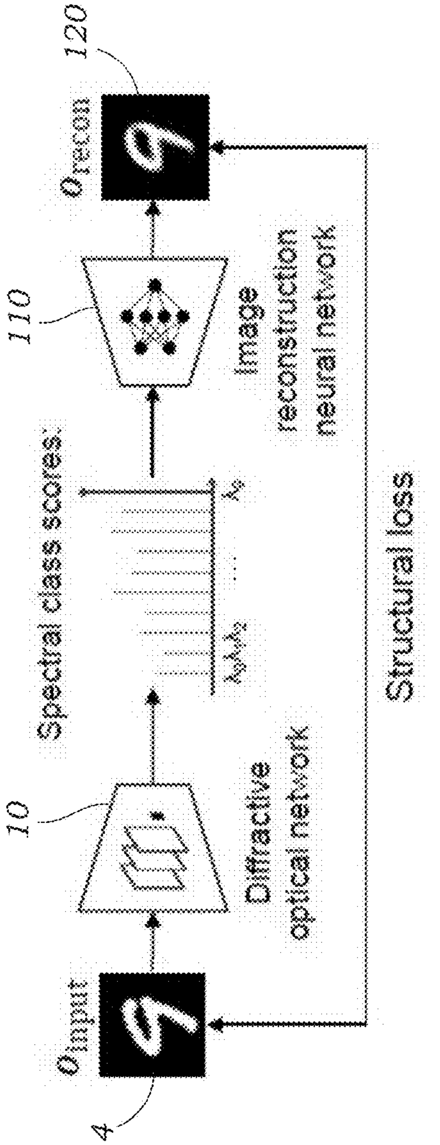
FIGS. 8A and 8B: Different strategies for training an image reconstruction ANN to decode spectral encoding.
Figure 8B:
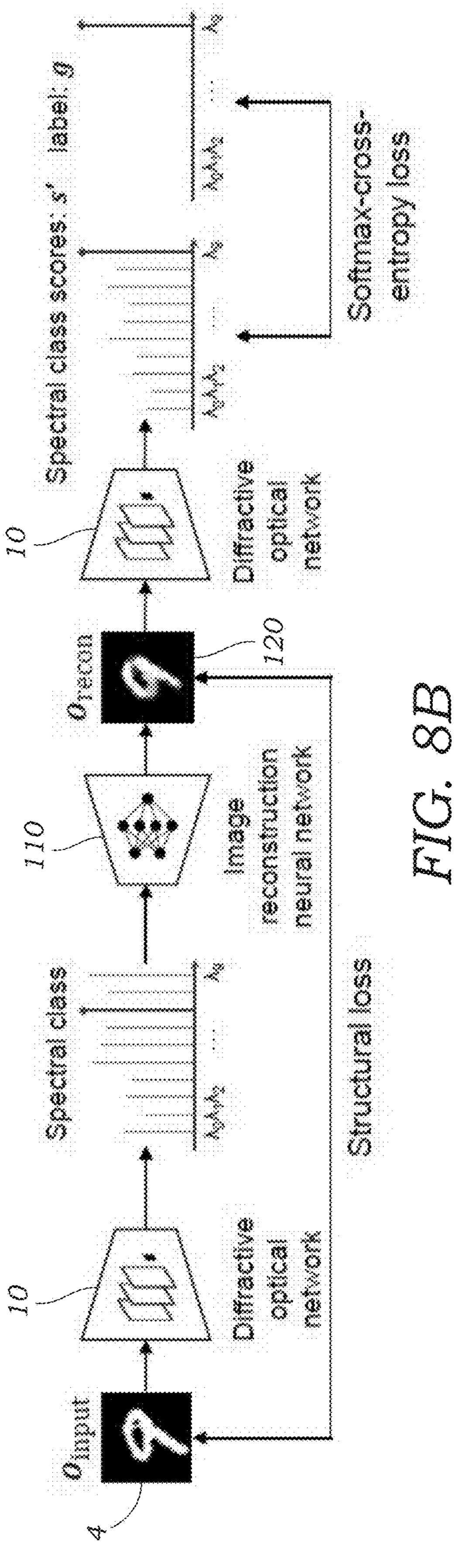

Training-related details. Both the diffractive optical neural network models/devices 10 and the corresponding decoder trained neural network 110 used herein were simulated and trained using Python (v3.6.5) and TensorFlow (v1.15.0, Google Inc.). Adam was selected as the optimizer during the training of all the models, and its parameters were taken as the default values in TensorFlow and kept identical in each model. The learning rate was set as 0.001. The handwritten digit image data are divided into three parts: training, validation and testing, which contain 55K, 5K and 10K images, respectively. Diffractive optical networks were trained for 50 epochs and the best model was selected based on the classification performance on the validation data set. Image reconstruction neural networks 110 were trained for 20 epochs. In FIGS. 8A, 8B, two different training schemes for image reconstruction ANNs. If there is no feedback cycle, i.e., γ=1 in Eq. (22), the remaining loss factor is the structural loss, $\mathcal{L}_S(O_{recon}, O_{input})$ In this case, the best trained neural network 110 model was selected based on the minimum loss value over the validation data set. If there was an image feedback cycle, i.e., γ<1 in Eq. (22), the best trained neural network 110 model was selected based on the classification performance provided by $\hat{s}'$ over the validation set.

For the training of the models, a desktop computer with a TITAN RTX graphical processing unit (GPU, Nvidia Inc.) and Intel® Core™ i9-9820X central processing unit (CPU, Intel Inc.) and 128 GB of RAM was used, running Windows 10 operating system (Microsoft Inc.). For the diffractive optical front-end design involving M=C=10, the batch size was set to be 4 and 5 for the diffractive optical neural network 10 and the associated image reconstruction trained neural network 110, respectively. However, for the differential design of the diffractive optical front-end with M=2C=20, the batch size was set to be 2 and 5 during the training of the diffractive optical neural network 10 and the associated image reconstruction trained neural network 110, respectively. The main limiting factor on these batch size selections is the GPU memory of the computer. The typical training time of a diffractive optical neural network model with C=10 is ~80 hours. The typical training time of an image reconstruction decoder trained neural network 110 with and without the image feedback/collaboration loop is ~20 hours and ~2 hours, respectively.

While embodiments of the present invention have been shown and described, various modifications may be made without departing from the scope of the present invention. For example, while the system 2 is described herein as performing object 4 classification or image reconstruction, the system 2 may also be used to perform optical signal compression. In addition, while the invention largely focuses on optical diffraction and reflection, the system and method can also be used with acoustic waves instead of optical waves as seen in the embodiment of FIG. 2. That is to say, instead of an illumination source 6 being used, an acoustic wave source 220 is exposed to the objects 4. Likewise, the detector 32 or set of detectors would be acoustic-based sensors 230. The invention, therefore, should not be limited, except to the following claims, and their equivalents.

What is claimed is:

1. A system using diffractive spectral encoding for performing one or more of a machine vision task, machine learning task, and/or classification of objects comprising:

a diffractive optical neural network device comprising a plurality of optically transmissive and/or reflective substrate layers arranged in an optical path, each of the plurality of optically transmissive/reflective substrate layers comprising a plurality of physical features formed on or within the plurality of optically transmissive and/or reflective substrate layers and having different complex-valued transmission and/or reflection coefficients as a function of lateral coordinates across each substrate layer, wherein the plurality of optically transmissive and/or reflection substrate layers and the plurality of physical features collectively define a trained function between an input optical signal from the objects illuminated at a plurality or a continuum of wavelengths and an output optical signal corresponding to one or more unique wavelengths or sets of wavelengths within the plurality or the continuum of wavelengths assigned to represent distinct data classes or object types or object classes created by optical diffraction and/or reflection through/off the plurality of optically transmissive and/or reflective substrate layers;

a light source configured to illuminate the objects and generate the input optical signal; and a detector or set of detectors configured to sense the output optical signal(s) or data from the diffractive optical neural network.

2. The system of claim 1, wherein the light source simultaneously illuminates the objects at a plurality or a continuum of wavelengths.

3. The system of claim 1, wherein the light source sequentially illuminates the objects at a plurality or a continuum of wavelengths.

4. The system of claim 1, wherein the detector or set of detectors generates a time domain signal or data that comprises the output information of the diffractive optical neural network.

5. The system of claim 1, wherein the detector or set of detectors generates a spectral domain signal or data that directly reveals the output information of the diffractive optical neural network.

6. The system of claim 1, further comprising a trained, digital neural network configured to receive a signal or data from the detector or set of detectors as an input and digitally output a reconstructed image of the objects.

7. The system of claim 6, wherein the trained, digital neural network configured to reconstruct images of the input objects is trained using at least one of the following: (i) a structural loss term, (ii) a cross entropy loss term, (iii) softmax-cross-entropy loss term, (iv) a diffractive network inference accuracy related penalty term, or (v) combinations of (i-iv) with different weights.

8. The system of claim 6, wherein the trained, digital neural network comprises a shallow network having five or less hidden layers.

9. The system of claim 1, wherein a signal or data from the detector or set of detectors are post-processed by a computer executed algorithm or software or dedicated hardware that performs one or more operations of: Fourier transform, addition, subtraction, multiplication, standardization, peak detection or combinations thereof.

10. The system of claim 1, wherein the detector comprises a single pixel detector.

11. The system of claim 1, wherein the light source comprises a pulsed light source.

12. The system of claim 1, wherein the light source comprises a broadband light source.

13. The system of claim 1, wherein the light source comprises a plurality of discrete frequency/wavelength lines.

14. The system of claim 1, wherein the light source comprises a broadband light and wherein the system further comprises at least one dispersive element that receives light from the broadband light source prior to illumination of the objects.

15. The system of claim 1, further comprising at least one dispersive element interposed between the diffractive optical neural network device and the detector or set of detectors.

16. The system of claim 1, further comprising at least one waveguide interposed between the diffractive optical neural network device and the detector or set of detectors.

17. The system of claim 1, wherein the diffractive optical neural network device, light source, and detector or set of detectors are used in a time domain or spectral domain spectroscopy device.

18. The system of claim 1, wherein the diffractive optical neural network device, light source, and detector or set of detectors are used in an interferometric measurement device.

19. The system of claim 1, wherein the diffractive optical neural network device, light source, and detector or set of detectors are used in an optical coherence tomography (OCT) setup.

20. The system of claim 1, wherein the diffractive optical neural network device, light source, and detector or set of detectors are used in a Fourier-transform infrared spectroscopy (FTIR) measurement system.

21. The system of claim 1, wherein the system performs single-shot spectral encoding of object information.

22. The system of claim 1, wherein the light source emits light within the ultra-violet, visible, infrared, terahertz, millimeter, or radio portion of the electromagnetic spectrum.

23. The system of claim 1, wherein the detector or set of detectors output a signal or data that comprises spectral class scores.

24. The system of claim 1, wherein the detector or set of detectors output a signal or data that comprises a signal encoding and/or feature extraction and/or feature representation scheme.

25. The system of claim 1, wherein the system performs optical signal compression.

26. The system of claim 6, wherein the reconstructed images of the objects are fed back to the diffractive optical neural network device as new inputs so as to improve the inference accuracy of the system.

27. A method of performing a machine vision task, machine learning task, and/or classification of objects using a diffractive optical neural network device, comprising:

passing light from the objects through the diffractive optical neural network device comprising a plurality of optically transmissive and/or reflective substrate layers arranged in an optical path, each of the plurality of optically transmissive and/or reflective substrate layers comprising a plurality of physical features formed on or within the plurality of optically transmissive and/or reflective substrate layers and having different complex-valued transmission/reflection coefficients as a function of lateral coordinates across each substrate layer, wherein the plurality of optically transmissive and/or reflection substrate layers and the plurality of physical features collectively define a trained function between an input optical signal from the objects illuminated at a plurality or a continuum of wavelengths and an output optical signal corresponding to one or more unique wavelengths or sets of wavelengths within the plurality or the continuum of wavelengths assigned to represent distinct data classes or object types or object classes created by optical diffraction and/or reflection through/off the plurality of optically transmissive and/or reflective substrate layers;

capturing light from the diffractive optical neural network device with a detector or a set of detectors that generate a signal or data that comprise the one or more unique wavelengths or sets of wavelengths within the plurality or the continuum of wavelengths assigned to represent distinct data classes or object types or object classes; and performing the machine vision task, machine learning task, and/or classification of objects based on the signal or data generated by the detector or set of detectors.

28. The method of claim 27, further comprising:

inputting the signal or data generated by the detector or set of detectors to a trained, digital neural network and digitally outputting a reconstructed image of the objects.

29. The method of claim 28, wherein the trained, digital neural network comprises a shallow network having five or less hidden layers.

30. The method of claim 27, wherein the detector comprises a single pixel detector.

31. The method of claim 27, wherein the light from the object originates from a pulsed light source.

32. The method of claim 27, wherein the light from the object originates from a broadband light source.

33. The method of claim 27, wherein the light from the object originates from a light source that emits light within the ultra-violet, visible, infrared, terahertz, millimeter, or radio portion of the electromagnetic spectrum.

34. The method of claim 27, wherein the signal or data generated by the detector or set of detectors comprises spectral class scores.

35. The method of claim 27, wherein a light source simultaneously illuminates the objects at a plurality or a continuum of wavelengths.

36. The method of claim 27, wherein a light source sequentially illuminates the objects at a plurality or a continuum of wavelengths.

37. The method of claim 27, wherein the detector or set of detectors generates a time domain signal or data that comprises output information of the diffractive optical neural network.

38. The method of claim 28, wherein the trained, digital neural network configured to reconstruct images of the input objects is trained using at least one of the following: (i) a structural loss term, (ii) a cross entropy loss term, (iii) softmax-cross-entropy loss term, (iv) a diffractive network inference accuracy related penalty term, or (v) combinations of (i-iv) with different weights.

39. The method of claim 33, wherein the light source emits light at a plurality of discrete frequencies or wavelengths.

40. The method of claim 32, wherein the system further comprises at least one dispersive element that receives light from the broadband light source prior to illumination of the objects.

41. The method of claim 27, further comprising at least one dispersive element interposed between the diffractive optical neural network device and the detector or set of detectors.

42. The method of claim 27, further comprising at least one waveguide interposed between the diffractive optical neural network device and the detector or set of detectors.

43. The method of claim 27, wherein the diffractive optical neural network device, light source, and detector or set of detectors are used in a time domain or spectral domain spectroscopy device.

44. The method of claim 27, wherein the diffractive optical neural network device, light source, and detector or set of detectors are used in an interferometric measurement device.

45. The method of claim 27, wherein the diffractive optical neural network device, light source, and detector or set of detectors are used in an optical coherence tomography (OCT) setup.

46. The method of claim 27, wherein the diffractive optical neural network device, light source, and detector or set of detectors are used in a Fourier-transform infrared spectroscopy (FTIR) measurement system.

47. The method of claim 27, wherein the diffractive optical neural network device performs single-shot spectral encoding of object information.

48. The method of claim 27, wherein the detector or set of detectors output a signal or data that comprises an optical signal encoding and/or feature extraction and/or feature representation scheme.

49. The method of claim 27, wherein the diffractive optical neural network device performs optical signal compression.

50. The method of claim 28, wherein the reconstructed images of the objects are fed back to the diffractive optical neural network device as new inputs so as to improve the inference accuracy of the machine vision task, machine learning task, and/or classification of objects.

* * * * *